(12) United States Patent
Faaborg et al.

(10) Patent No.: US 11,093,201 B2
(45) Date of Patent: Aug. 17, 2021

(54) DEVICE MANAGER THAT UTILIZES PHYSICAL POSITION OF DISPLAY DEVICES

(71) Applicant: GOOGLE LLC, Mountain View, CA (US)

(72) Inventors: Alexander James Faaborg, Mountain View, CA (US); Ariel Sachter-Zeltzer, Sunnlyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 16/599,383

(22) Filed: Oct. 11, 2019

(65) Prior Publication Data

US 2021/0096802 A1 Apr. 1, 2021

Related U.S. Application Data

(60) Provisional application No. 62/906,586, filed on Sep. 26, 2019.

(51) Int. Cl.
*G06F 3/14* (2006.01)
*G06F 3/033* (2013.01)
*G06F 3/02* (2006.01)

(52) U.S. Cl.
CPC .............. *G06F 3/1423* (2013.01); *G06F 3/02* (2013.01); *G06F 3/033* (2013.01)

(58) Field of Classification Search
CPC .................. G06F 3/017; G06F 3/0484; G06F 2203/04803; G06F 3/013; G06F 3/0425; G06F 3/14; G06F 3/1423; G06F 3/02; G06F 3/033; G09G 2356/00; G09G 2340/0492; G09G 2320/0693
See application file for complete search history.

(56) References Cited

U.S. PATENT DOCUMENTS

| 5,796,403 | A | 8/1998 | Adams et al. |
| 6,018,340 | A | 1/2000 | Butler et al. |
| 2016/0104313 | A1* | 4/2016 | Du ........................ H04N 13/279 348/51 |
| 2016/0283084 | A1* | 9/2016 | Keysers .................. H04W 4/80 |
| 2019/0272138 | A1* | 9/2019 | Krauss ..................... G06F 3/013 |

FOREIGN PATENT DOCUMENTS

| WO | 2012044713 A1 | 4/2012 |
| WO | 2019040081 A1 | 2/2019 |

OTHER PUBLICATIONS

International Search Report and Written Opinion for PCT Application No. PCT/US2020/070463, dated Feb. 1, 2021, 24 pages.

* cited by examiner

*Primary Examiner* — Gerald Johnson
(74) *Attorney, Agent, or Firm* — Brake Hughes Bellermann LLP

(57) ABSTRACT

A system and method may provide for a computing system including multiple display devices. Data collected by sensors such as, for example, image sensors and positional sensors, of the display devices is leveraged to determine a position and/or an orientation of each of the display devices in the real world environment. This identification and utilization of the relative positioning of the display devices may be used to configure, and reconfigure, display settings, set display priorities, control movement of content, and respond to gesture based commands related to content management.

27 Claims, 43 Drawing Sheets

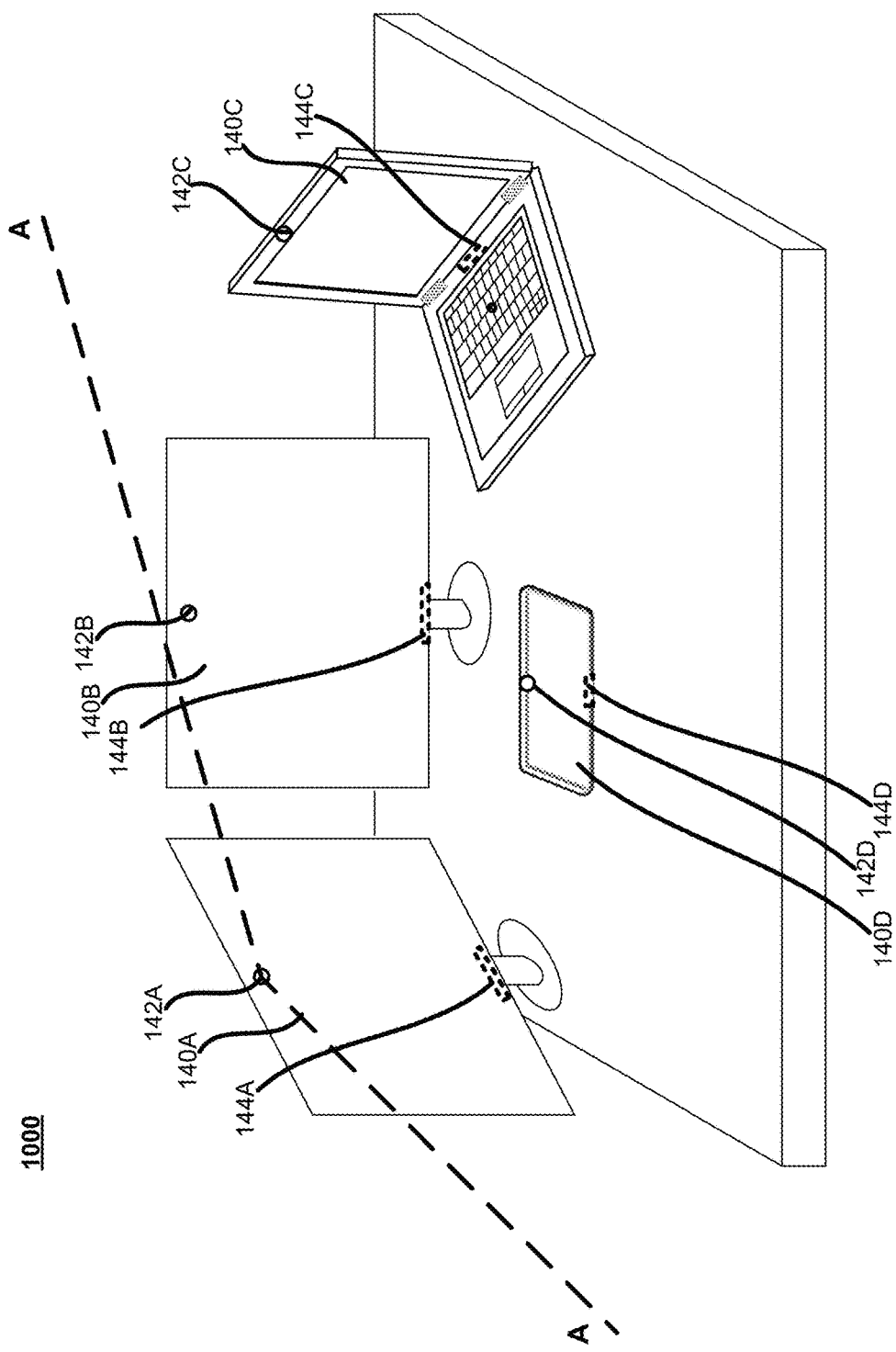

(1)

(2)

(3)

(4)

(1)

(2)

(3)

DEVICE MANAGER THAT UTILIZES PHYSICAL POSITION OF DISPLAY DEVICES

CROSS REFERENCE TO RELATED APPLICATION

This application claims the benefit of U.S. Provisional Application No. 62/906,586, filed on Sep. 26, 2019, entitled "DEVICE MANAGER THAT UTILIZES PHYSICAL POSITION OF DISPLAY DEVICES," the disclosure of which is incorporated herein by reference in its entirety.

TECHNICAL FIELD

This description generally relates to computing systems including multiple display devices.

BACKGROUND

Computing systems can include one or more graphical user interfaces that provide for user interaction with a plurality of computing applications, functions, and the like. The graphical user interfaces may be displayed on one or more display devices, or monitors, that are operably coupled within the computing system. When managing the operation of multiple display devices, the user may manually select, or assign, or set, the order of the display devices in, for example, a settings module of an operating system of the computing system.

SUMMARY

A system for detecting, setting and updating the relative physical positions of multiple display devices in a computing system may enhance functionality of the system, and may improve the user's experience. By identifying where displays are positioned in physical space relative to each other, without manual entry and screen assignment by the user, window managers may be provided that can configure display settings without user intervention, and can enhance the user's natural, intuitive interaction with content presented on the displays. Configuration, e.g., intelligent configuration, of display settings can provide improved control of a computer in a multi-screen environment, particularly in situations where one or more display devices is mobile.

In one general aspect, the method may include detecting, by a processor of a computing device, a plurality of display devices in a physical environment, the plurality of display devices being operably coupled to the computing device in the physical environment, receiving, by the processor from a plurality of sensors of the plurality of display devices, data related to the physical environment, detecting, by the processor, a physical position of each display device of the plurality of display devices in the physical environment based on the data received from the plurality of sensors of the plurality of display devices, and controlling, by the processor, at least one of content displayed on at least two of the plurality of display devices based on the detected physical positions of the plurality of display devices, or an interaction of an auxiliary device with the plurality of display devices.

In some implementations, controlling the content displayed on the plurality of display devices may include detecting a user input, and controlling the display of the content in response to the user input. In some implementations, detecting the user input may include detecting a controller input that moves the displayed content from a first display device to a second display device of the plurality of display devices, and controlling the content may include moving the displayed content from a display position on the first display device to a display position on the second display device of the plurality of display devices. In some implementations, moving the displayed content from the first display device to the second display device may include adjusting a position and an orientation of the displayed content, from a first position and a first orientation on the first display device to a second position and a second orientation on the second display device, in response to the detected physical position of the first display device and the second display device. In some implementations, a physical orientation of the first display device may be different from a physical orientation of the second display device. For example, the first display device may be oriented substantially horizontally, and the second display device may be oriented substantially vertically.

In some implementations, moving the displayed content from the first display device to the second display device may include detecting a physical discontinuity between the first display device and the second display device, based on the detected physical position of the first display device and the detected physical position of the second display device in the physical space, and adjusting the movement of the displayed content from the first display device to the second display device based on the detected physical discontinuity. In some implementations, detecting the physical discontinuity may include at least one of detecting a physical gap between the detected physical position of the first display device and the detected physical position of the second display device, or detecting a physical bezel area surrounding a display area of at least one of the first display device or the second display device. In some implementations, adjusting the movement of the displayed content may include delaying the display of the content on the second display device to correspond to movement of the displayed content through the physical discontinuity.

In some implementations, detecting the physical position of each display device of the plurality of display devices in the physical environment may include collecting orientation data from a position sensor of at least one of the plurality of display devices, detecting a physical orientation of the at least one display device based on the orientation data, and detecting a physical position of the at least one display device relative to remaining display devices of the plurality of display devices based on the physical orientation and the data related to the physical environment collected by image sensors of the plurality of display devices.

In some implementations, the method may also include dynamically configuring display settings of the computing device based on the detected physical positions of the plurality of display devices. The content displayed on the at least two of the plurality of display devices may be controlled based on the dynamically configured display settings. In some implementations, the method may also include receiving movement data from a position sensor of at least one of the plurality of display devices, detecting a movement of the at least one display device based on the orientation data, and dynamically configuring the display settings in response to detecting the movement of the at least one display device of the plurality of display devices. In some implementations, at least one display device of the plurality of display devices is a mobile display device.

In some implementations, automatically configuring the display settings of the computing device includes at least one of dynamically setting an order of the plurality of display devices, dynamically setting a primary display device of the plurality of display devices, or dynamically setting relative positions of the plurality of the display devices. In some implementations, detecting the physical position of each display device of the plurality of display devices may include intermittently receiving image sensor data from image sensors of the plurality of display devices and orientation data from position sensors of the plurality of display devices, dynamically updating the physical position of the plurality of display devices based on updated image sensor data and updated orientation data, and dynamically updating the display settings of the computing device based on the updated physical position of the plurality of display devices.

In some implementations, controlling interaction of the auxiliary device with the plurality of display devices includes controlling interaction of a display auxiliary device or a non-display auxiliary device with the plurality of display devices. In some implementations, the display auxiliary device may include at least one of a tablet computing device or a wearable display device. In some implementations, the wearable display device may include at least one of an augmented reality head mounted display device or a wrist worn computing device, and the non-display auxiliary device may include at least one of a keyboard input device, a mouse input device, or a touchpad input device.

In another general aspect, a method may include detecting, by a processor of a computing device, a plurality of display devices in a physical environment, the plurality of display devices being operably coupled to the computing device in the physical environment, receiving, by the processor, data related to the physical environment from image sensors of the plurality of display devices, detecting, by the processor, a physical position of each display device of the plurality of display devices in the physical environment based on the data related to the physical environment, and automatically configuring display settings of the computing device based on the detected physical positions of the plurality of display devices.

In another general aspect, a computer program product tangibly embodied on a non-transitory computer-readable storage medium may include instructions that, when executed by the computing device, may cause the computing device to detect the plurality of display devices in a physical environment, receive data from the plurality of display devices, collected by a plurality of sensors of the plurality of display devices, detect a physical position of each display device of the plurality of display devices in the physical environment based on data related to the physical environment, based on the data collected by the plurality of sensors of the plurality of display devices, and control at least one of content displayed on at least two of the plurality of display devices based on the detected physical positions of the plurality of display devices, or an interaction of an auxiliary device with the plurality of display devices.

In some implementations, in controlling the content displayed on the plurality of display devices, the instructions may cause the computing device to detect a user input, including a controller input that moves the displayed content from a first display device to a second display device of the plurality of display devices, and to move displayed content from a display position on the first display device to a display position on the second display device of the plurality of display devices. In some implementations, in moving the displayed content from the first display device to the second display device, the instructions may cause the computing device to detect that a physical orientation of the first display device is different from a physical orientation of the second display device, and to adjust a position and an orientation of the displayed content, from a first position and a first orientation on the first display device to a second position and a second orientation on the second display device, in response to the detected physical orientation of the first display device and the detected physical orientation second display device.

In some implementations, in moving the displayed content from the first display device to the second display device, the instructions may cause the computing device to detect a physical discontinuity between the first display device and the second display device, the detected physical discontinuity including at least one of a physical gap between the detected physical position of the first display device and the detected physical position of the second display device, or a physical bezel area surrounding a display area of at least one of the first display device or the second display device, and to adjust the movement of the displayed content from the first display device to the second display device to correspond to movement of the displayed content through the detected physical discontinuity.

In some implementations, in detecting the physical position of each display device of the plurality of display devices in the physical environment, the instructions may cause the computing device to, for each display device of the plurality of display devices, receive orientation data from a position sensor of the display device, detect a physical orientation of the display device based on the orientation data, and detect a physical position of the display device relative to remaining display devices of the plurality of display devices based on the physical orientation and the data related to the physical environment received from the image sensors. In some implementations, the instructions may cause the computing device to receive movement data from a position sensor of at least one of the plurality of display devices, to detect a movement of the at least one display device based on the movement data, and to dynamically update the display settings in in response to the detected movement of the at least one display device of the plurality of display devices. In some implementations, in detecting the physical position of each display device of the plurality of display devices, the instructions may cause the computing device to periodically receive image sensor data and orientation data, to dynamically update the physical position of the plurality of display devices based on updated image sensor data and updated orientation data, and to dynamically update the display settings of the computing device based on the updated physical position of the plurality of display devices.

The details of one or more implementations are set forth in the accompanying drawings and the description below. Other features will be apparent from the description and drawings, and from the claims.

BRIEF DESCRIPTION OF THE DRAWINGS

FIGS. 3A-3D illustrate an exemplary arrangement of exemplary display devices of an exemplary computing system, in accordance with implementations described herein.

DETAILED DESCRIPTION

Figure 1:
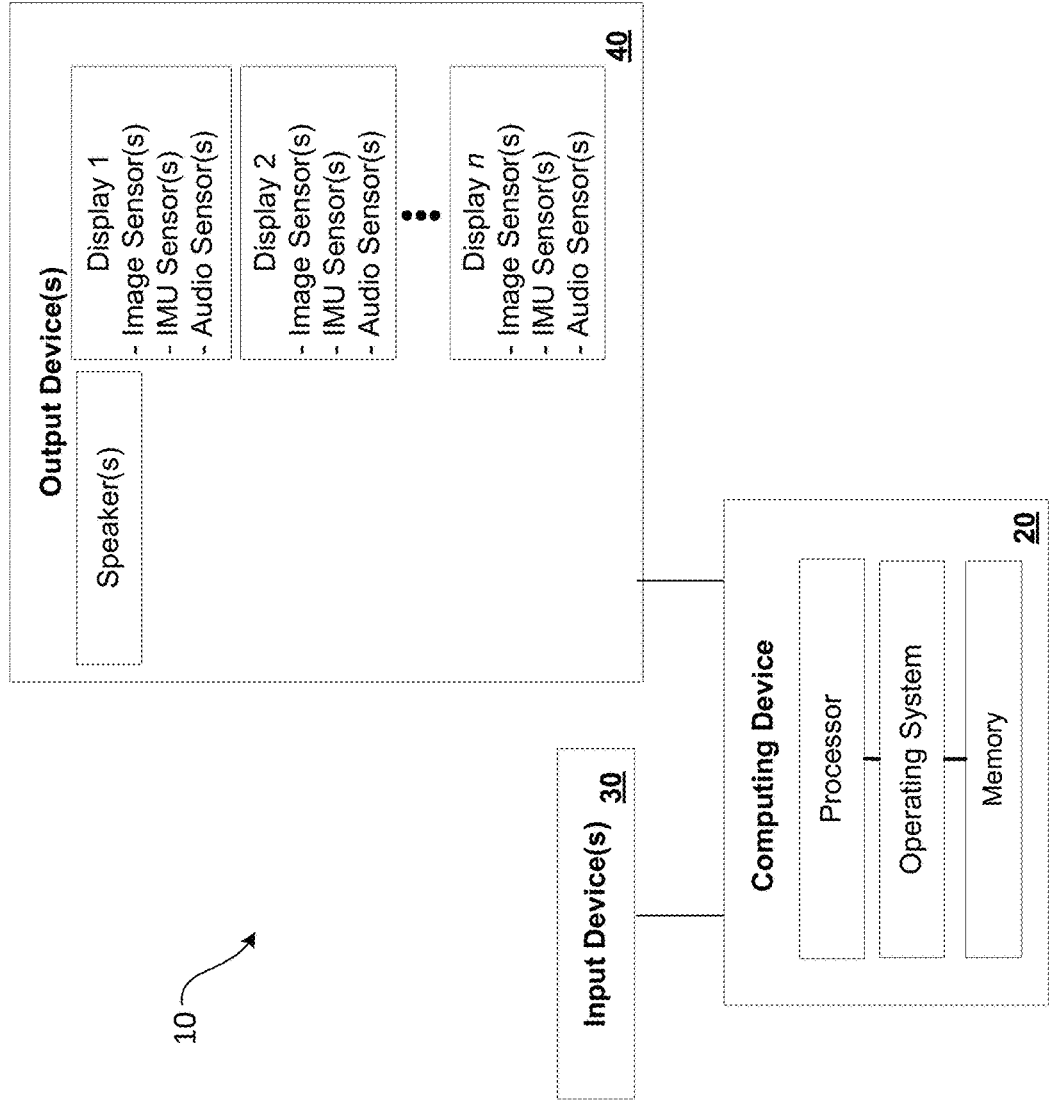
FIG. 1 is a block diagram of a computing system including multiple output devices, in accordance with implementations described herein.

A user may engage with a computing system including multiple display devices, to, for example, facilitate user interaction with content displayed on the multiple display devices. In an arrangement including multiple physical display devices in the same physical location, the multiple display devices may present a problem, in that a user would typically physically move/rearrange the display devices, and/or manually reassign the display settings, and/or manually specify relative positioning of the display devices to set and/or change how/on which display device content is displayed. Similarly, when, for example, a laptop computing device is disconnected/moved/reconnected, the user would typically go through a similar process. This may present a technical challenge, or a problem, in that it may be complicated, time consuming, and the like, for the user to go through this process each time a computing device is reconnected, displays are added and/or moved, and the like.

Various solutions to the problems noted above are provided by a computing system, in accordance with implementations described herein. A computing system, in accordance with implementations described herein, may leverage data collected by various sensors included in multiple displays to generate (e.g., build) a three-dimensional mapped model of the real-world environment in which the system is operating. The computing system may use this model, and the continued (e.g., periodic, continuous, random) collection of data by the sensors included in the multiple displays, to establish a physical position of at least some (e.g., in some circumstances, each) of the multiple displays, and set (e.g., define, store) display settings, without (e.g., substantially without) requiring user input or user intervention. The computing system may use this model, and the continued collection of data by the sensors included in the multiple displays, to detect movement, changes in orientation, rearrangement and the like of the multiple displays, and reset the display settings accordingly, without requiring user input or user intervention, thereby providing a solution to the problem of reassignment of display settings each time a computing device is re-connected, one or more display(s) are added/removed/moved and the like. The display settings can include, for example, setting one of the multiple displays as a primary display, determining content to be displayed on the different multiple displays, transitioning of display of content between the multiple displays, changes in display characteristics (for example, scale, positioning and the like) and other such features. More details regarding display settings are described below.

Configuring (e.g., automatically configuring) display settings in this way can provide at least a technical effect of improved control of a computing device in a multi-screen environment. Configuring display settings in this way can provide a technical effect of improved control of an interaction between the multiple displays and one or more auxiliary devices which may be operably coupled in the computing system.

Auxiliary devices may include, for example, display-enabled auxiliary devices, and non-display auxiliary devices. The display-enabled auxiliary devices may include, for example, tablet computing devices including a display, wearable computing devices such as augmented reality head mounted display devices and wrist worn computing devices, and other such display-enabled auxiliary devices. The non-display auxiliary devices may include, for example, user input devices such as, for example, keyboard devices, mouse devices, touchpad devices, and the like. In some implementations, an interaction between the multiple displays and one or more auxiliary devices may be controlled based on the detected physical positions. For example, input into one or more auxiliary input devices (keyboard, mouse, etc.) may be adjusted or controlled to account for physical distances or gaps between the displays.

In some implementations, the sensors included in one or more of the multiple displays may include, for example, image sensors, positional sensors, audio sensors, and the like. The computing system may analyze information collected by the sensors to build the model of the real-world environment. The system may use the model to identify (e.g., recognize) and utilize where the multiple displays are positioned in the real world environment relative to each other, without (e.g., substantially without) manual entry and screen assignment by the user. This real-time identification and utilization of the physical location of at least one (e.g., each) display may provide for intelligent window management that may, for example, configure display settings without requiring user intervention, thus enhancing natural, intuitive user interaction with content presented on the displays. In some implementations, data collected by image sensors, such as, for example, front facing cameras, may provide for gesture recognition, and/or may track user position. For example, in some implementations, data collected by the image sensors may be used to detect and/or tract a user position and/or orientation relative to the multiple displays. For example, in some implementations, the data collected by the image sensors may track user head position, head gaze direction, eye gaze direction, body orientation and/or direction, and the like. Data collected in this manner may further enhance natural, intuitive user interaction with content presented on the displays.

Configuring display settings can provide at least a technical effect of improved control of a computer in a multi-screen environment, particularly in situations where one or more display devices is a mobile display device, such as a tablet computing device including a display. Moreover, by controlling interaction of an auxiliary device with the plurality of display devices (in some implementations by controlling based on the detected physical positions of the plurality of display devices), user input may be more intuitive. For example, user input provided via the auxiliary devices may be managed to account for the physical positions, orientations etc. of the display devices.

In some implementations, interaction can be considered to cover any adjustment or control which is made at the computing device regarding an auxiliary device, and in some implementations, which is made in response to the detected physical position of the devices. For example, interaction can include the origin and/or treatment of input and/or output, and any automatic detection of auxiliary devices, or change in settings when connecting or disconnecting one or more auxiliary devices. Such interaction may occur before any content is displayed, and/or contemporaneously with the display of content to a user.

The principles to be described herein may apply to computing systems including stationary display monitors, and also mobile display devices, such as, for example, tablet computing devices, laptop computing devices, smartphones, head mounted display devices, and the like. When operably coupled to a computing device these mobile display devices may be used as auxiliary displays on which content can be displayed. In some implementations, data collected by image sensors, position/orientation sensors and the like may be intermittently, for example, periodically, collected, may be collected on a set schedule, and/or substantially continuously collected to update the position and/or orientation of at least one (e.g., each) of the displays of the computing system, and to update the display settings and/or to adjust (or control) the positioning of displayed content accordingly. In some implementations, display settings may be set (e.g., define, store), and reset (e.g., change, erase, reset automatically) in response to triggering events, such as, for example, startup, re-start, detected movement of one or more devices, a user request and the like, to adjust or control positioning of displayed content accordingly.

FIG. 1 is a block diagram of an exemplary computing system 10. The computing system 10, in accordance with implementations described herein, may leverage data collected by various sensors included in multiple displays to generate (e.g., build) a three-dimensional mapped model of the real-world environment (which can be collected via scans of the real-world environment) in which the system is operating. The computing system may use this model, and the continued (e.g., periodic, continuous, random) collection of data by the sensors included in the multiple displays, to establish a physical position of at least some (e.g., each) of the multiple displays, and set display settings, without (e.g., substantially without) requiring user input or user intervention. The computing system may use this model, and the continued collection of data by the sensors included in the multiple displays, to detect movement, changes in orientation, rearrangement and the like of the multiple displays, and reset the display settings accordingly, without requiring user input or user intervention.

The exemplary computing system may include one or more input devices 30, and one or more output devices 40, operably coupled to a computing device 20. The input device(s) 30 and the output device(s) 40 may communicate with the computing device 20 via a wired, or wireless coupling, and/or via a network (not shown). Similarly, the computing system 10 may communicate with external computing systems and external sources via a network. The computing device 20 may include, for example, a processor, an operating system, a memory, and other such components. The one or more input devices 30 (which can be auxiliary devices) may include, for example, a keyboard, a mouse, a touch/trackpad, and other such devices. The one or more output devices 40 may include, for example, audio output devices such as speakers, visual output devices such as display devices, and other such output devices. In some implementations, multiple display devices may be operably coupled to the computing device 20. The operable coupling of multiple display devices to the computing device 20 may expand the area available for visual display of content, expand virtual workspace, facilitate sharing across multiple applications, and the like, thus enhancing productivity, and enhancing functionality and utility of the computing system 10 to the user. The display devices operably coupled to the computing device 20 may be associated with one or more other computing devices, which computing devices are communicatively coupled to computing device 20.

Figure 2:
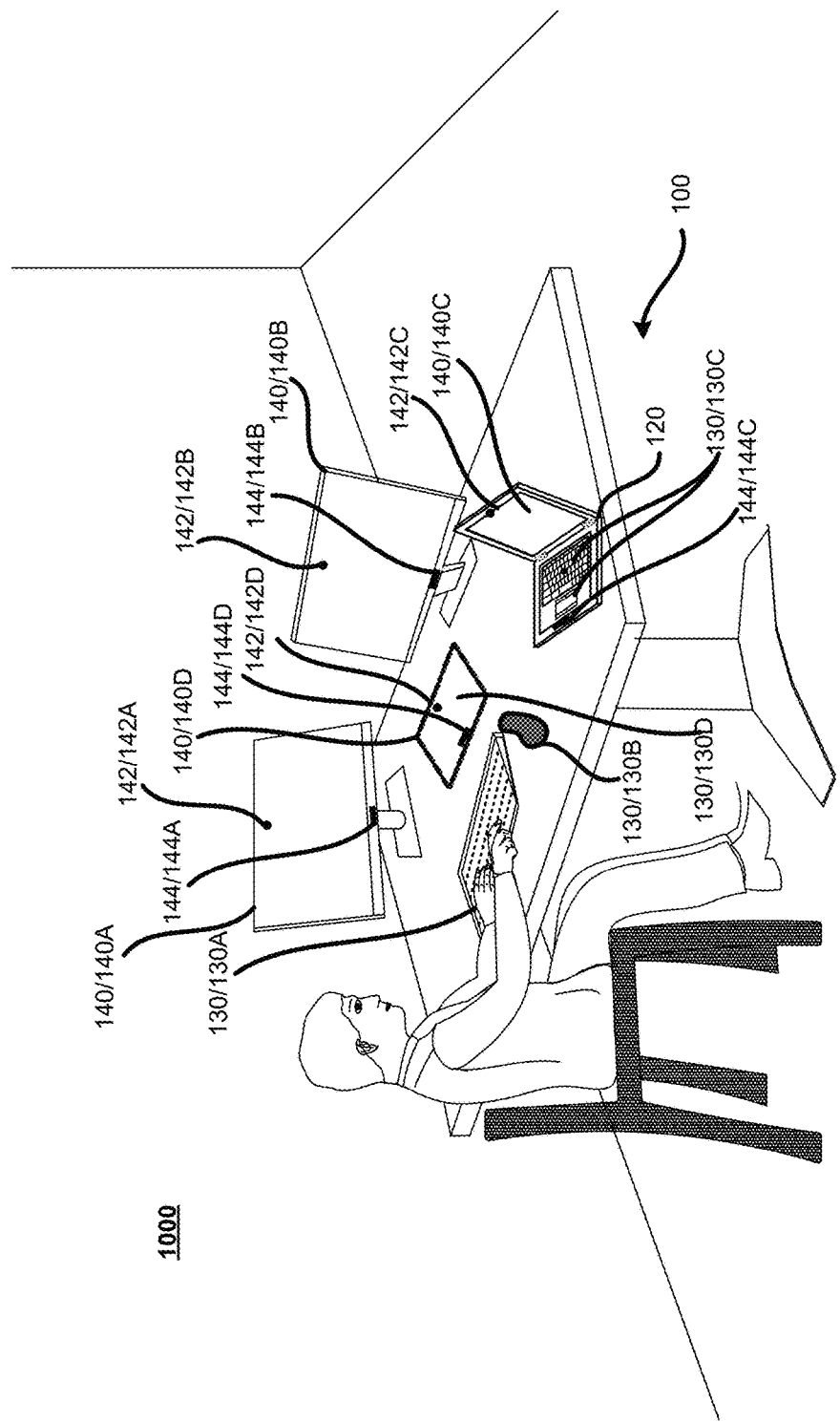
FIG. 2 illustrates a computing system including multiple output devices, in accordance with implementations described herein.

FIG. 2 illustrates a user, in a real world environment 1000, engaged with a computing system 100 including multiple display devices 140, in accordance with implementations described herein. In this type of exemplary arrangement, including multiple physical display devices 140 in the same physical location, a user would typically have to physically move/rearrange the display devices 140, or manually reassign the display settings, manually specifying relative positioning of the display devices 140 to change how/on which display device 140 content is displayed. Each time, for example, a laptop computing device is disconnected/moved/reconnected, the user would typically go through the process of manually reassigning display settings/specifying relative positioning of the display devices 140. In the computing system 100 including multiple display devices 140, in accordance with implementations described herein, the computing system 100 may leverage information collected by sensors of the display devices 140 to identify relative position and/or orientation of the multiple display devices 140 without user intervention.

In the exemplary arrangement shown in FIG. 2, the computing system 100 includes a computing device 120, in the form of a laptop computer in this example. In the exemplary arrangement shown in FIG. 2, multiple display devices 140 are operably coupled to the computing device 120. In some implementations, the multiple display devices 140 may include, for example, one or more standalone display devices that are separate from the computing device 120, such as, for example, a first display device 140A and a second display device 140B, as shown in FIG. 2. In some implementations, the multiple display devices 140 may include, for example, a display 140C that is integrated into the computing device 120. In some implementations, the multiple display devices 140 may include a mobile display device such as, for example, a tablet device 140D, that is separate from and operably coupled to the computing device 120, and/or to one of the other display devices 140.

The user may interact with content displayed on one or more of the display devices 140 using, for example, one of a plurality of input devices 130 which may be operably coupled to the computing device 120. For example, in some implementations, a first input device 130A in the form of a keyboard, and a second input device 130B in the form of a mouse, may be operably coupled to the computing device 120. As discussed above, this interaction with content may be controlled or adjusted, in some implementations, based in part on the detected physical positions of the control devices. In some implementations, the one or more input devices 130 may include, for example, a keyboard and/or a touchpad 130C integrally provided on the computing device 120, a touchscreen 130D integrally provided on the mobile display device 140D, and the like. In some implementations, the computing system 100 may include other input devices 130 such as, for example, an audio input device capable of receiving audio commands (not shown). The interaction of these input devices 130 with the display devices 140 can be controlled, such that, for example, physical gaps between screens or the orientation of screens are taken into account when processing the user input to input devices 130 (the speed and/or the relationship between user movement of the mouse 130B and the position calculated at the computing device may be controlled or adjusted, for example). User interaction may therefore be more intuitive.

In some implementations, a wearable device, such as, for example, a head mounted display device, a wrist worn device and the like (not shown) may also be operably coupled to the computing device 120. In some implementations, these types of wearable devices may also function as output devices and/or input devices when operably coupled to the computing device 120.

In some implementations, the display devices 140 may include one or more sensors. The one or more sensors may collect information that allows the system to recognize, for example, automatically recognize, or determine, a physical position and orientation of at least one (e.g., each) of the plurality of display devices in the ambient environment in which the system is operating. In some implementations, this collection of data and determination of physical positions of the display devices 140 in the ambient environment may allow the system to assign display settings, for example, intelligently, or without specific user intervention for assignment of display settings. In some implementations, this collection of data and determination of physical positions of the display devices 140 in the ambient environment may allow the system to update, for example, intelligently update (or configure), display settings, without specific user intervention, in response to one or more triggers.

For example, in some implementations, the system may analyze image information collected (e.g., a stream of image information collected, periodically or randomly collected image information) by image sensors 142, or cameras 142, of one or more of the display devices 140. The system may analyze the collected image information to obtain three-dimensional pose information and location information for the respective display device.

For example, in some implementations, the system may analyze the collected image information to identify objects in the real world environment 1000, identify surfaces in the real world environment 1000 (i.e., walls, floors, horizontal work surfaces and the like), identify spaces between the real world objects, and other such information related to the real world environment 1000. Based on this analysis of the collected image information, and known location of real objects in the real world environment 1000, the system may determine a relative location, and/or pose information, for at least one (e.g., each) of the respective display devices 140. The physical position of at least one (e.g., each) display device 140 in the real world environment 1000, or physical environment 1000, may therefore be detected.

Similarly, in some implementations, one or more of the display devices 140 may include positional sensors 144, such as, for example, an inertial measurement unit (IMU) 144 including, for example, an accelerometer, a gyroscope, a magnetometer and other such sensors. The system may analyze positional and/or orientation information collected by the positional sensors 144 of one or more of the display devices 140 to obtain information about an orientation of the respective display device 140, and relative orientation of other display devices 140. The physical position of at least one (e.g., each) display device 140 in the real world environment 1000, or physical environment 1000, may therefore be detected.

Based on the data collected by the sensors 142, 144 (i.e., image data collected by image sensors 142 and/or positional data collected by positional sensors 144), the system may determine (e.g., develop) a semantic understanding of the real world environment 1000, and may develop a three-dimensional mapped model of the real world environment 1000. The semantic understanding of the real world environment 1000 may allow the system to recognize objects in the real world environment which are substantially stationary (i.e., wall surfaces, corners, windows, furniture and the like) which may serve as reference points, or anchor points, from which physical positions of the display devices 140 may be derived. The system may detect a change in position of one or more of the display devices 140 in response to a detected change in the image information collected by the image sensor 142 of the respective display device 140. Similarly, the system may detect a change in position of one or more of the display devices 140 in response to a detected change in positional data collected by the positional sensor 144 of the respective display device 140.

Figure 3B:
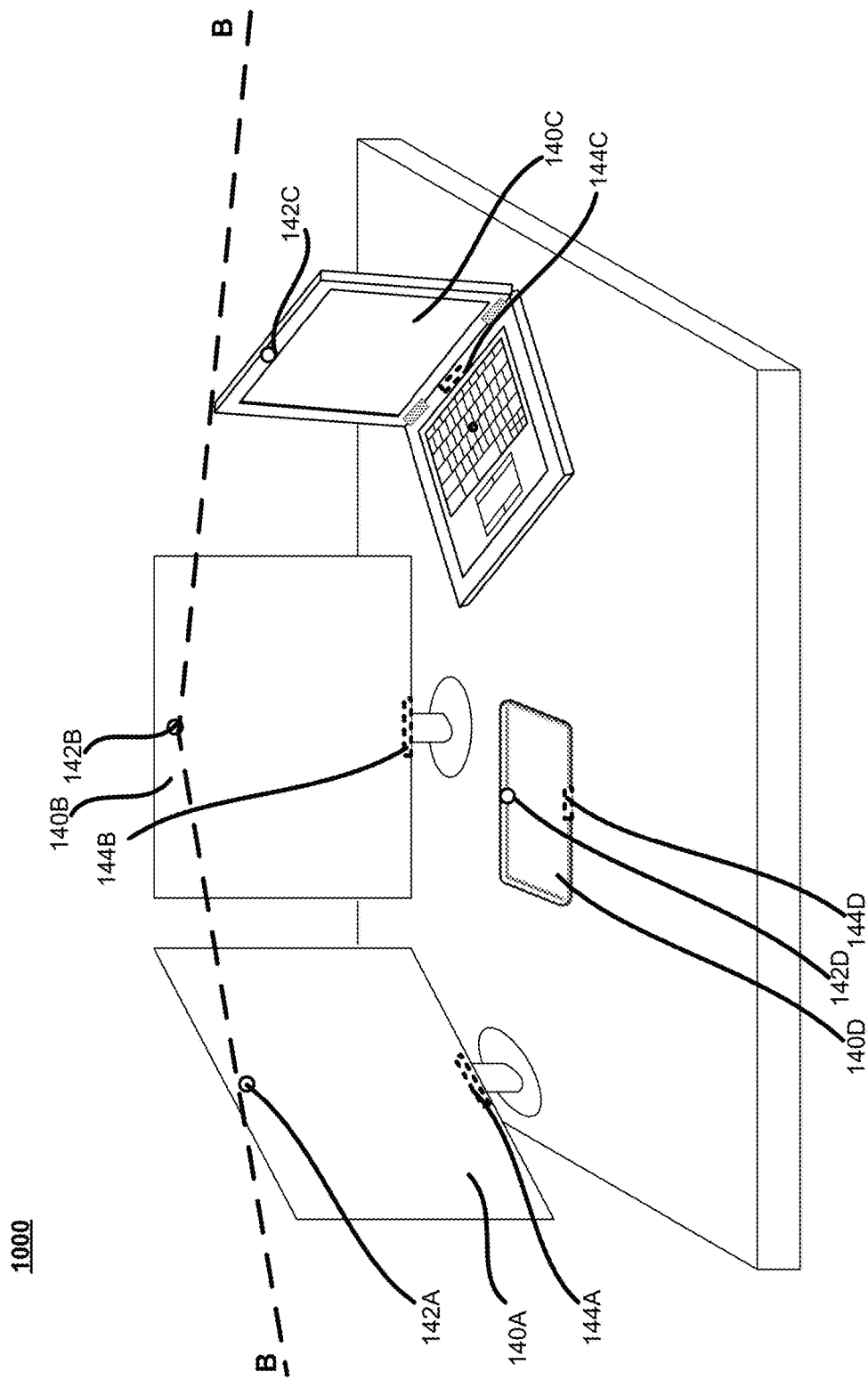
Figure 3C:
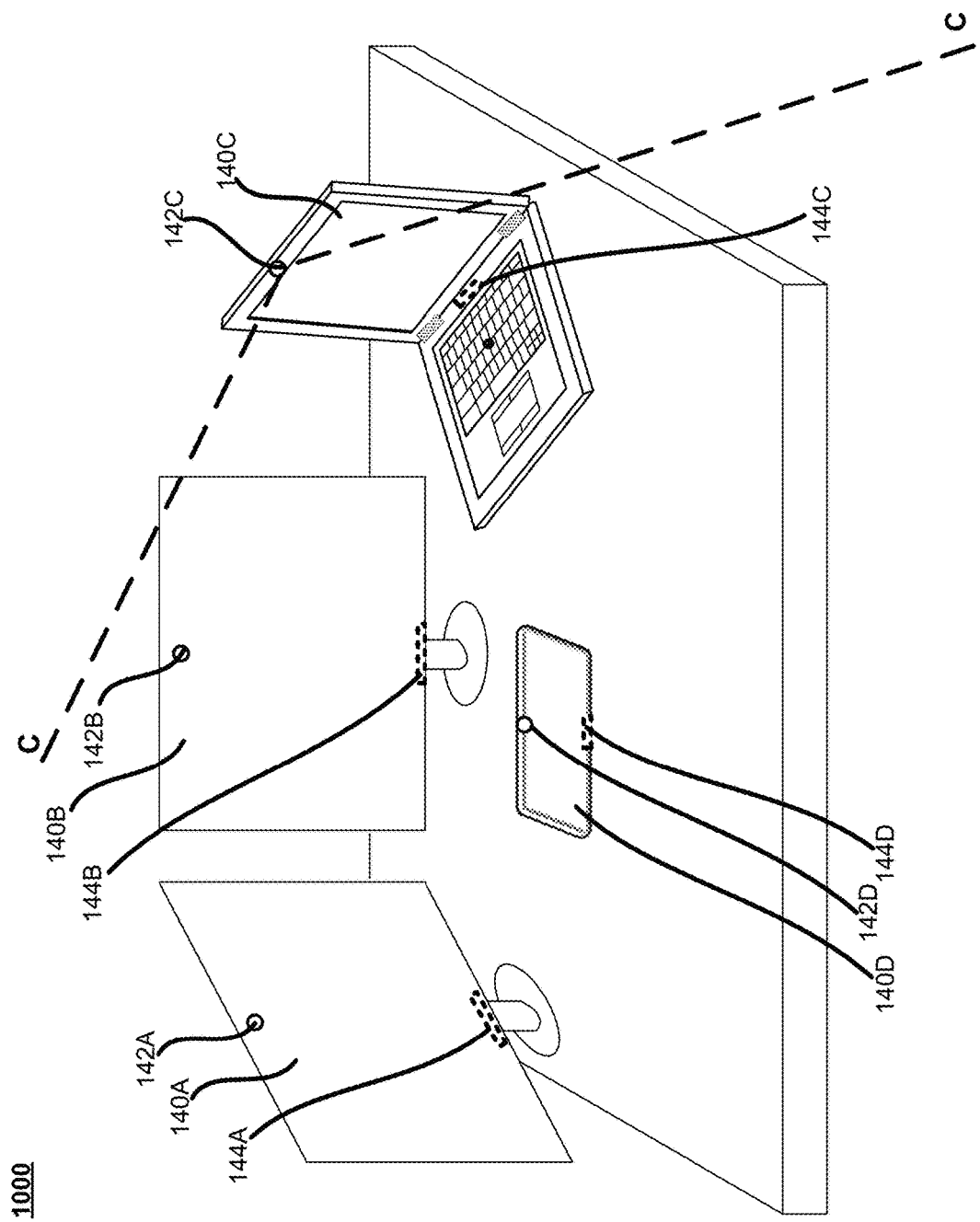
Figure 3D:
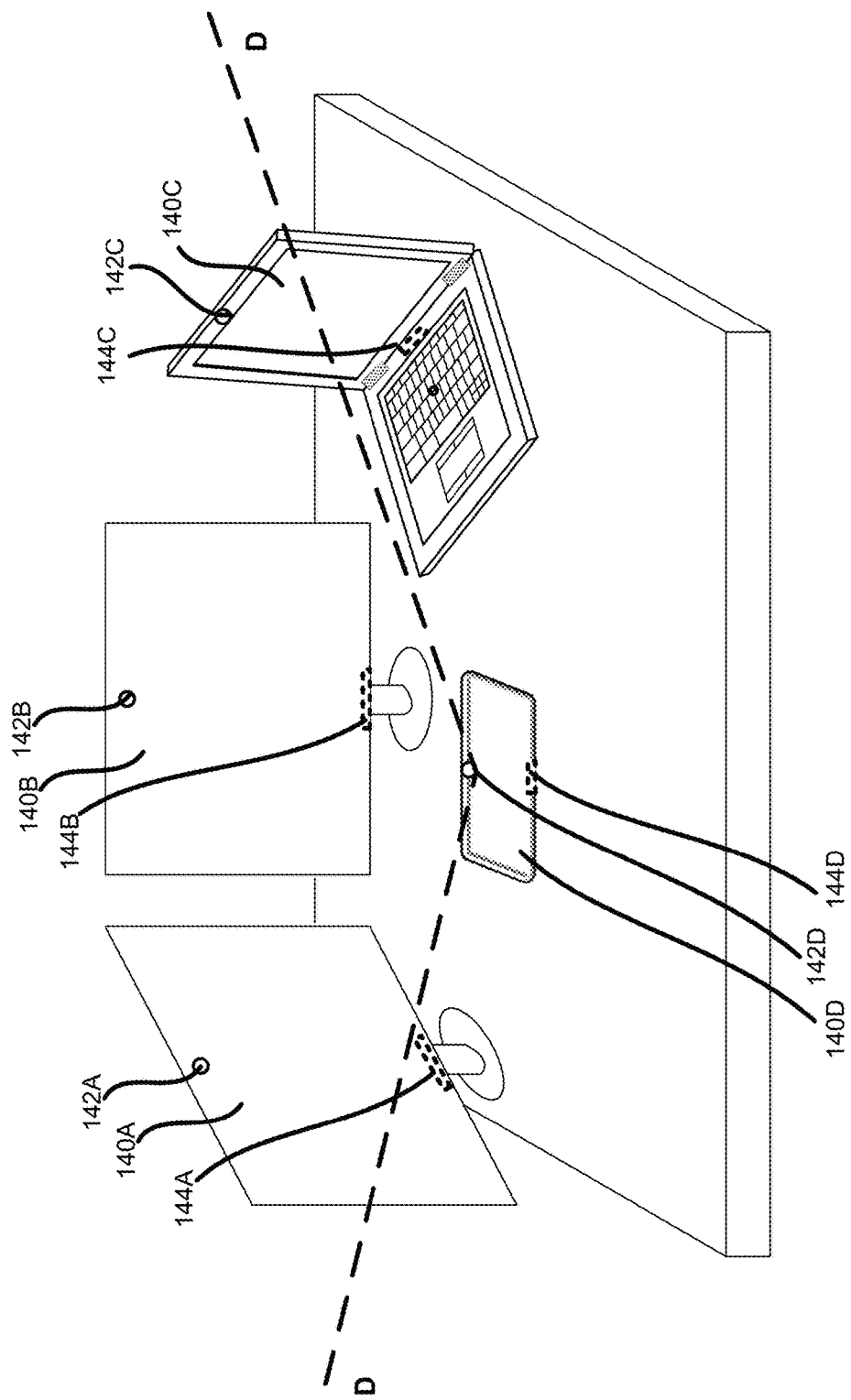

FIGS. 3A-3D illustrate an arrangement of the exemplary display devices 140A, 140B, 140C and 140D described above, simply for purposes of discussion and illustration. A computing system including multiple display devices, in accordance with implementations described herein, can include more, or fewer, display devices, arranged in similar, or different, manners. As shown in FIG. 3A, the image sensor 142A, or camera 142A, of the first display device 140A may have a field of view A. As shown in FIG. 3B, the image sensor 142B, or camera 142B, of the second display device 140B may have a field of view B. As shown in FIG. 3C, the image sensor 142C, or camera 142C, of the third display device 140C may have a field of view A. Due to the substantially horizontal orientation of the mobile display device 140D, the mobile display device 140D has a field of view D, as shown in FIG. 3D.

In the exemplary arrangement shown in FIGS. 3A-3D, the first, second and third display devices 140A, 140B and 140C are all oriented substantially vertically. In this arrangement, images captured by the first, second and third display devices 140A, 140B and 140C may include common real world objects, and common real world reference points, or anchor points, in the three dimensional mapped model. Thus, the system may determine relative positioning of the first, second and third display devices 140A, 140B and 140C based on their respective views of the real world environment, and respective placement of reference points in their respective views of the real world environment, to detect the physical position of the display devices 140 in their real world environment 1000. In some implementations, due to the substantially horizontal orientation of the fourth display device 140D, the images captured within the field of view of the image sensor 142D of the mobile display device 140D may lack commonality, or may lack sufficient commonality, with the images captured within the respective fields of view of the first, second and third display devices 140A, 140B and 140C, to establish a position and/or orientation of the mobile display device 140D based on images captured by the image sensor 1402D. In this implementation, position and/or orientation information (or data) may be collected by the positional sensor(s) 144D of the mobile display device 140D. The position and/or orientation data collected by the positional sensor(s) 144D of the mobile display device 140D may be correlated with position/orientation information of one or more of the other display devices 1401/140B/140C, to determine a position of the mobile display device 140D relative to the other display devices 140.

Figure 4A:
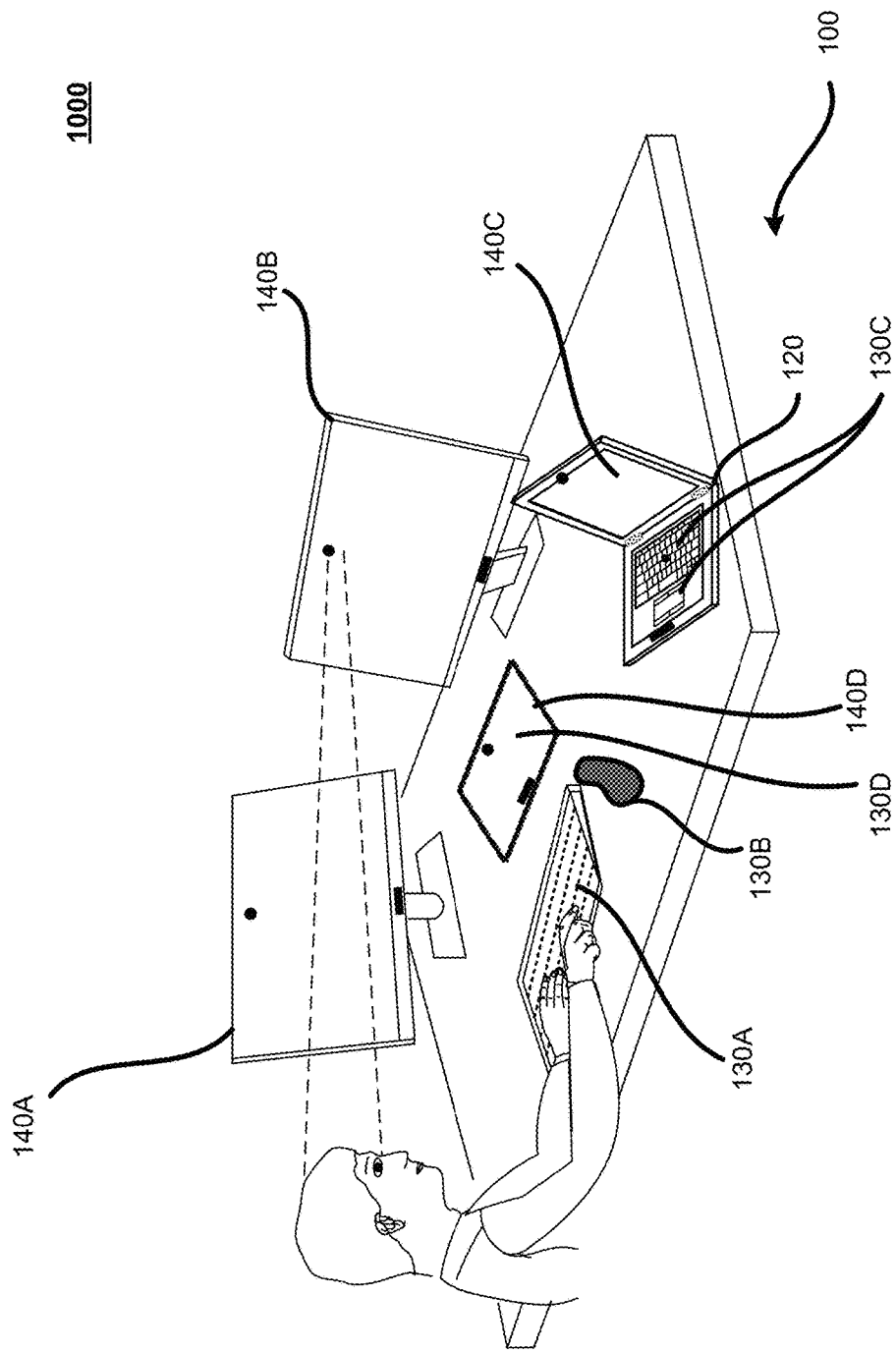
FIGS. 4A-4F illustrate setting of a primary display device in a computing system including multiple display devices, in accordance with implementations described herein.
Figure 4B:
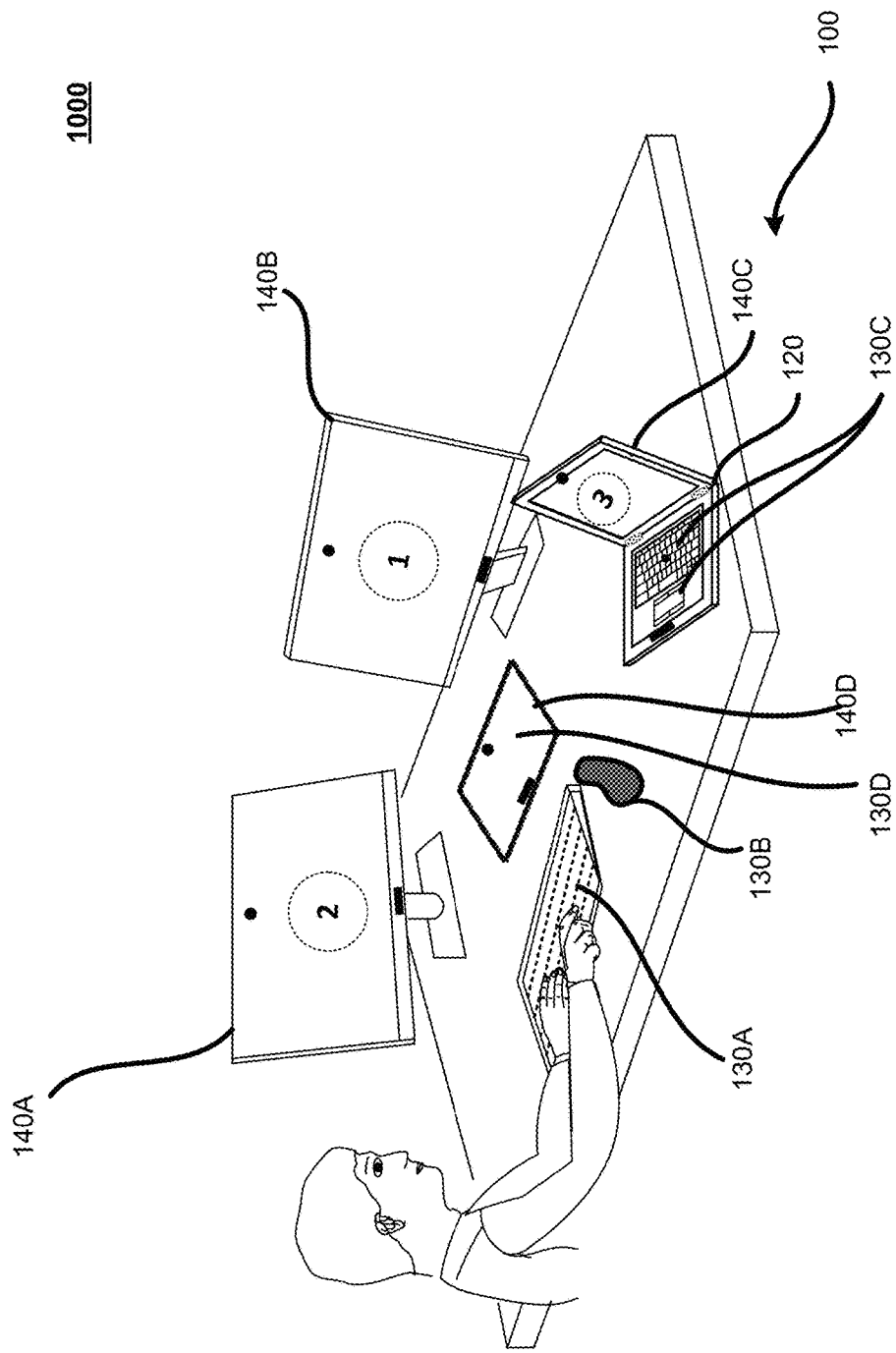

In some implementations, the computing system 100 may use the information collected by the sensor(s), for example, the image sensor(s) 142 and/or the positional sensor(s) 144, to determine which of the display devices 140 is a primary display device. For example, as shown in FIG. 4A, in some implementations, the system may detect a position and/or orientation of a head gaze and/or an eye gaze of the user in the image information collected by the image sensor(s) 142. The system may set (e.g., automatically set) one of the display devices 140 as the primary display device based on the detected location of the head of the user, detected head/eye gaze direction of the user, and the like, as shown in FIG. 4B. That is, as shown in FIGS. 4A and 4B, based on the collected head/eye gaze information, the system may detect that the user's gaze is focused on the second display device 140B, and may set the second display device 140B as the primary display, without specific user intervention and/or input in setting positional information for the display device(s) 140.

Figure 4C:
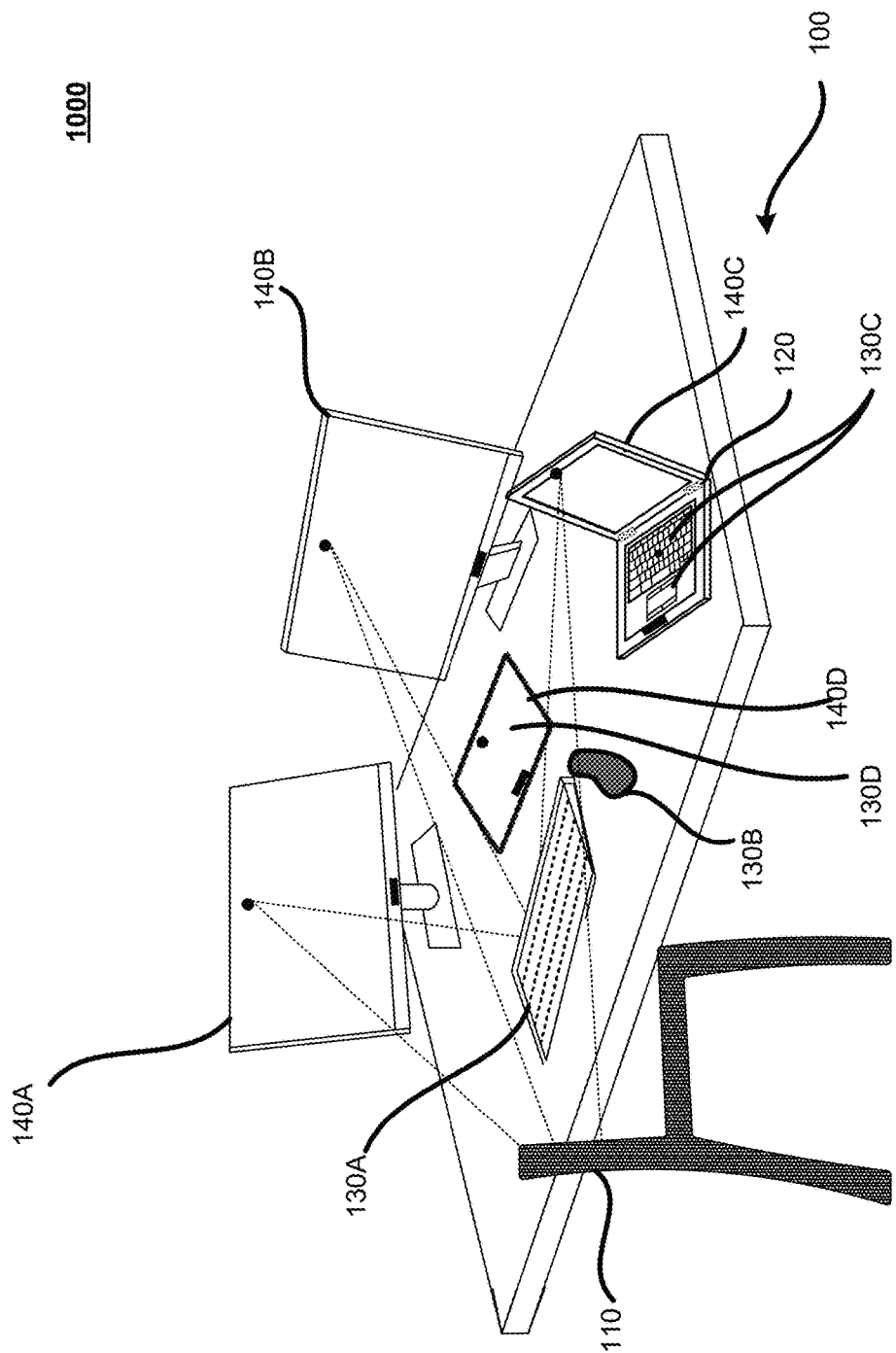
Figure 4D:
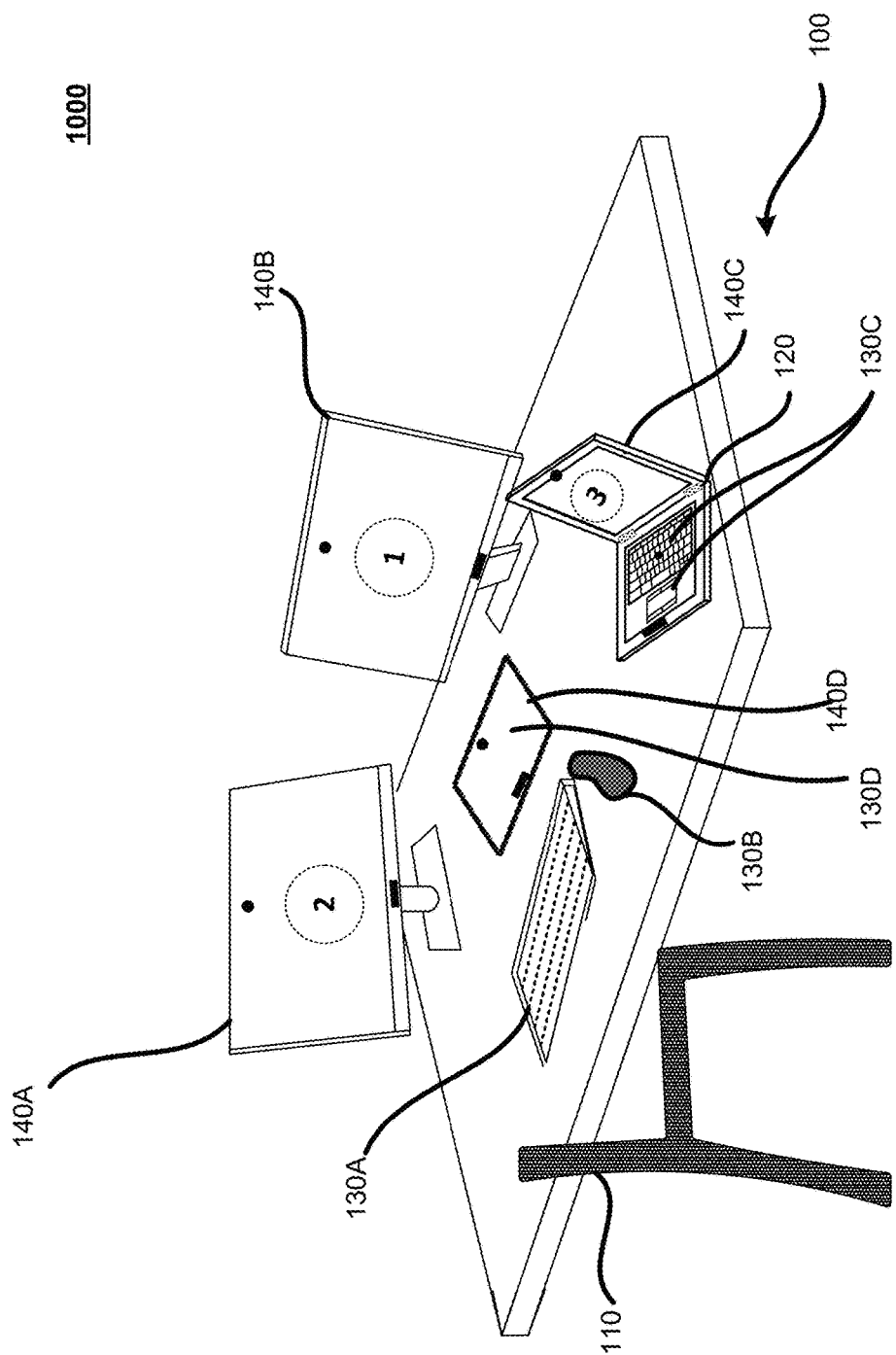

In some implementations, the system may detect a relative position of other real objects in the real world environment 1000 from the information collected by the sensor(s) 142, 144, such as, for example, a desk chair, a keyboard, a mouse, and the like. The system may set (e.g., automatically set), for example, one of the display devices as the primary display device based on, for example, a position and/or orientation of the detected real world objects relative to the display devices 140. For example, as shown in FIG. 4C, the system may detect a position and/or orientation of the desk chair 110, the keyboard 130A and the mouse 130B relative to the display devices 140, as shown in FIG. 4C. Based on the detection of the desk chair 110, the keyboard 130A and the mouse 130B, aligned (e.g., essentially aligned) with the second display device 140B, the system may set (e.g., automatically set), for example, the second display device 140B as the primary display device, as shown in FIG. 4D.

Figure 4E:
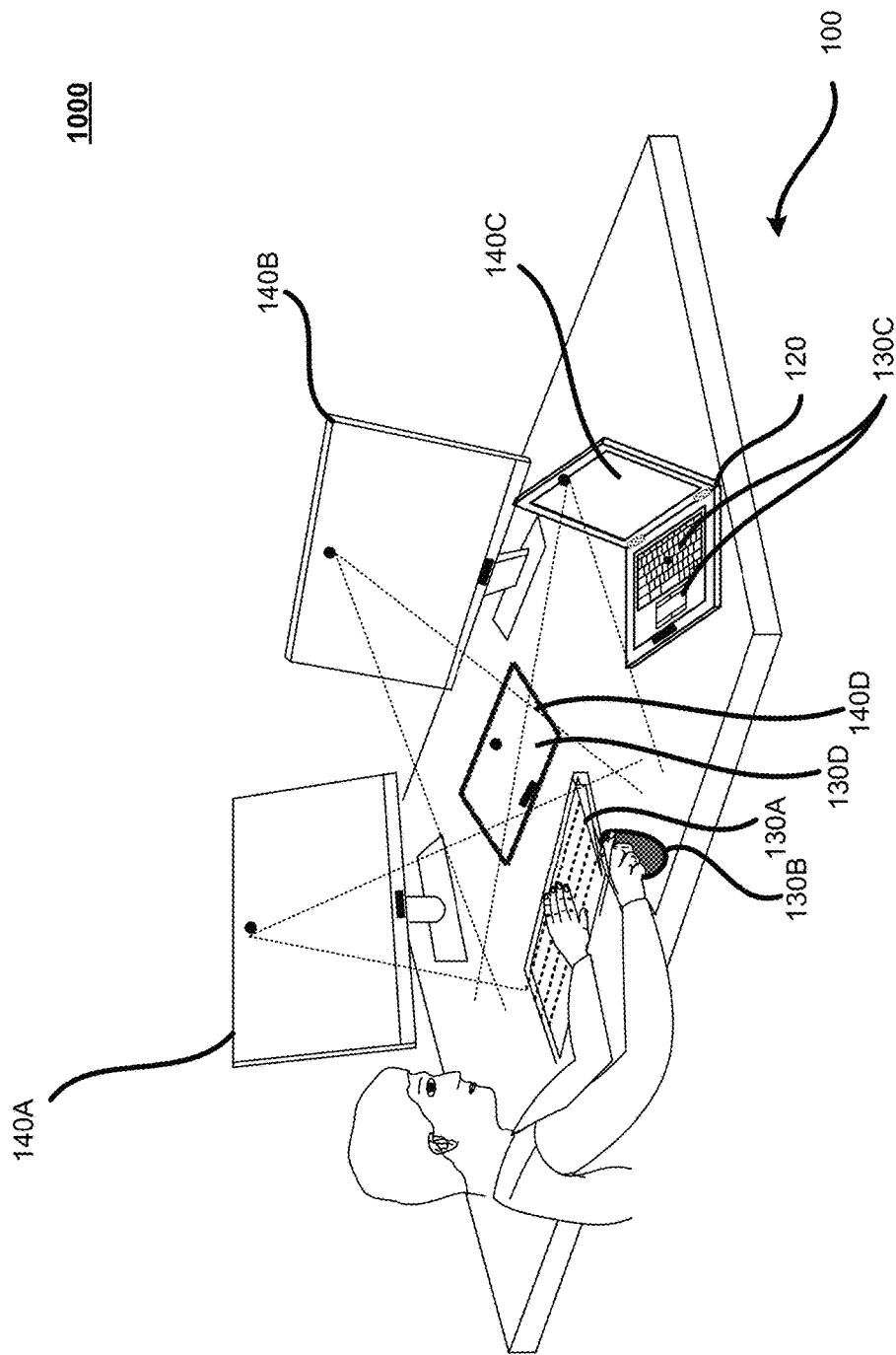
Figure 4F:
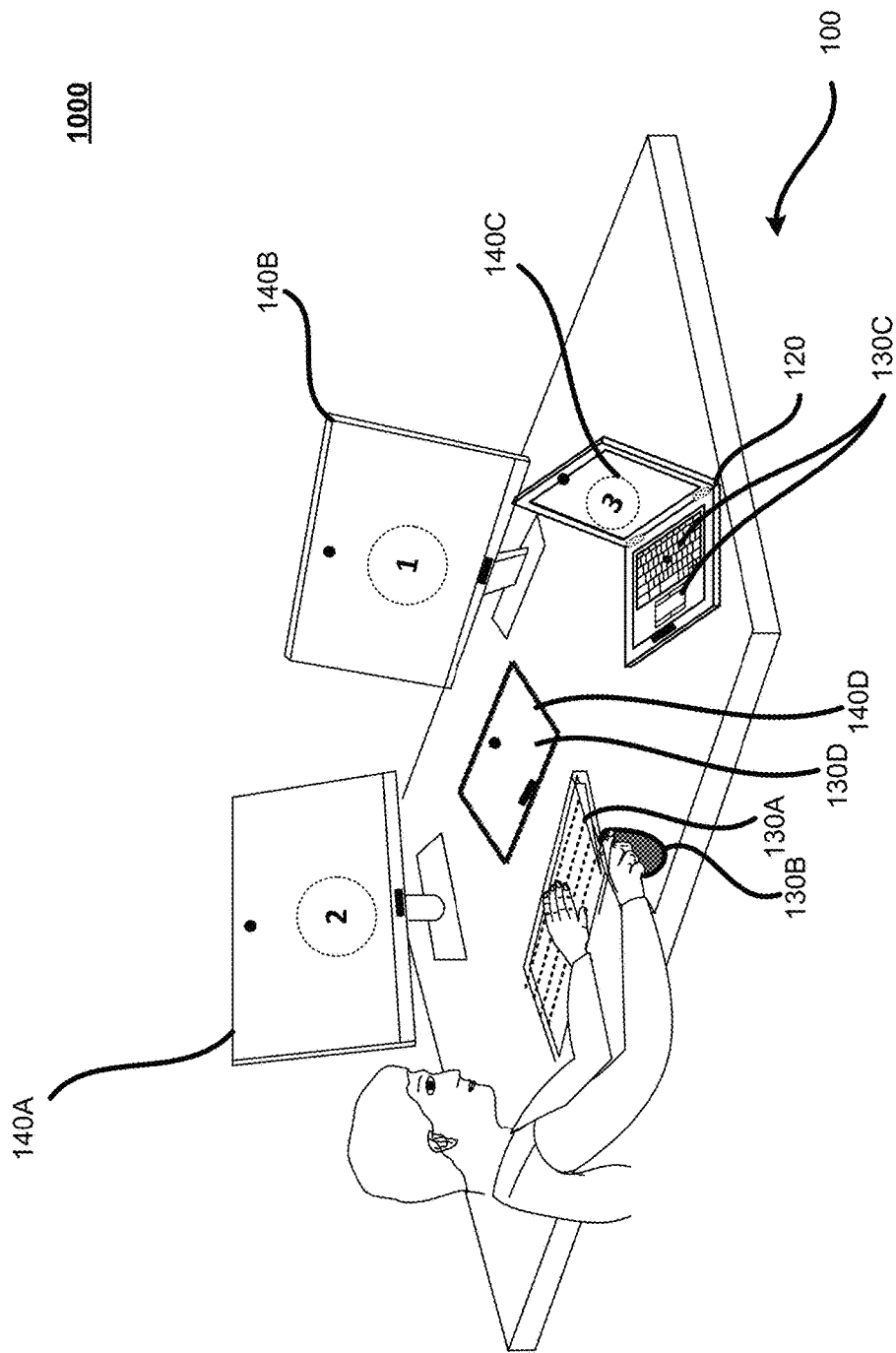

In some implementations, the system may detect user interaction with one or more of the input devices 130, and may set one of the display devices 140 as the primary display based on the detected interaction. For example, as shown in FIG. 4E, in some implementations, the system may detect user interaction with the keyboard 130A and/or the mouse 130B. In some implementations, the user interaction with the keyboard 130A and/or the mouse 130B may be detected based on detection of the user's hand(s) engaged with the keyboard 130A and/or the mouse 130B in images collected by the image sensor(s) 142. In some implementations, the user interaction with the keyboard 130A and/or the mouse 130B may be detected based on commands detected at the keyboard 130A and/or the mouse 130B and received by the computing system 100. Based on the detected interaction, and detected position/orientation of the keyboard 130 and/or the mouse 130B and/or alignment with, for example, the second display device 140B in the exemplary arrangement shown in FIG. 4E, the system may set (e.g., automatically set), for example, the second display device 140B as the primary display device, as shown in FIG. 4F. In this way, interaction of the keyboard 130 and/or the mouse 130B (or any other auxiliary device) with the plurality of display devices may be controlled. For example, the processing and management of the mouse and/or keyboard (or other) input at the computing device may be adjusted in response to changing the primary display device, and/or the display of content may be correspondingly controlled.

In the examples shown in FIGS. 4A-4F, the second display device 140B is set as the primary display device, simply for ease of discussion and illustration. Similar principles may be applied in setting, for example, automatically setting, one of the other display devices 140 as the primary display device base on similar information collected by the sensor9s) 142, 144. In some implementations, the system may set, for example, intelligently set, or set without user intervention, or dynamically set, or automatically set, positional information for the remaining display devices 140 based on, for example, the setting of the primary display device, user history, set user preferences, current content displayed on the respective display device, and the like.

In some implementations, dynamically (or automatically) defining display settings can include, for example, defining a display setting at a first time in response to first positional information, and modifying the display setting in response to second position information at a second time. The modifying the display setting can be performed without a user modifying the display setting. The change in the positional information can be in response to an interaction of the user with one or more display devices.

Figure 5A:
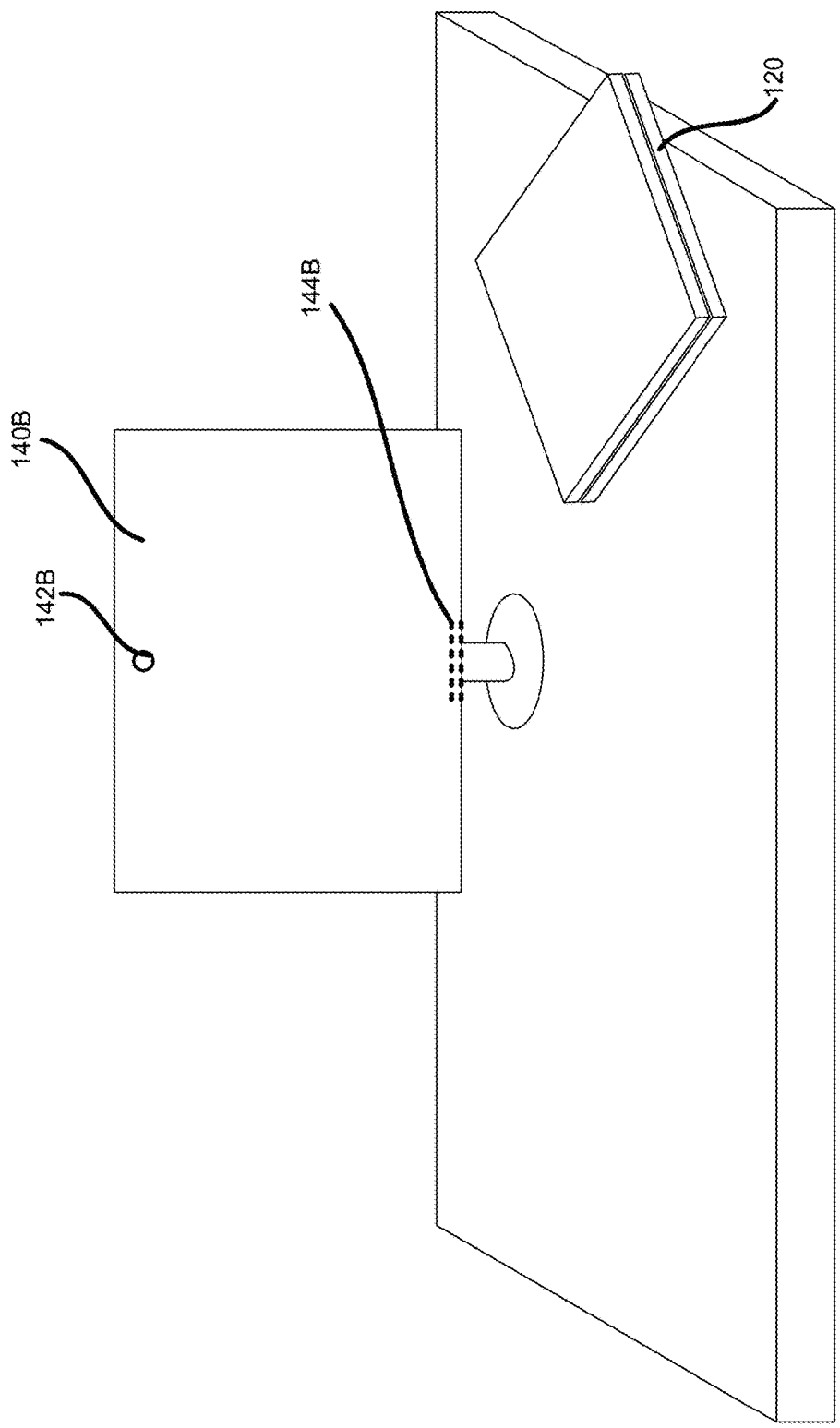
FIGS. 5A-5F illustrate movement of display content in a computing system including multiple display devices, in accordance with implementations described herein.
Figure 5B:
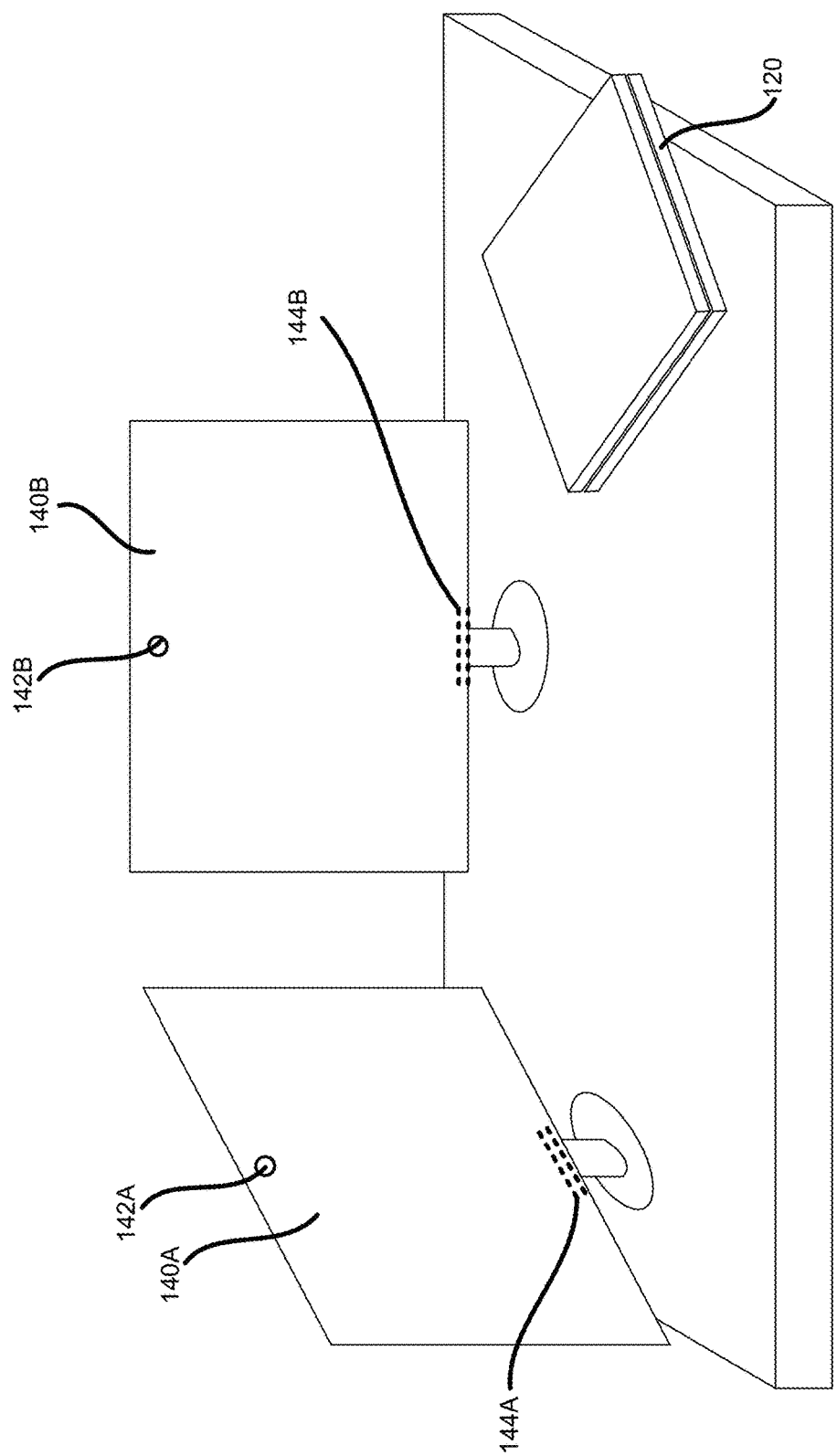
Figure 5C:
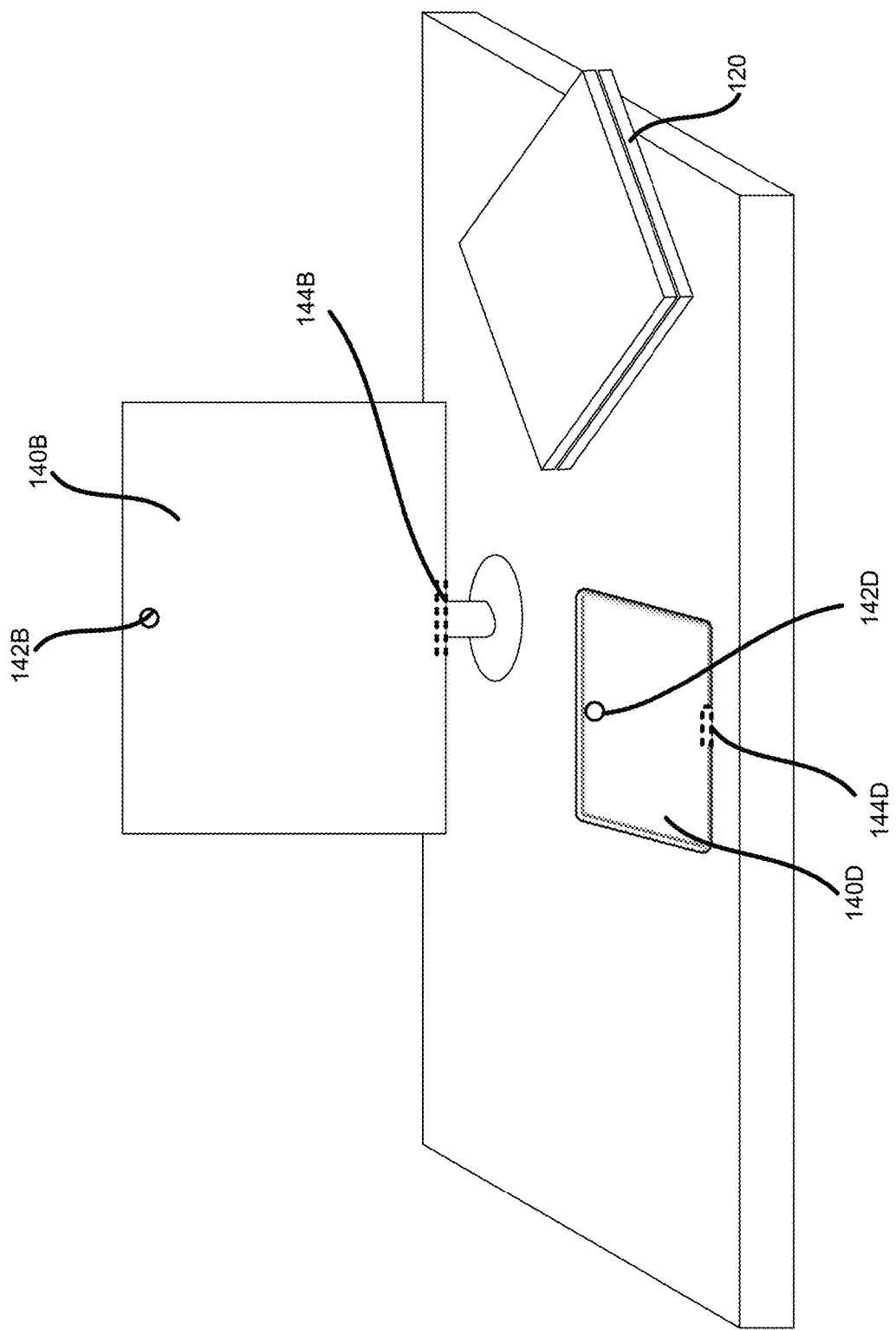

In some implementations, the computing system 100 may detect, for example, intelligently detect, or detect without user intervention, or dynamically detect, or automatically detect, when another display device 140 is introduced, or within a specified range of the computing device 120, and can be added as an auxiliary display device 140 for displaying content processed by the computing device 120. By detecting the addition of an auxiliary display device, interaction of the auxiliary display device 140 with the existing display device 140 can be controlled. For example, the auxiliary display device 140 can be operably coupled to the computing device 120 based on the detection and settings or configurations updated to reflect the addition of this display device 140; interaction of input or output devices with the display devices 140 can also be controlled in dependence on this detection. In the exemplary arrangement shown in FIG. 5A, the computing device 120 is operably coupled to the display device 140B. As shown in FIG. 5B, the display device 140A may be connected, or operably coupled, to the computing device 120 so as to communicate with the computing device 120 and the already coupled display device 140B, and serve as an auxiliary display device in the computing system 100. As described above, the system may detect, for example, dynamically detect, or intelligently detect, or detect without user intervention, or automatically detect, the connection of the display device 140A. This may be detected based on, for example, detected physical connection of the display device 140A, detected wireless connection of the display device 140A, detection by the sensor(s) 142 of the already connected display device 140B and the like. Similarly, a physical position of the newly connected display device 140A may be detected as described above, based on, for example, information collected by the sensor(s) 142, 144 of each of the display devices 140. Similarly, as shown in FIG. 5C, the system may detect, for example, dynamically detect, or intelligently detect, or detect without user intervention, or automatically detect, the mobile display device 140D in communication with, or within range of, the computing device 120, so that the mobile display device 140D may serve as an auxiliary display device.

Figure 5D:
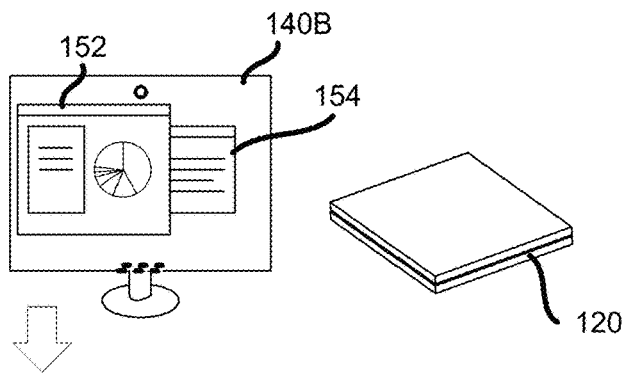
Figure 5D:
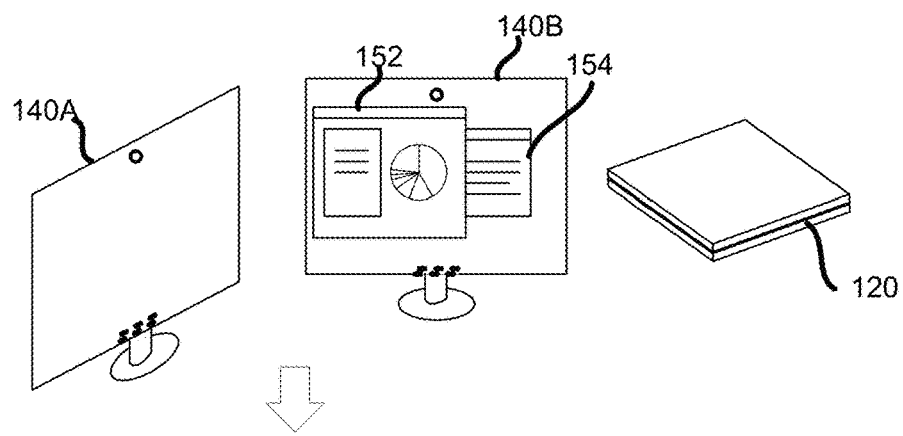
Figure 5D:
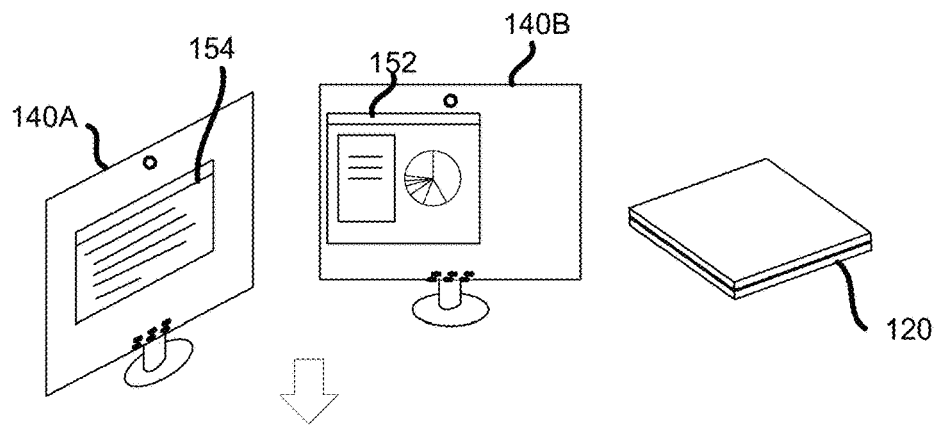
Figure 5D:
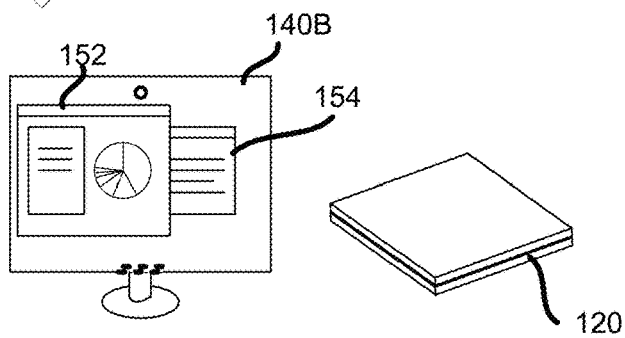

As described above, in some implementations, after detecting the addition of the display device(s) 140A and/or 140D the system may a dynamically detect, or intelligently detect, or detect without user intervention, or automatically detect and assign display settings including, for example, assigning one of the display devices 140 as the primary display. In some implementations, the system may dynamically distribute, or transfer, content to be displayed on each of the connected display devices 140, based on the known physical position and/or orientation of each of the display devices 140, without user intervention. For example, as shown in FIG. 5D, content 152, 154 displayed on the previously connected display device 140B may be distributed (e.g., dynamically distributed) between the display devices 140A and 140B after detection of the connection, position and orientation of the display device 140A as described above. That is, as shown in FIG. 5D(1), a first content window 152 and a second content window 154 are displayed on the display device 140B. As display device 140A is introduced into the computing system 100 and operably coupled to the computing device 120, as shown in FIG. 5D(2), the relative position and orientation of the display device 140A and determination/assignment of display settings as described above may be used to distribute displayed content as shown in FIG. 5D(3). For example, as shown in FIGS. 5D(1) through 5D(3), the first content window 152 and the second content window 154 may both be displayed on the second display device 140B, and then, in response to detection of the first display device 140A, display content may be dynamically distributed so that the second content window 154 is displayed on the first display device 140A, and the first content window 152 is displayed on the second display device 140B. Similarly, if the system detects removal of one of the display devices 140, such as, for example, disconnection of the display device 140A, the display of content 150 (for example, the content windows 152, 154) may revert to the currently connected display device 140B, as shown in FIG. 5D(4). That is, as shown in FIGS. 5D(3) and 5D(4), in response to a detected removal of the first display device 140A, display content may be dynamically distributed so that both the first content window 152 and the second content window 154 are displayed on the second display device 140B. The disconnection of the display device 140 may be detected, for example, dynamically detected without user intervention, at least in part by movement data collected by one or more position sensors 144 associated with the display device 140, and/or by the operable coupling of the display device 140 to the computing device 120. The exemplary display device 140A shown in FIG. 5D is illustrated as a standalone monitor, simply for ease of discussion and illustration. However, the principles described may be applied to the detection of a mobile display device (such as the exemplary mobile display device 140D described above) and distribution of display content in a similar manner, based on a detected position and orientation of the display devices 140.

For example, in some implementations, the connection of a new display device 140 (for example, a new standalone display device, a mobile device and the like) may be detected by the computing system based on a proximity to the computing device 120, based on a wired or wireless connection to the computing device 120, and the like. In some implementations, the computing device 120 may dynamically detect a previously associated display device 140 that has been previously associated with the computing device 120/computing system within a given range, establish a connection with the newly detected display device 140, and dynamically distribute, or re-distribute, display content amongst the connected display devices 140. In some implementations, the computing device 120 may periodically, or substantially continuously, scan within a certain distance or range to detect new display devices 140, may establish a connection with the newly detected display device(s) 140, and may dynamically distribute, or re-distribute, display content amongst the connected display devices 140. In some implementations, the computing device 120 may detect a new display device 140 based on a detected docking in a docking station, via a hub, and the like, may establish a connection with the newly detected display device 140, and may dynamically distribute, or re-distribute, display content amongst the connected display devices 140. In some implementations, the computing system may detect the presence of a new display device 140 as described above, but may detect that a display surface of the detected display device 140 is oriented away from a workspace associated with the computing device and currently connected display devices 140, and will not associate the newly detected display device 140 with the computing device 120 and/or will not distribute/re-distribute content to the newly detected display device 140.

Figure 5E:
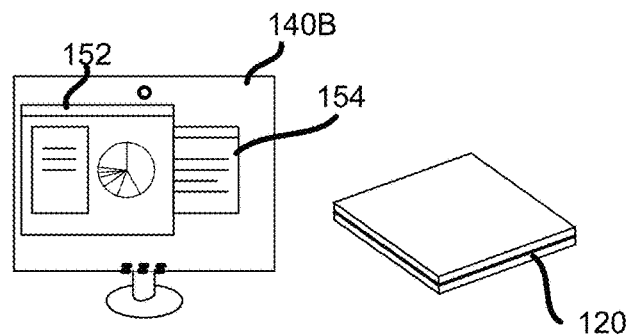
Figure 5E:
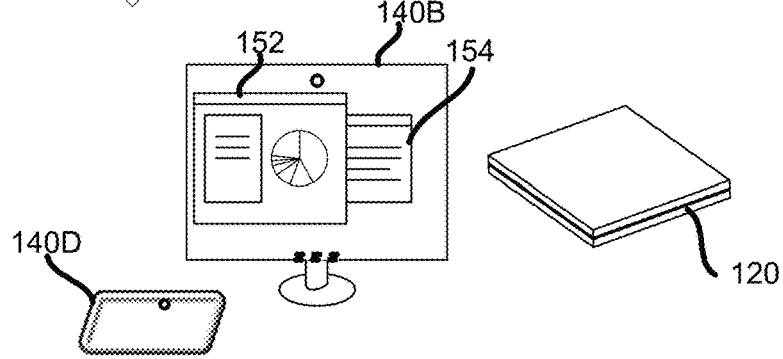
Figure 5E:
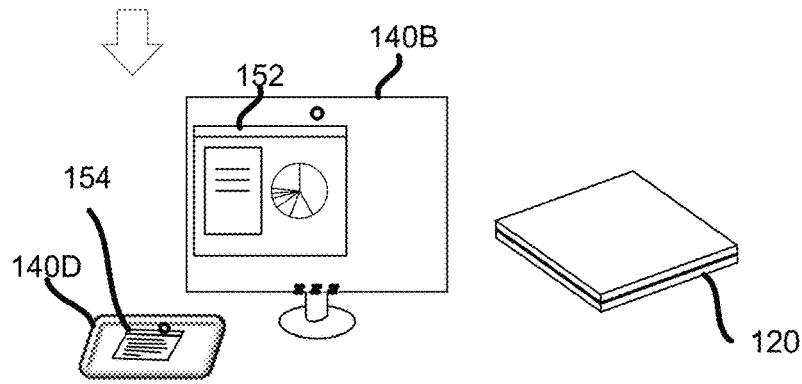
Figure 5E:
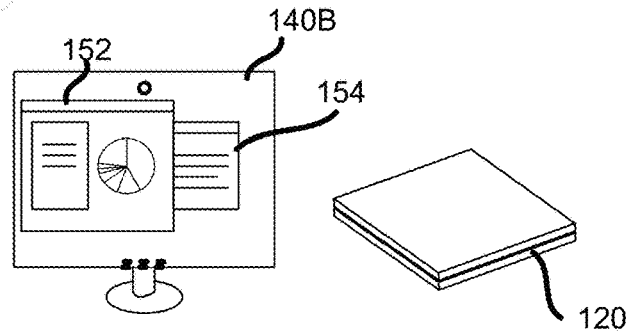

For example, as shown in FIG. 5E(1), first and second content windows 152 and 154 are displayed on the display device 140B. As the mobile display device 140D is introduced or added into the computing system 100 and operably coupled to the computing device 120, as shown in FIG. 5E(2), the relative position and orientation of the mobile display device 140D and determination/assignment of display settings as described above may be used to distribute displayed content, as shown in FIG. 5E(3). That is, as shown in FIGS. 5E(1), the first content window 152 and the second content window 154 may both be displayed on the second display device 140B. In response to detection of the mobile display device 140B connected in the computing system, display content may be dynamically distributed so that the first content window 152 is displayed on the second display device 140B, and the second content window 154 is displayed on the mobile display device 140D, as shown in FIG. 5E(3). Similarly, in response to a detected removal of the mobile display device 140D, display content may be dynamically re-distributed so that both the first content window 152 and the second content window 154 are displayed on the second display device 140B, as shown in FIG. 5E(4). Interaction of other auxiliary devices with these display devices 140 may also be controlled in response to the introduction of mobile display device 140D. Similarly, if the system detects removal of one of the display devices 140, such as, for example, disconnection of the mobile display device 140D, the display of content 150 (for example, the content windows 152, 154) may revert to the currently connected display device 140B, as shown in FIG. 5E(4). In this way, display of content may be controlled based on the detected physical positions of the displays. The disconnection of the mobile display device 140D may be detected at least in part by movement data collected by one or more position sensors 144 associated with the display device 140, and/or by the operable coupling of the display device 140 to the computing device 120. Such movement data may be collected by any position sensor 144 of any of the display devices 140, as appropriate, and the display settings which control the display of content automatically configured in dependence on detecting movement of at least one display device of the plurality of display devices 140.

Figure 5F:
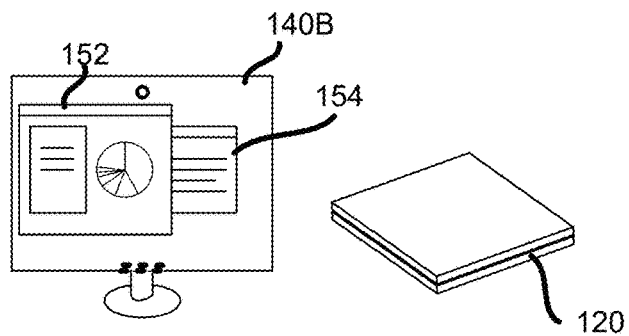
Figure 5F:
Figure 5F:
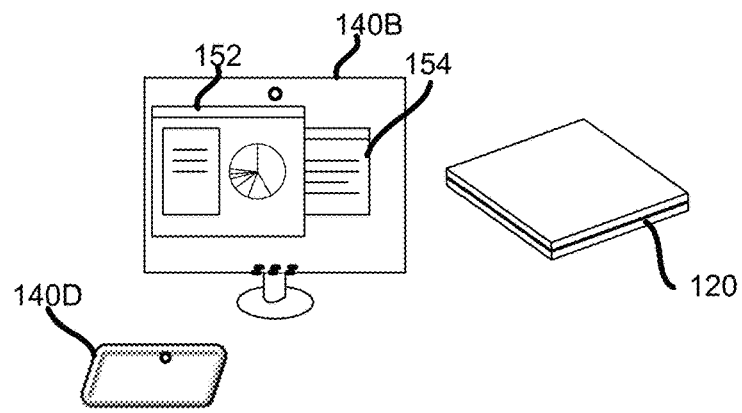
Figure 5F:
Figure 5F:
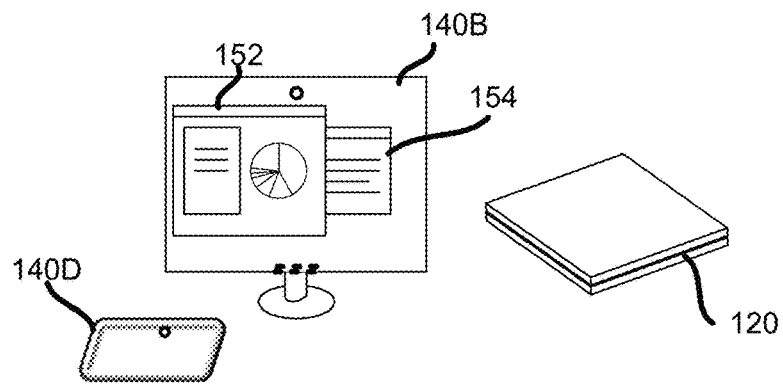

In some implementations, after displaying the content windows 152, 154 on the display device 140B and detecting connection of the mobile display device 140D, as shown in FIGS. 5F(1) and 5F(2), the system may, in some situations, determine that the content displayed on the display device 140B should remain displayed on the display device 140B, and not be re-distributed for display on the mobile display device 140D. In this situation, the mobile display device 140D may remain connected to the computing system 100/computing device 120, and may remain available as an auxiliary display device 140, while the content windows 152, 154 remain displayed on the display device 140B, as shown in FIG. 5F(3).

In some implementations, the computing system/computing device may determine, for example, intelligently determine how to distribute and/or re-distribute display content based on, for example, types of content, orientation of the connected display devices 140 and the like. For example, in some implementations, the computing device 120 may keep productivity related content, content windows that are currently in use by the user, and the like positioned on a vertically oriented display device 140, on the display device 140 that has been assigned or designated as the primary display device 140 and the like. In some implementations, the computing device 120 may distribute, or re-distribute content to a horizontally oriented display device 140 that may be manipulated using a stylus or other graphics related input implement. In some implementations, the computing device 120 may determine that the user is not interacting with/has not interacted with certain display content, and may distribute, or re-distribute that display content from the primary display device 140 to one of the other display device(s) 140 (horizontally oriented or vertically oriented).

As noted above, the information collected by the sensor(s) 142, 144 may be used to determine physical positions and/or orientations of the display devices 140, and positions/orientations of the display devices 140 relative to each other, in the real world environment. In some implementations, these known physical positions and/or orientations of the display devices 140 may be used to determine spaces, or gaps, or non-display areas between display devices 140. These non-display areas may be taken into consideration when assigning display settings, when moving content and the like, to provide the user with a more intuitive, connected experience.

Figure 6A:
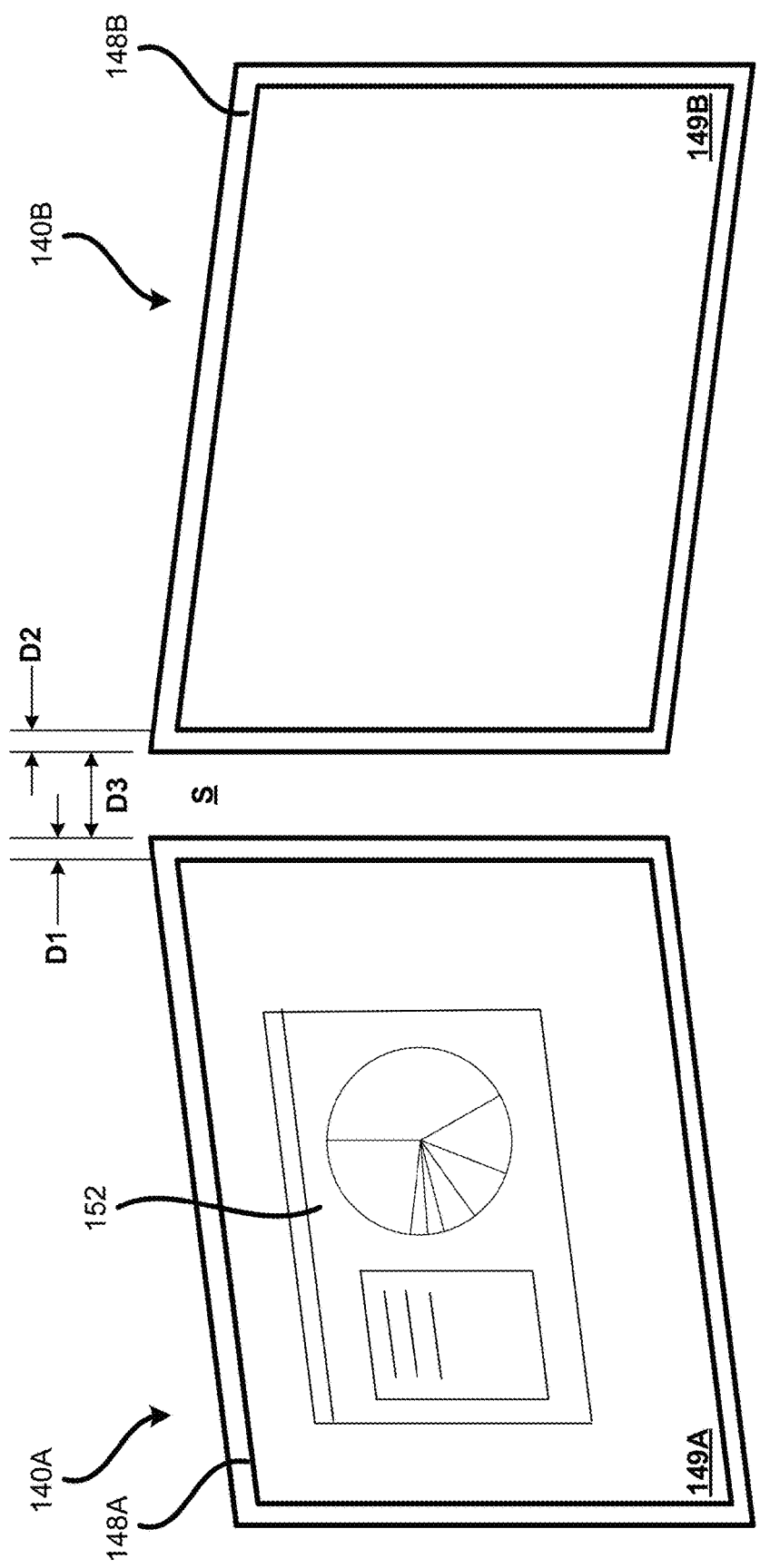
FIGS. 6A-6H illustrate movement of display content in a computing system including multiple display devices, in accordance with implementations described herein.

For example, as shown in FIG. 6A, in some implementations, a physical space S, or a gap S, or a non-display area S, may be formed between the first display device 140A and the second display device 140B. The physical gap or space S between the first and second display devices 140A, 140B may define a non-display area having a distance D3. In some implementations, the first display device 140A may have a bezel 148A surrounding a display area 149A of the first display device 140A. The bezel 148A of the first display device 140A may define a non-display area having a distance D1. In some implementations, the second display device 140B may have a bezel 148B surrounding a display area 149B of the first display device 140B. The bezel 148B of the second display device 140B may define a non-display area having a distance D2. Because the relatively precise physical position and/or orientation of each of the display devices 140 may be known as described above, each of the exemplary non-display areas shown in FIG. 6A may be taken into account when setting/assigning display settings, moving content between display devices 140 (for example in response to user manipulation of one of the input devices 130). In this way, display of content may be controlled based on the detected physical positions of the display devices 140. Taking these non-display areas into account when moving content may provide for more intelligent window managers, which can provide the user with a more intuitive, connected interaction with the content displayed on the display devices 140.

Figure 6B:
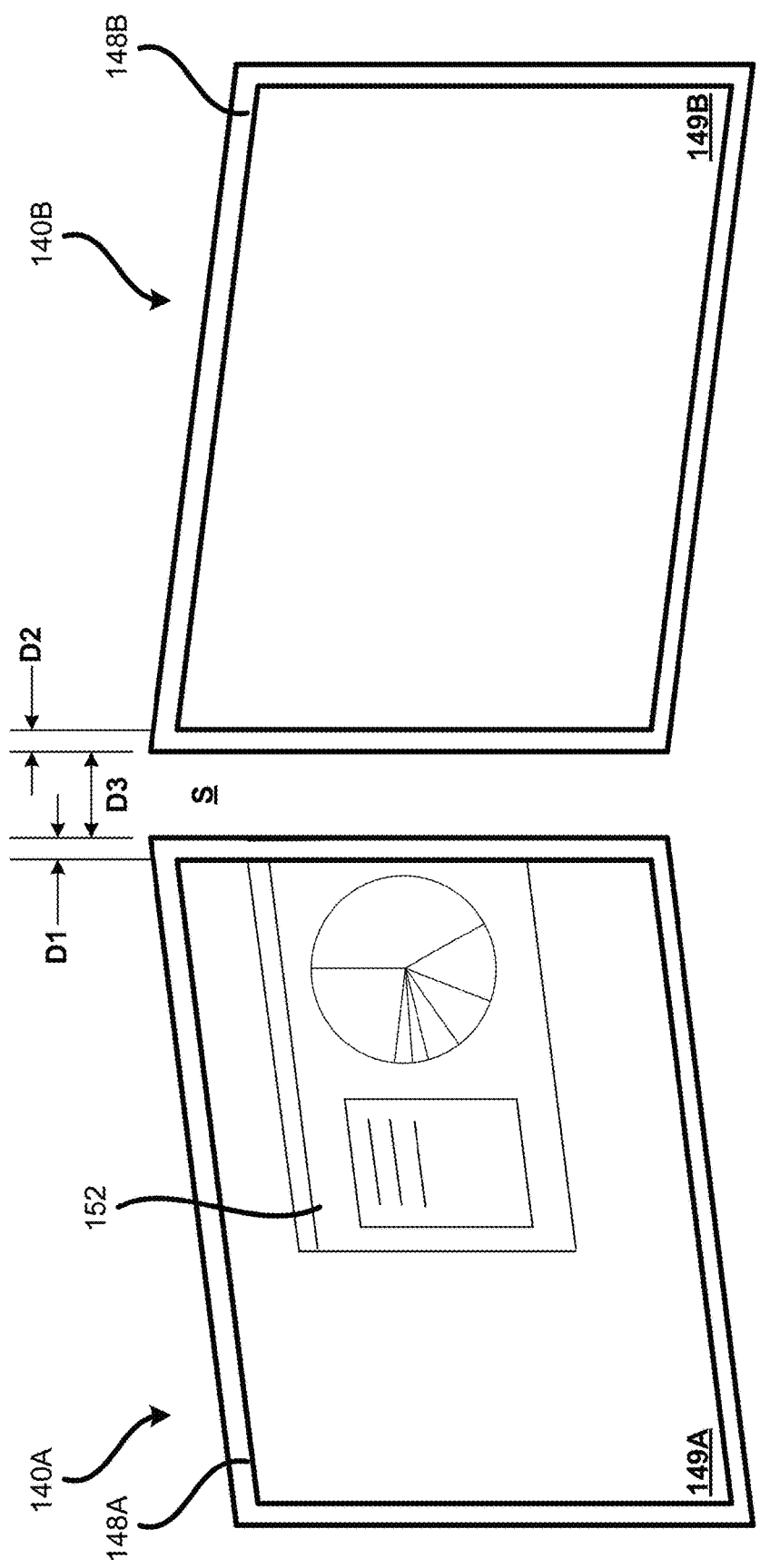
Figure 6C:
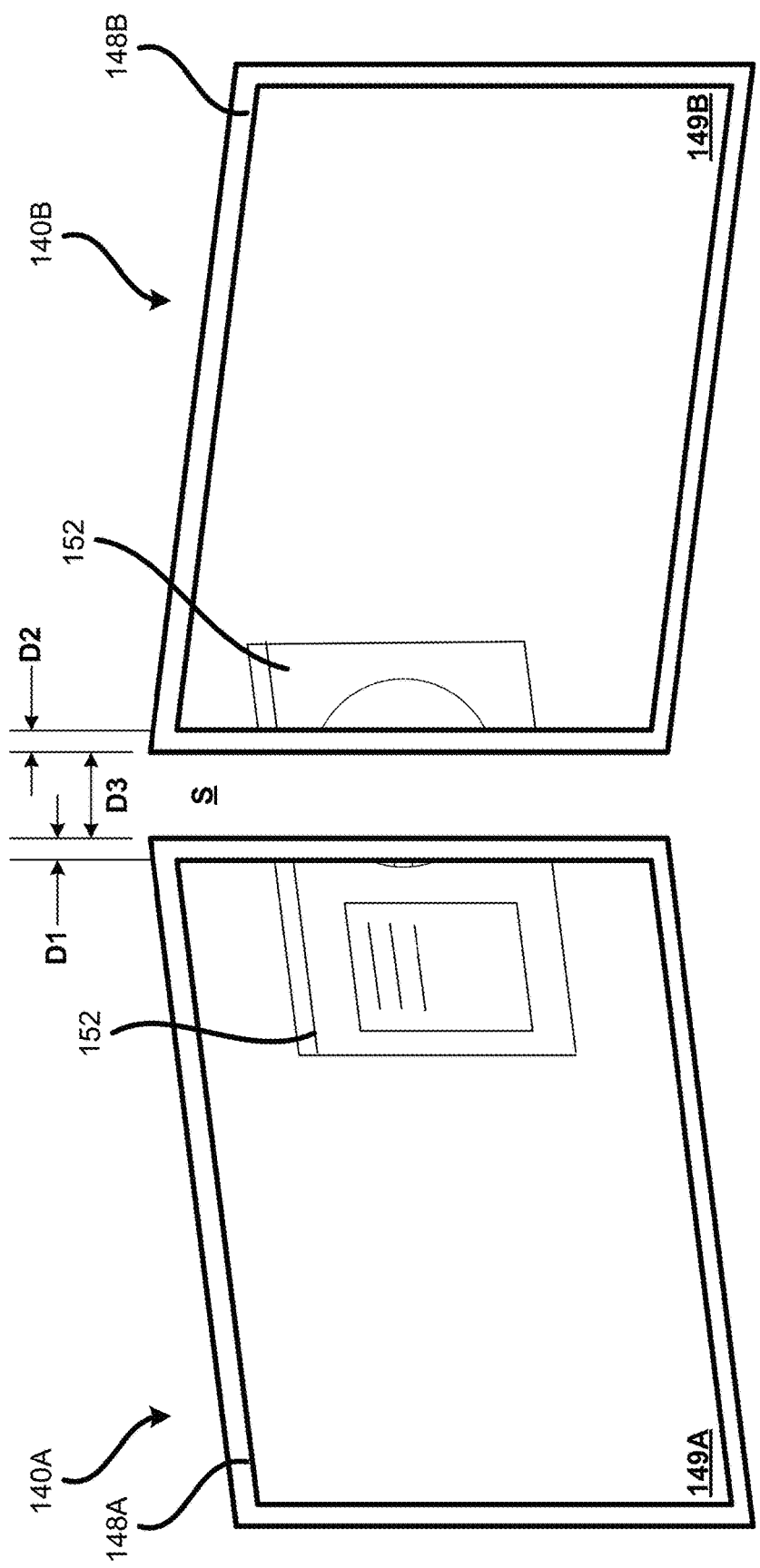
Figure 6D:
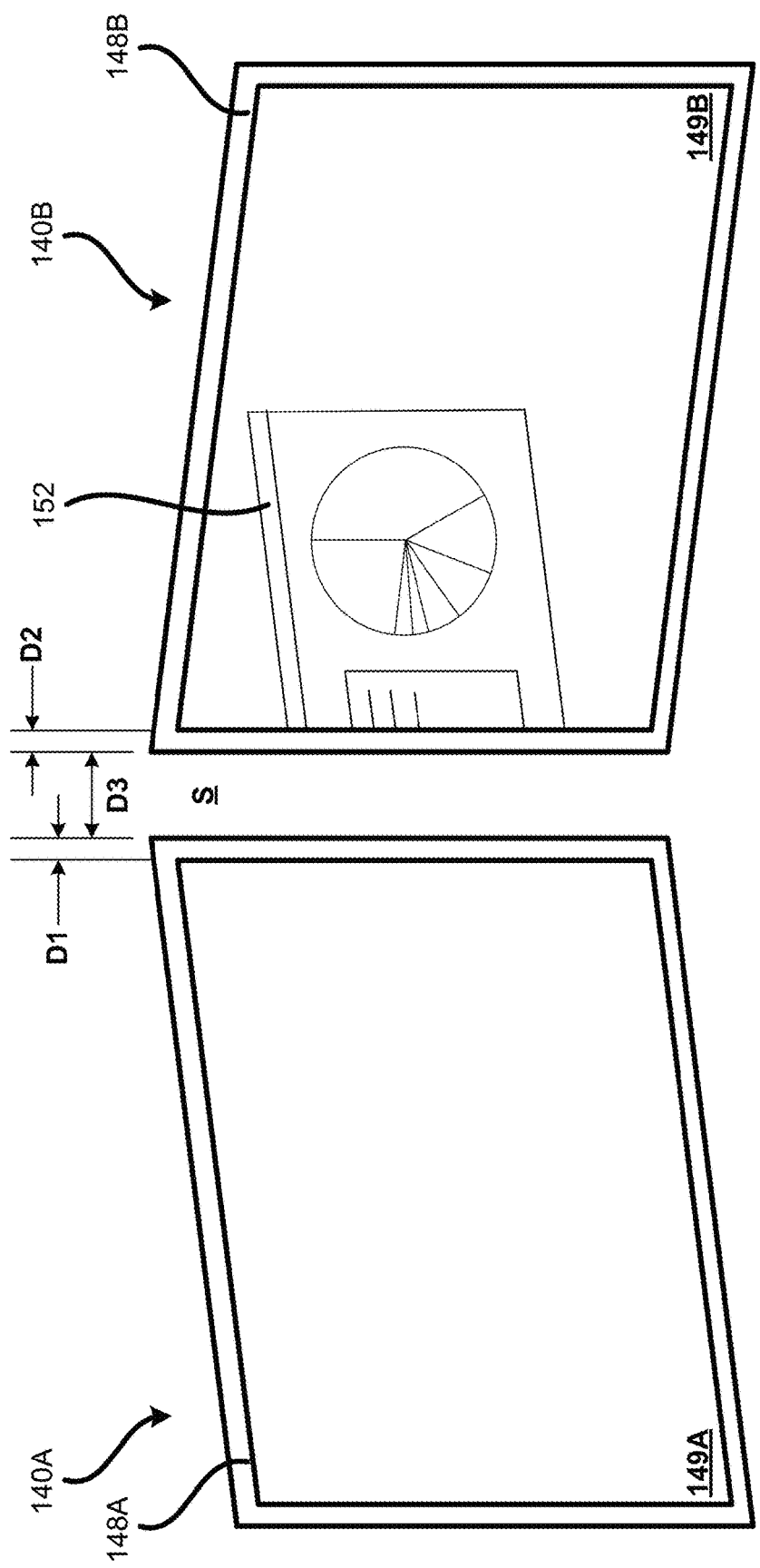
Figure 6E:
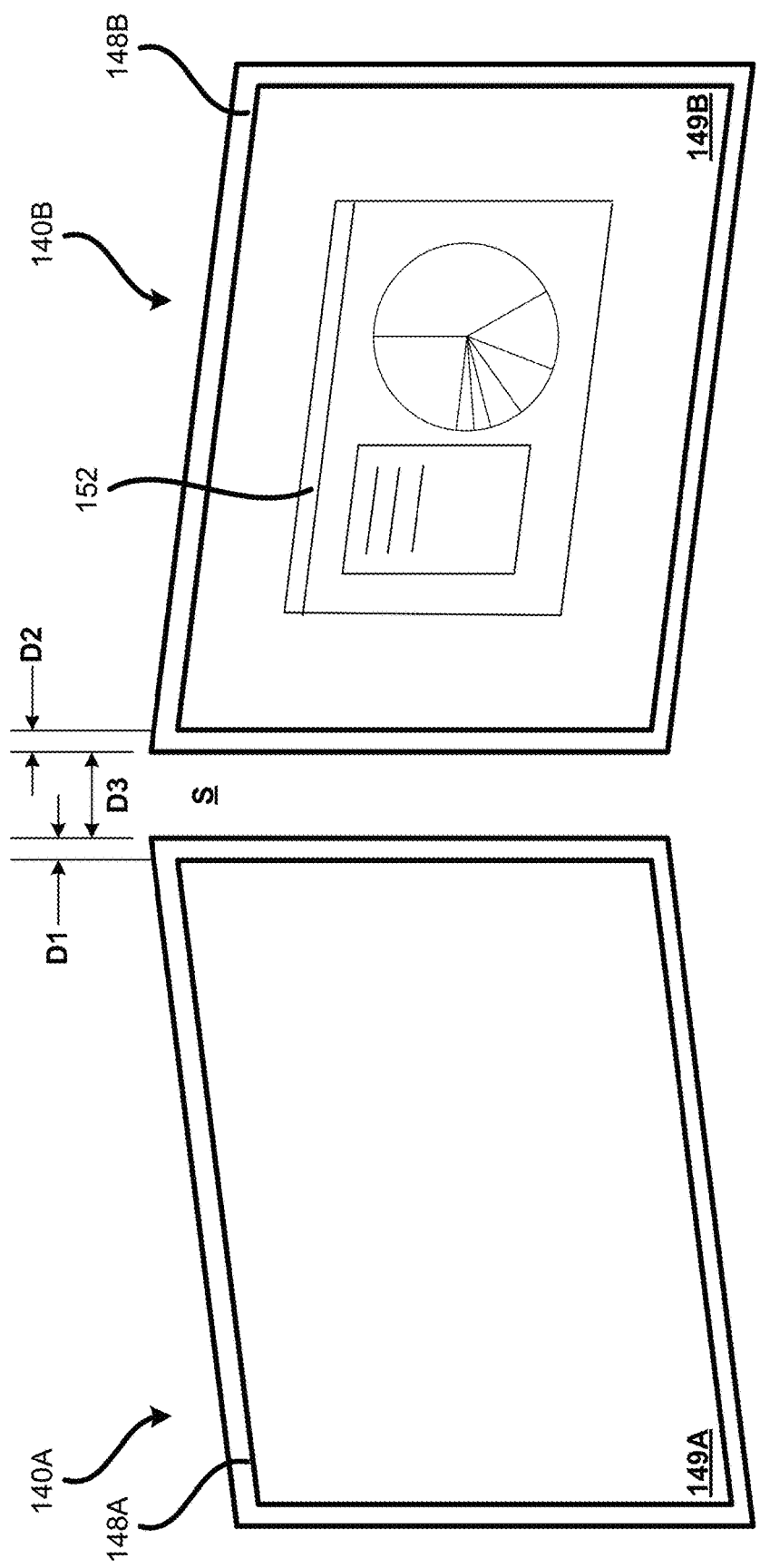
Figure 6F:
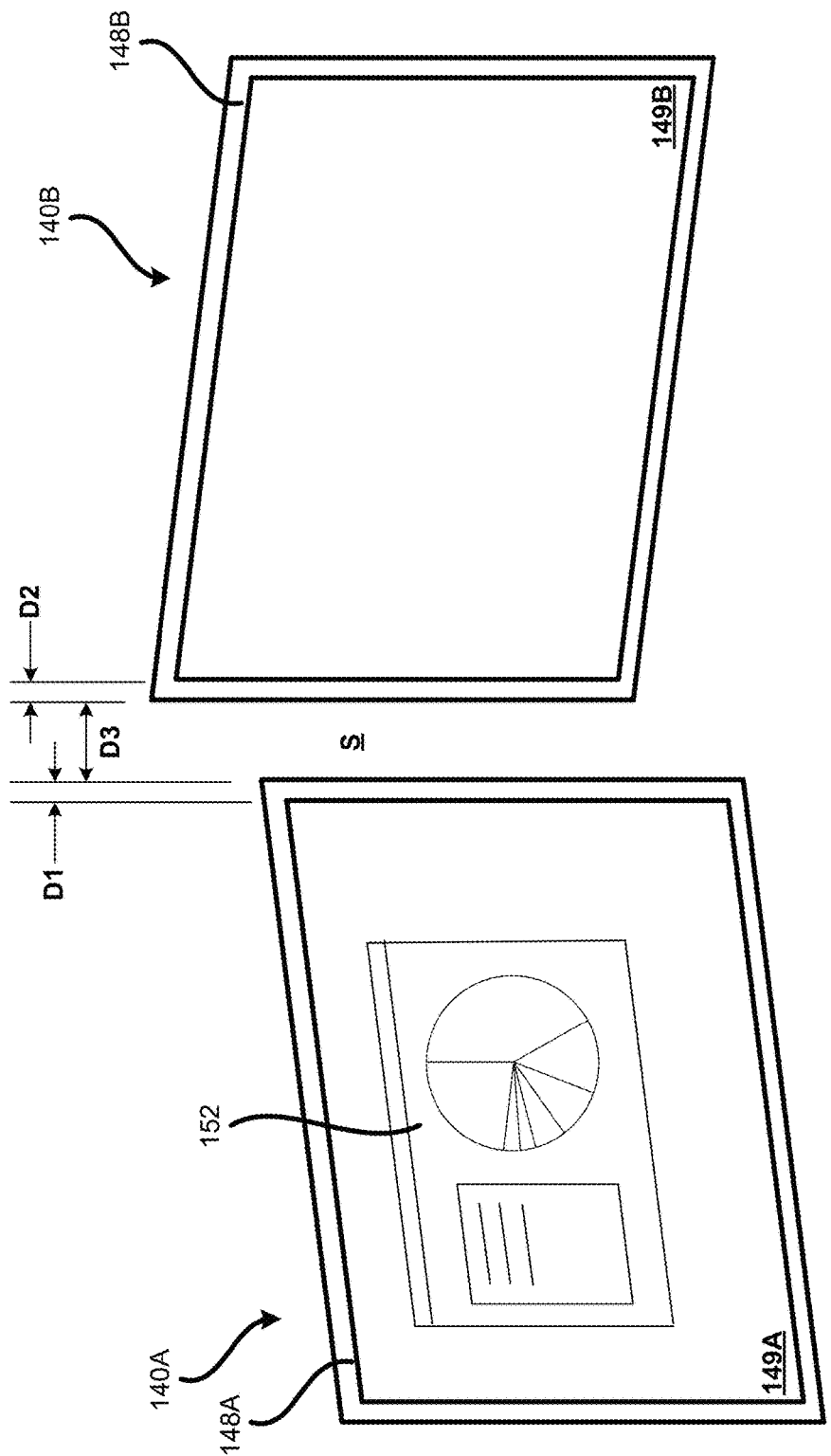

For example, as shown in FIGS. 6B, 6C and 6D, in some implementations, as the content window 152 is moved from the display area 149A of the first display device 140A to the display area 149B of the second display device 149B, portions of the content window 152 corresponding to the non-display areas (i.e., the physical space S between the display devices 140A, 140B, as well as any bezels 148 associated with the display devices 140A, 140B) are not displayed. This accounting for the non-display areas, which is enabled by the known physical position and/or orientation of the display devices 140, may provide a more realistic experience in moving content from the first display device 140A to the second display device 140B. That is, in some implementations, based on the known physical position and/or orientation of each of the display devices 140, movement of content between, for example, adjacent display devices, such as, for example, movement of the content window 152 between the first display device 140A and the second display device 140B as described with respect to FIGS. 6A-6D, may be delayed to take the physical space S, or gaps, between the adjacent display devices 140 in to account. In some implementations, the content window 152 may maintain an orientation of the originating (first) display device 140A until the content window 152 is fully moved to the new (second) display device 140B, as shown in FIGS. 6B-6D. Once the content window 152 has fully moved to the new (second) display device 140B, the orientation of the content window 152 may correspond to that of the new (second) display device 140B, as shown in FIG. 6E. Maintaining the orientation of the content window 152 corresponding to that of the originating display device 140 until the display window is fully transitioned may allow the user to maintain awareness of the origination of, and deliberate movement of, the content window 152. Control may therefore be improved in a multi-screen environment.

Figure 6G:
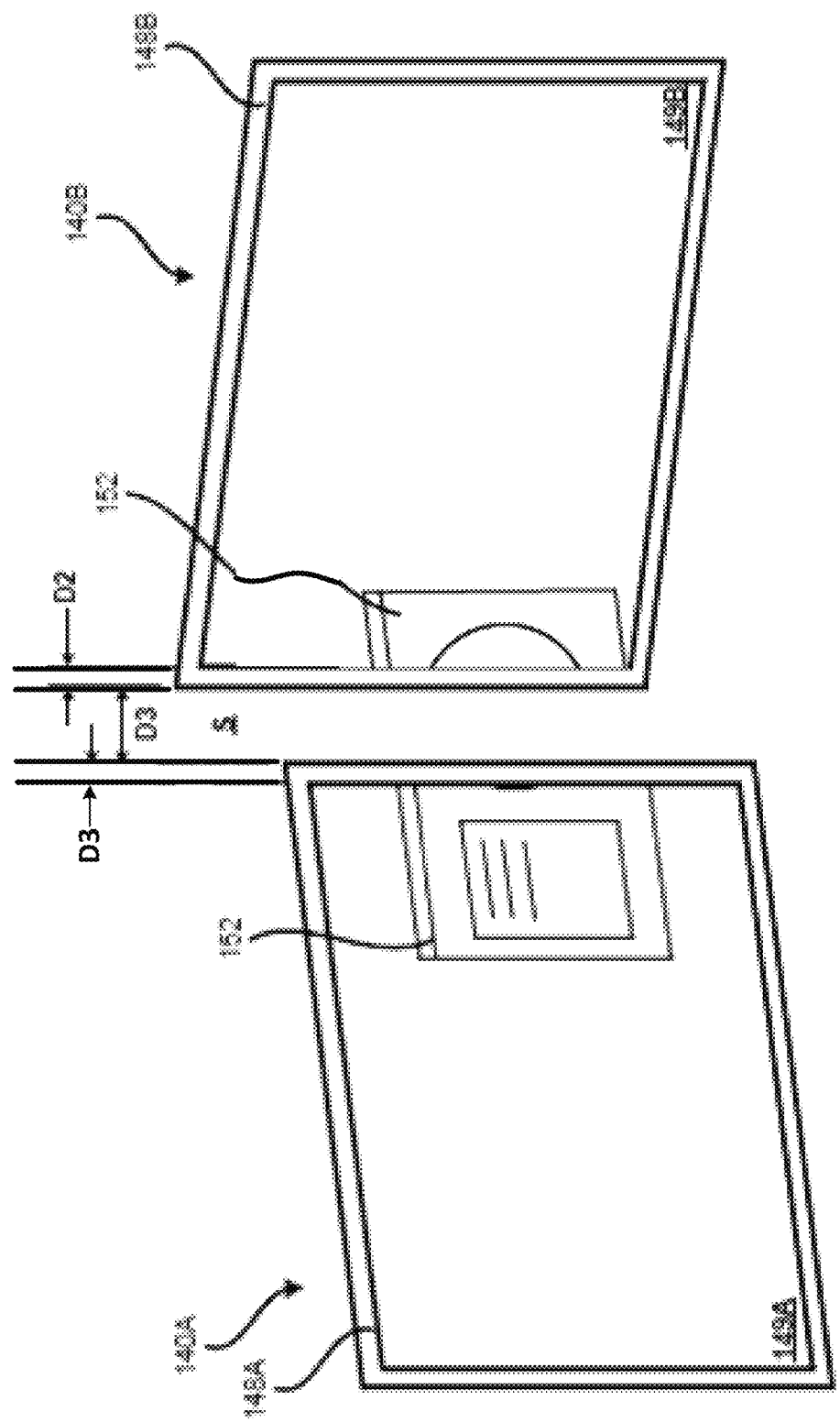
Figure 6H:
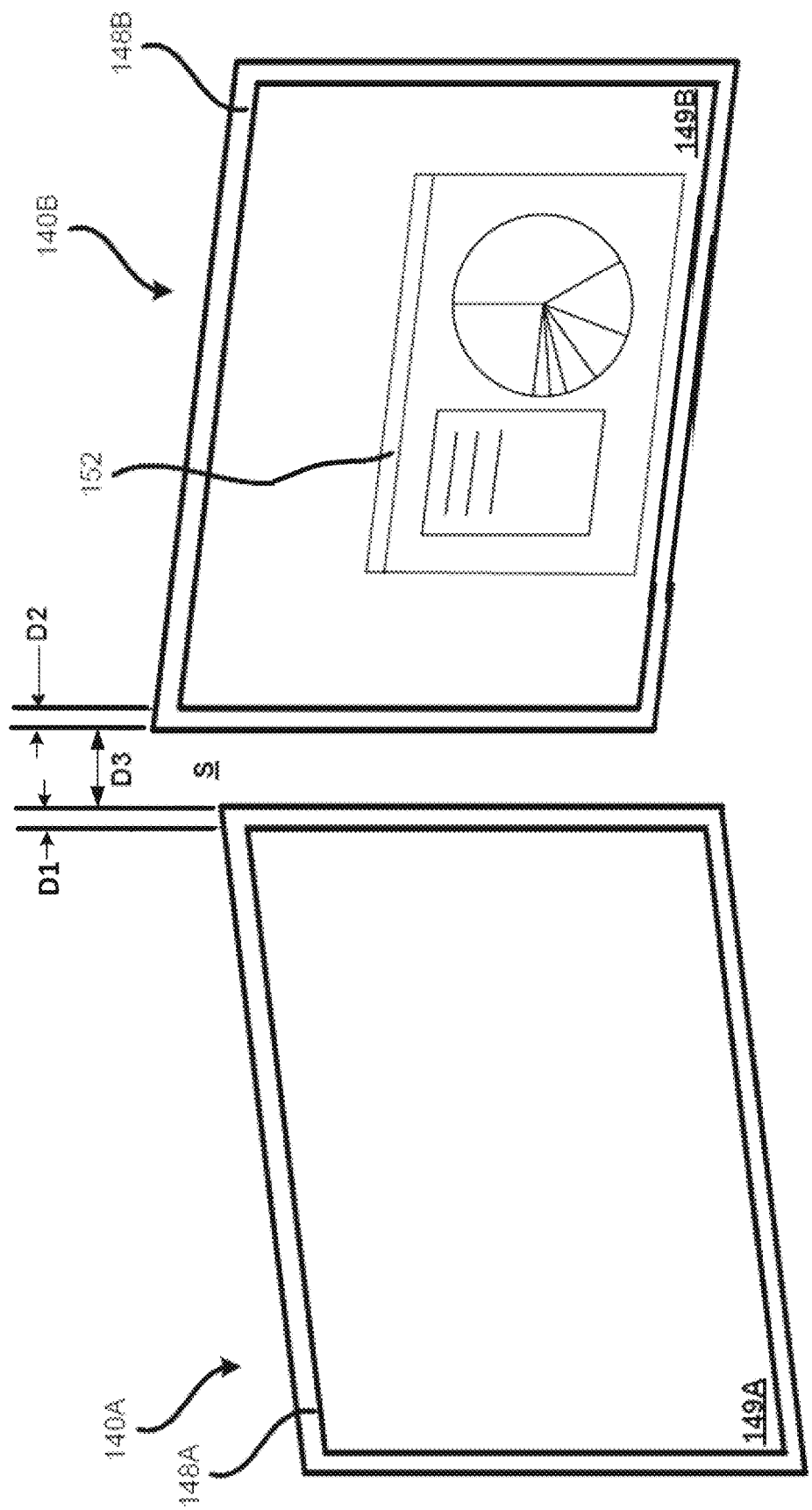

In some implementations, display devices 140 may be physically aligned, for example, horizontally aligned, or vertically aligned. For example, FIGS. 6G and 6H illustrate an example in which the first display 140A and the second display 140B are not horizontally aligned. In this example, as the content window 152 is moved from the display area 149A of the first display device 140A to the display area 149B of the second display device 149B, portions of the content window 152 corresponding to the non-display areas (i.e., the physical space S between the display devices 140A, 140B, as well as any bezels 148 associated with the display devices 140A, 140B) are not displayed, as shown in FIG. 6G. This accounting for the non-display areas, which is enabled by the known physical position and/or orientation of the display devices 140, may provide a more realistic experience in moving content from the first display device 140A to the second display device 140B. In some implementations, the content window 152 may maintain an orientation of the originating (first) display device 140A until the content window 152 is fully moved to the new (second) display device 140B, as shown in FIG. 6G. Once the content window 152 has fully moved to the new (second) display device 140B, the orientation of the content window 152 may correspond to that of the new (second) display device 140B, as shown in FIG. 6H. Maintaining the orientation of the content window 152, as well as the horizontal positioning of the content window 152, corresponding to that of the originating display device 140 until the content window 152 is fully transitioned may allow the user to maintain awareness of the origination of, and deliberate movement of, the content window 152. Control may therefore be improved in a multi-screen environment.

Figure 7A:
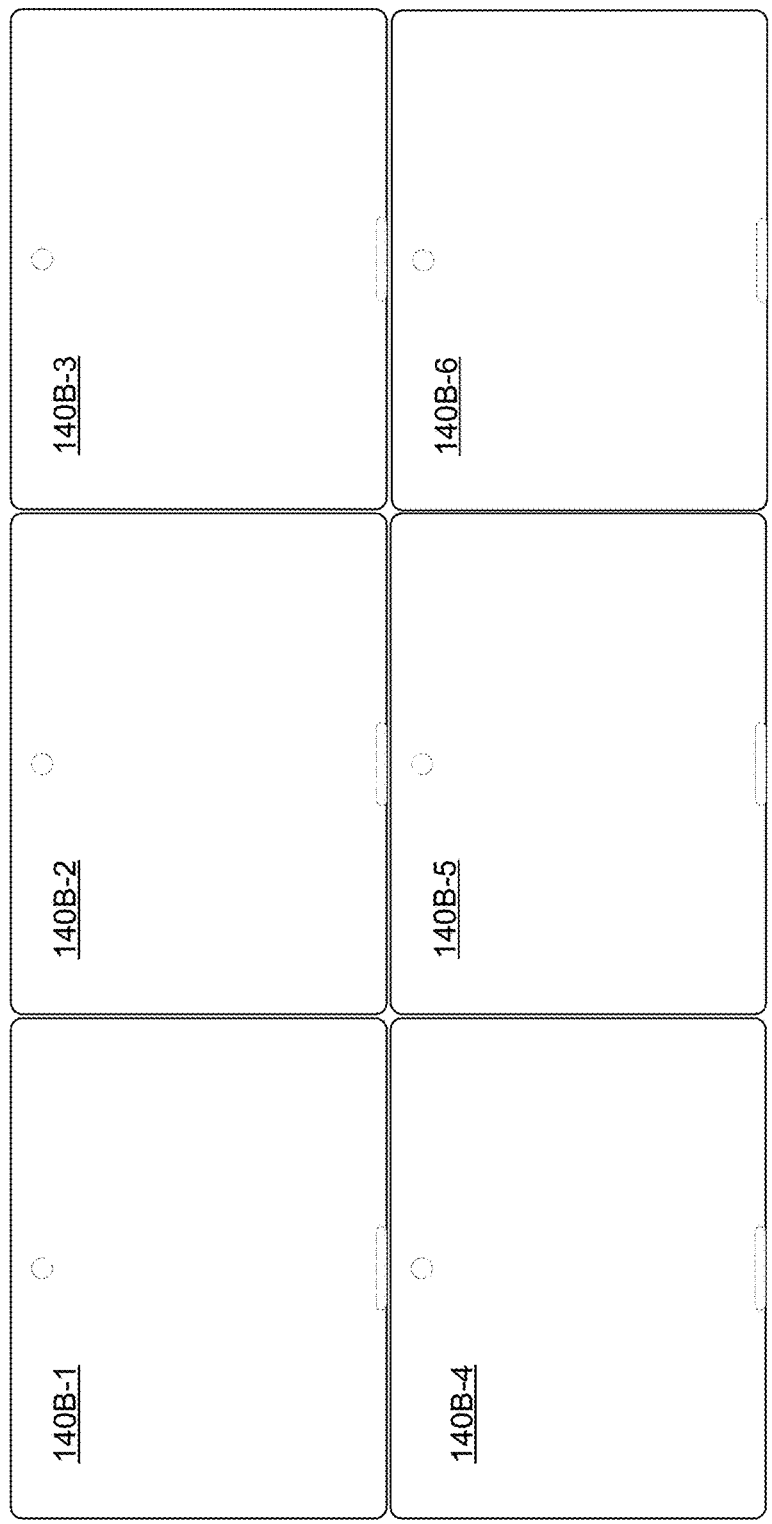
FIGS. 7A-7C illustrate an exemplary arrangement of an exemplary computing system, in accordance with implementations described herein.
Figure 7B:
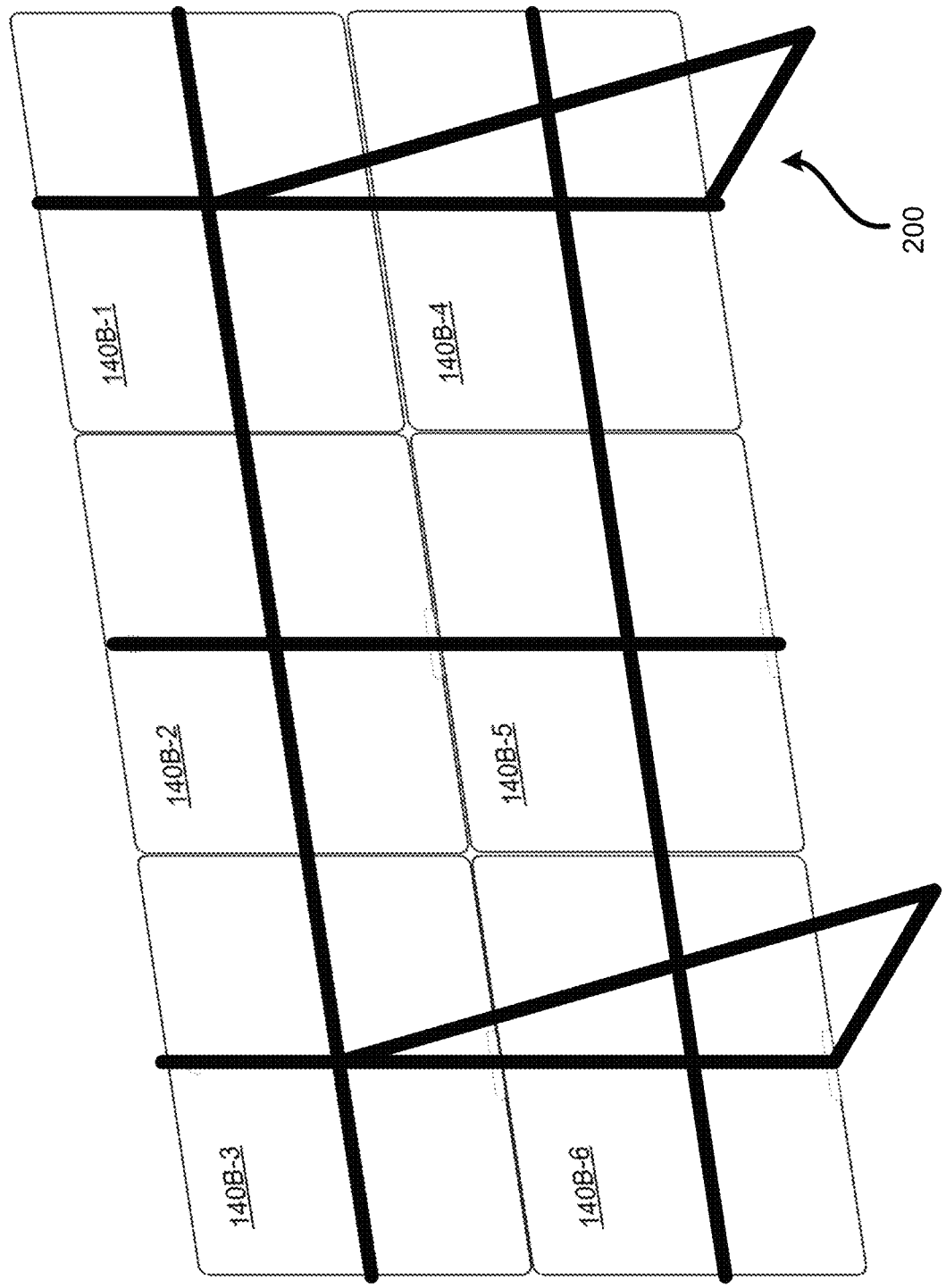
Figure 7C:
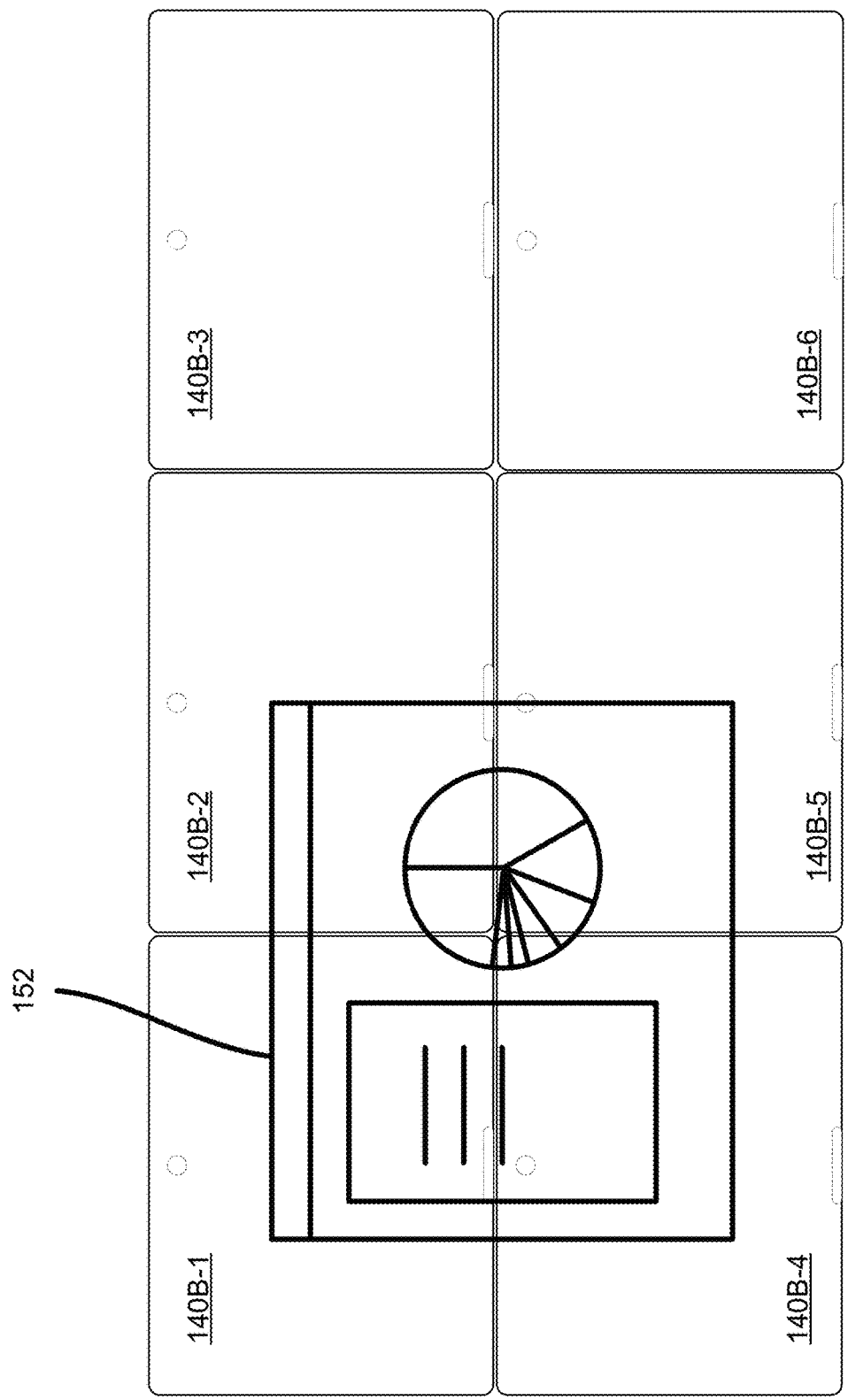

In some implementations, a plurality of mobile display devices may be joined together to form a single, larger display. The generally smaller, more portable form factor of mobile display devices (such as, for example, provided by a tablet computing device) may allow a larger display device to be assembled from the more compact, portable display devices. For example, as shown in FIG. 7A, in some implementations, multiple mobile display devices 140D may be positioned near (e.g., adjacent) to each other to form an essentially single, relatively large display device from the multiple smaller mobile display devices 140D, as shown in FIG. 7C. In the example shown in FIG. 7A, six mobile display devices 140D are included, simply for purposes of discussion and illustration. However, more, or fewer, mobile display devices 140D may be positioned adjacent to each other in this manner to essentially form a single display device. Similarly, the exemplary arrangement of six mobile display devices 140D shown in FIGS. 7A-7C are arranged in an array, simply for ease of discussion and illustration. In some implementations, the mobile display devices 140D may be coupled in other arrangements to define the essentially single, relatively large display device shown in FIG. 7C. As shown in the rear view of the arrangement of mobile display devices 140B illustrated in FIG. 7B, in some implementations, a frame 200 may physically couple the mobile display devices 140B to restrict movement of the single display device formed from the multiple display devices 140B, and to allow the single display device to be positioned in a substantially vertical position. In this manner, one or more content windows may be continuously (e.g., substantially continuously) displayed across the multiple mobile display devices 140B arranged in this manner, in response to the known position and/or orientation of each of the mobile display devices 140B. By integrating control of the rendered content within a single intelligent windows manager in the manner described herein, such arrangements of display devices may be more easily managed.

Figure 8A:
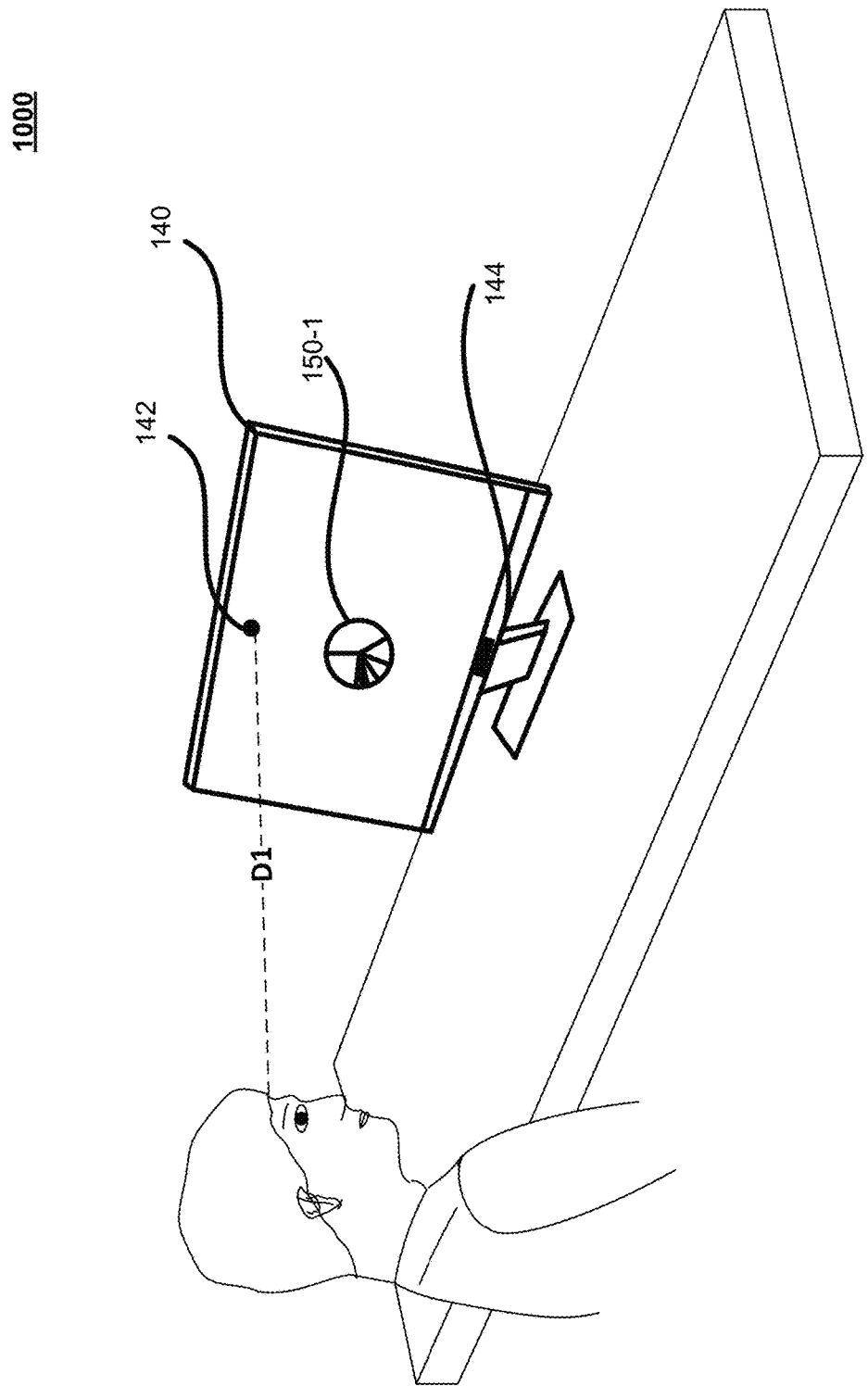
FIGS. 8A-8L illustrate gesture recognition and movement of display content in a computing system including multiple display devices, in accordance with implementations described herein.
Figure 8B:
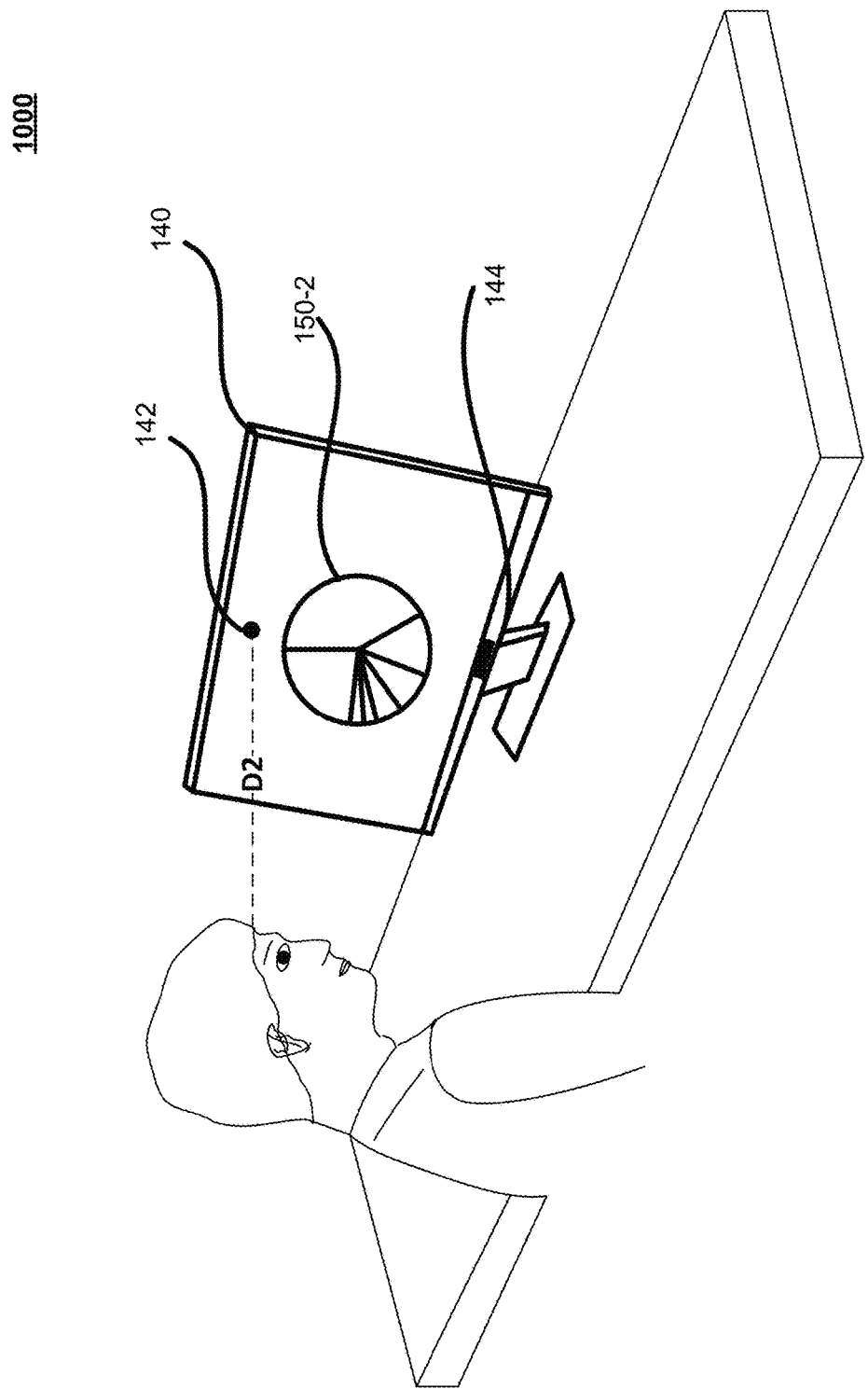
Figure 8C:
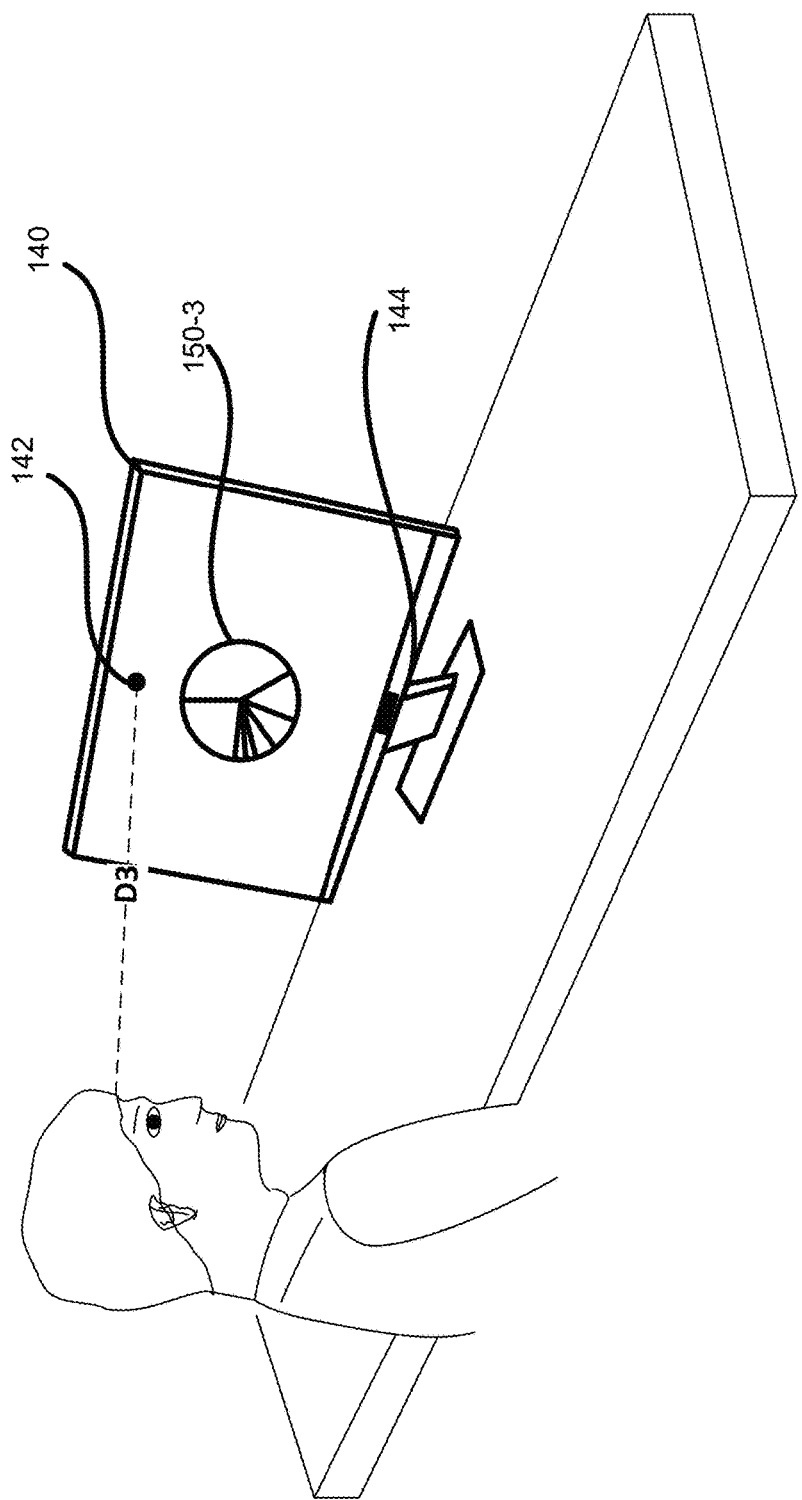

In some implementations, the detection of the position/orientation of the user's head in the image information collected by the image sensor(s) 142 may be used to set a scale for content 150 to be displayed on one or more of the display devices 140. In some implementations, the system may detect a command gesture, or gesture movement, in the image information collected by the image sensor(s) 142. For example, in some implementations, the system may detect a movement of the user's head/eye gaze relative to the display device 140, and may set and/or adjust display settings, including content scale and the like, based on the detected gesture movement. In this way, display of content may be controlled based on the detected physical positions of the display devices 140. For example, in some implementations, a distance D between the user's head and the display device 140, based on, for example, image information collected by the image sensor(s) 142, may be used to set a scale for content 150 displayed on the display device 140. As shown in FIG. 8A, at a distance D1, content 150 may be displayed on the display 140 at a first scale 150-1. In some implementations, the system may detect a gesture movement in the image information collected by the image sensor 142, in the form of a detected movement of the user's head toward, or closer to, the display device 140, from the distance D1 to the distance D2, as shown in FIG. 8B. This gesture movement can be considered a user input. The detected movement of the user's head toward the display device 140 may cause content 150 displayed on the display device 140 to increase in scale (i.e., a zooming in effect), from the first scale 150-1 to the second scale 150-2 shown in FIG. 8B. Similarly, a detected movement of the user's head away from the display device 140, from the distance D2 to a distance D3 shown in FIG. 8C may cause content 150 displayed on the display device 140 to decrease in scale (i.e., a zooming out effect), from the second scale 150-2 to a third scale 150-3. The display device 140 may therefore be controlled in response to the user input.

Figure 8D:
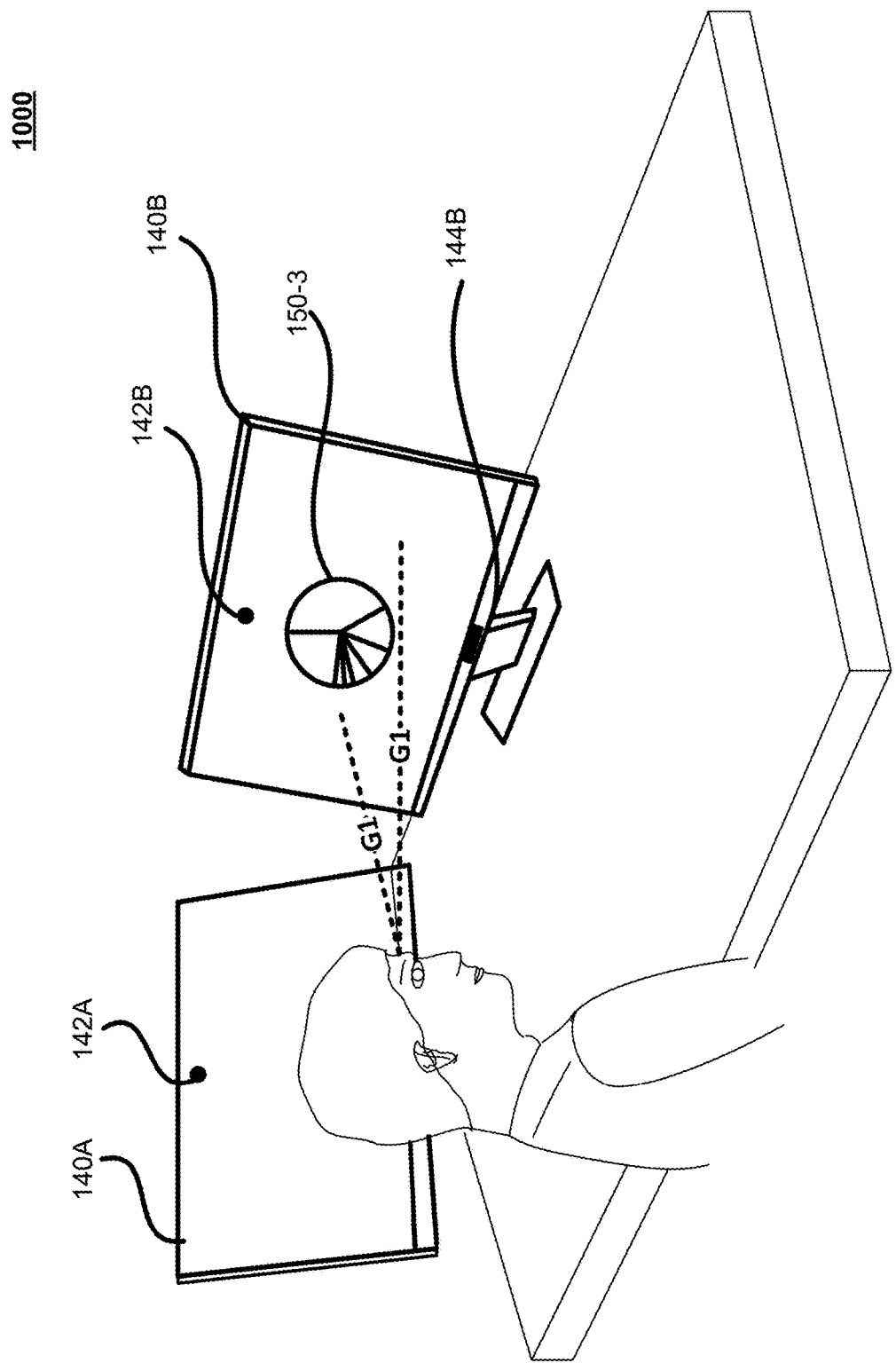
Figure 8E:
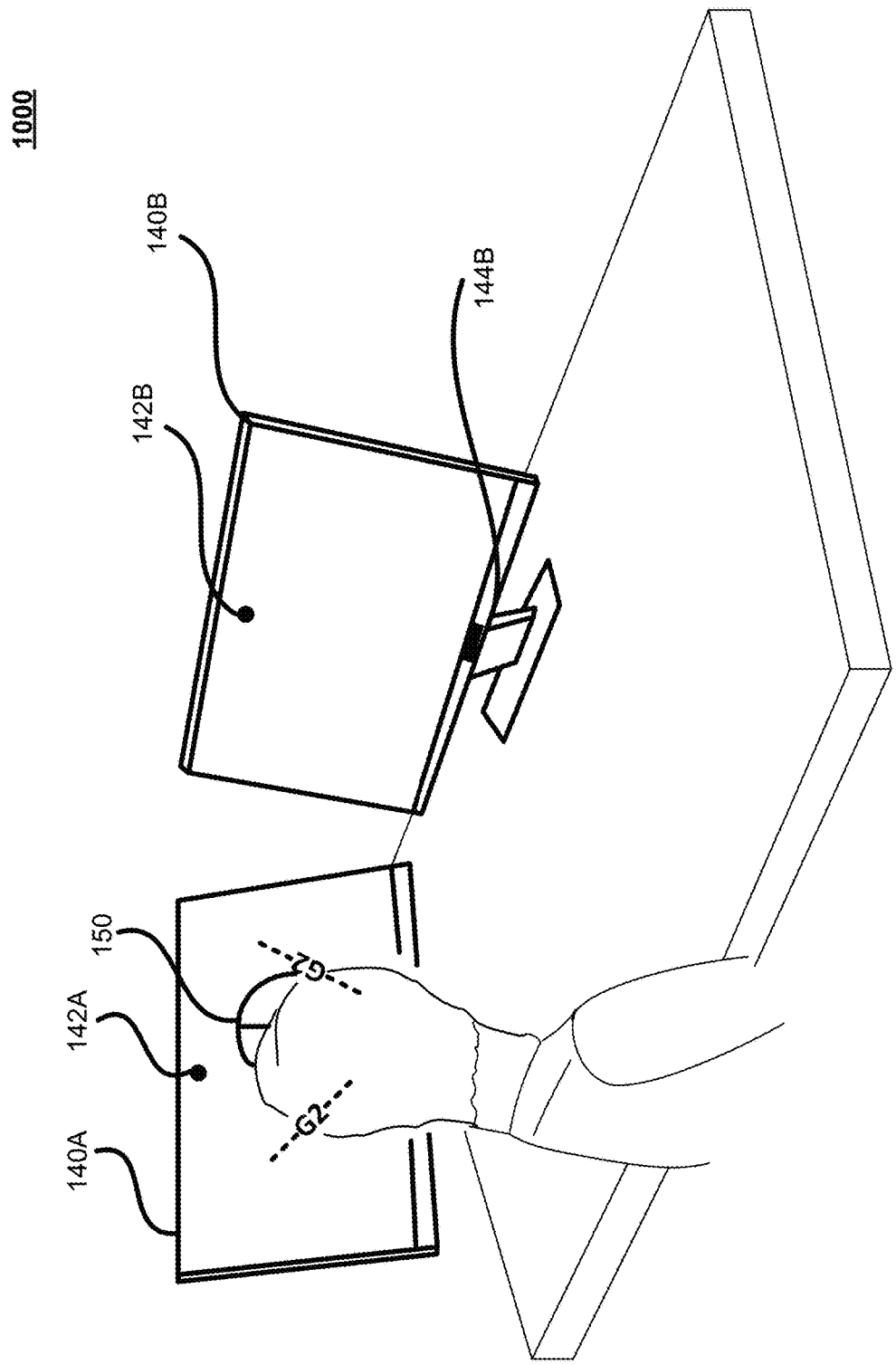

In some implementations, a gesture detected in the information collected by the sensor(s) 142, 144 in the form of, for example, a detected lateral head or eye gaze movement (i.e., a detected side to side, or left/right, head/eye gaze movement), may cause content to shift to an adjacent display device 140, based on a direction of the detected movement. For example, a gesture in the form of a detected lateral gaze shift, from a first gaze direction G1 shown in FIG. 8D to a direction G2 shown in FIG. 8E, may cause content 150 displayed on the second display device 140B to be displayed on the first display device 140A.

Figure 8F:
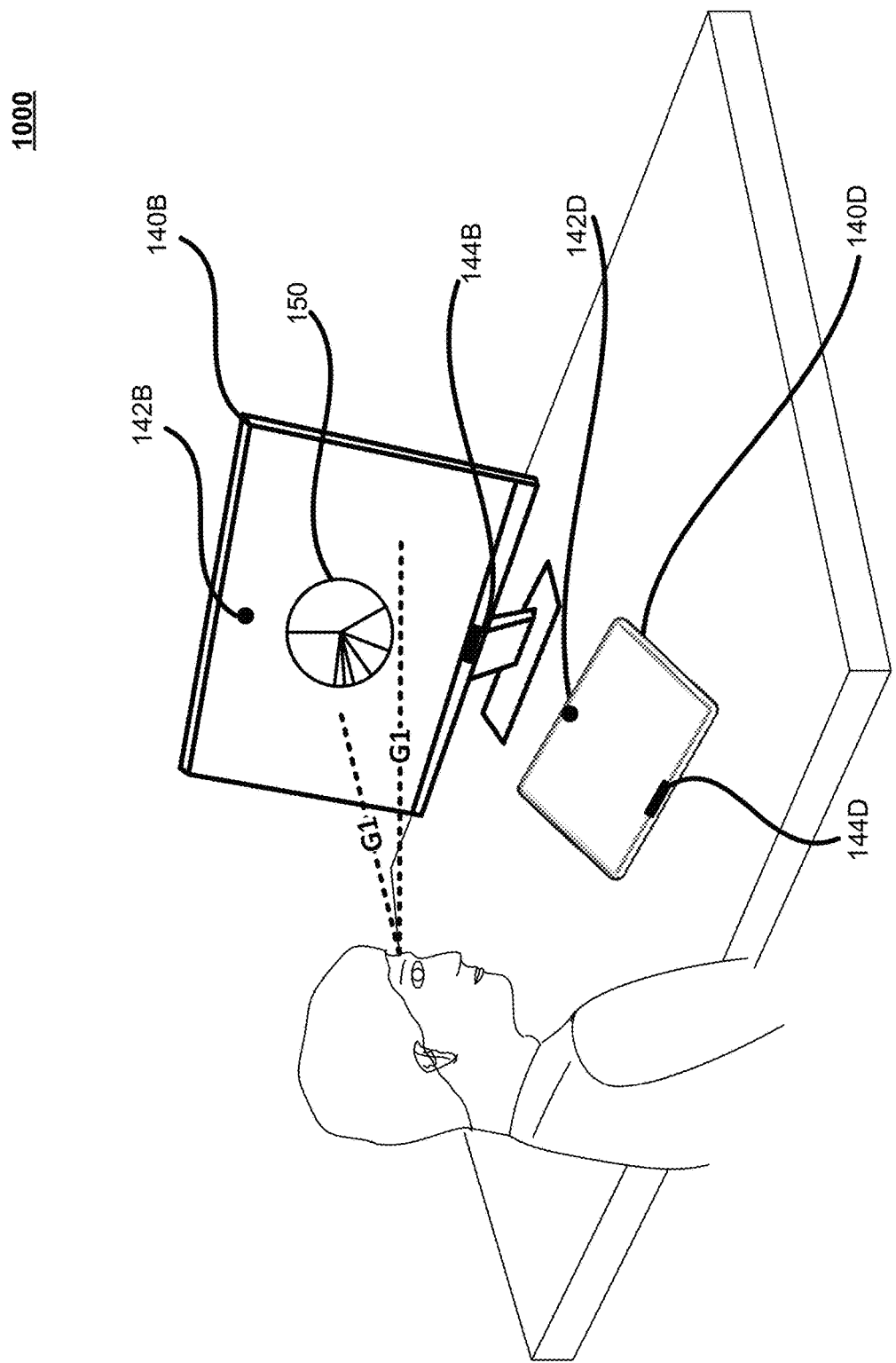
Figure 8G:
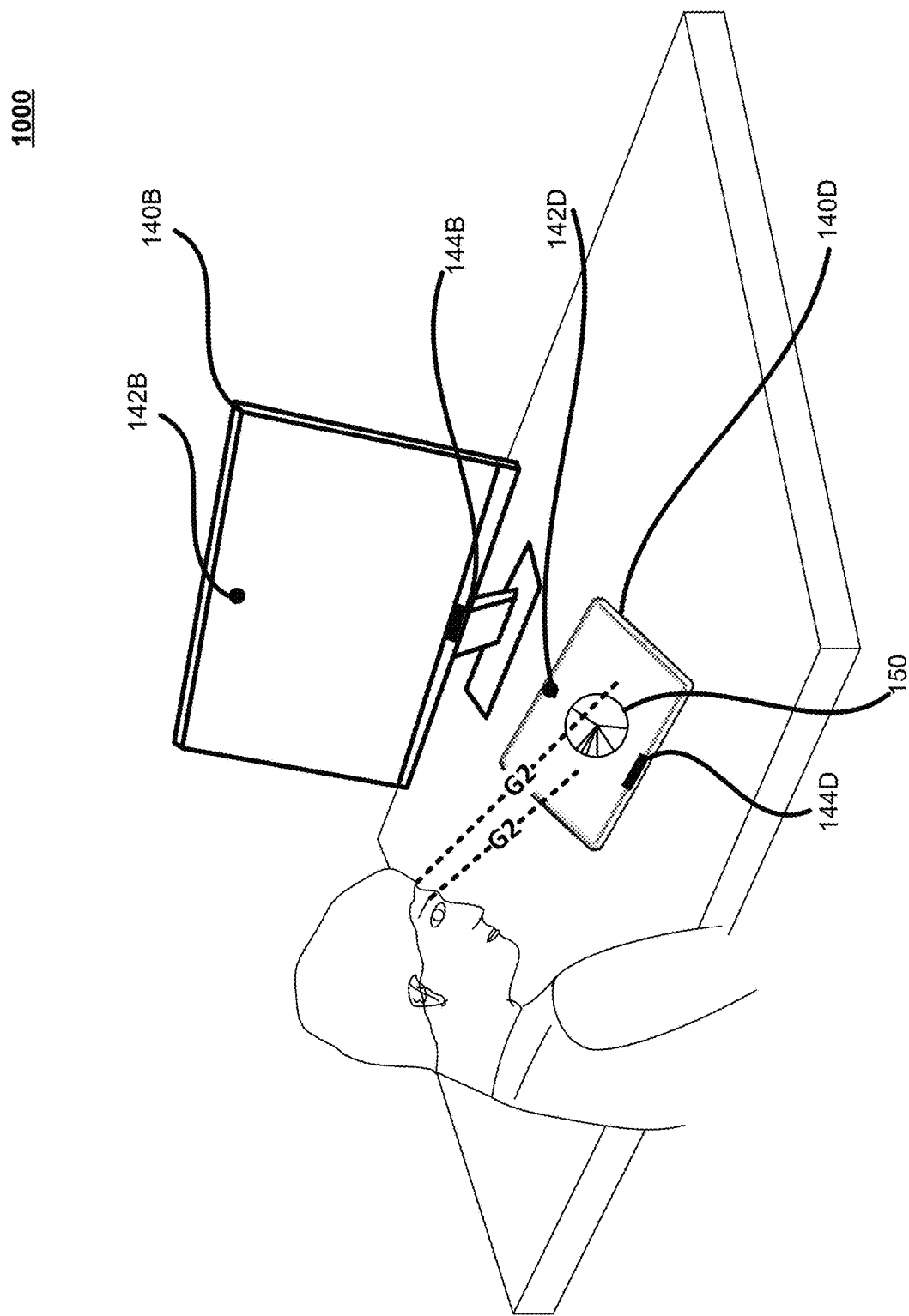

Similarly, in some implementations, a gesture detected in the information collected by the sensor(s) 142, 144 in the form of, for example, a detected head/eye gaze movement in a vertical direction (i.e., and up-down head/eye gaze movement), may cause content to shift to an adjacent display device 140, based on a direction of the detected movement. For example, a gesture in the form of a detected vertical gaze shift, from the gaze direction G1 shown in FIG. 8F to a direction G3 shown in FIG. 8G, may cause content 150 displayed on the second display device 140B to be displayed on the horizontally oriented mobile display device 140D.

Figure 8H:
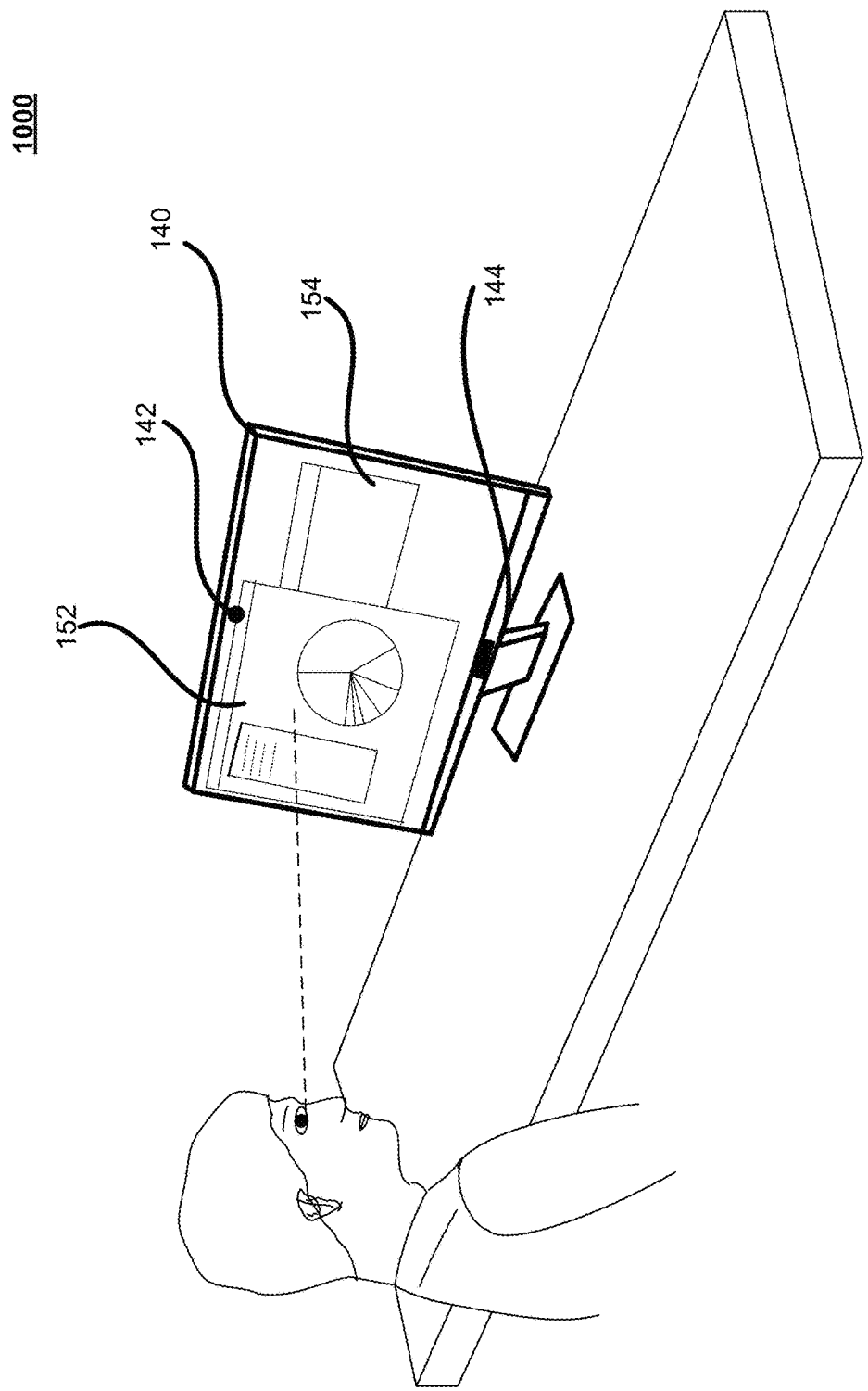
Figure 8I:
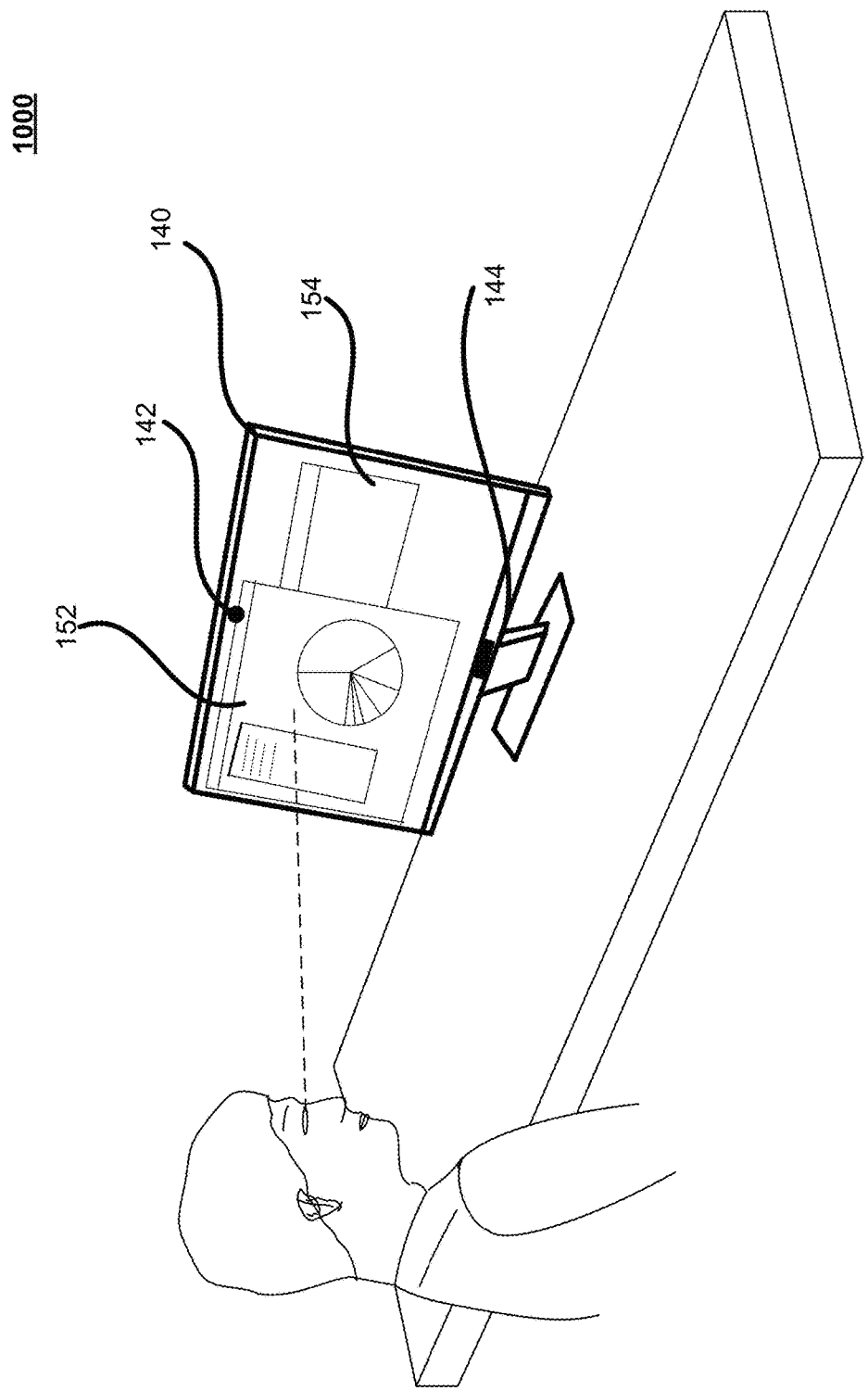
Figure 8J:
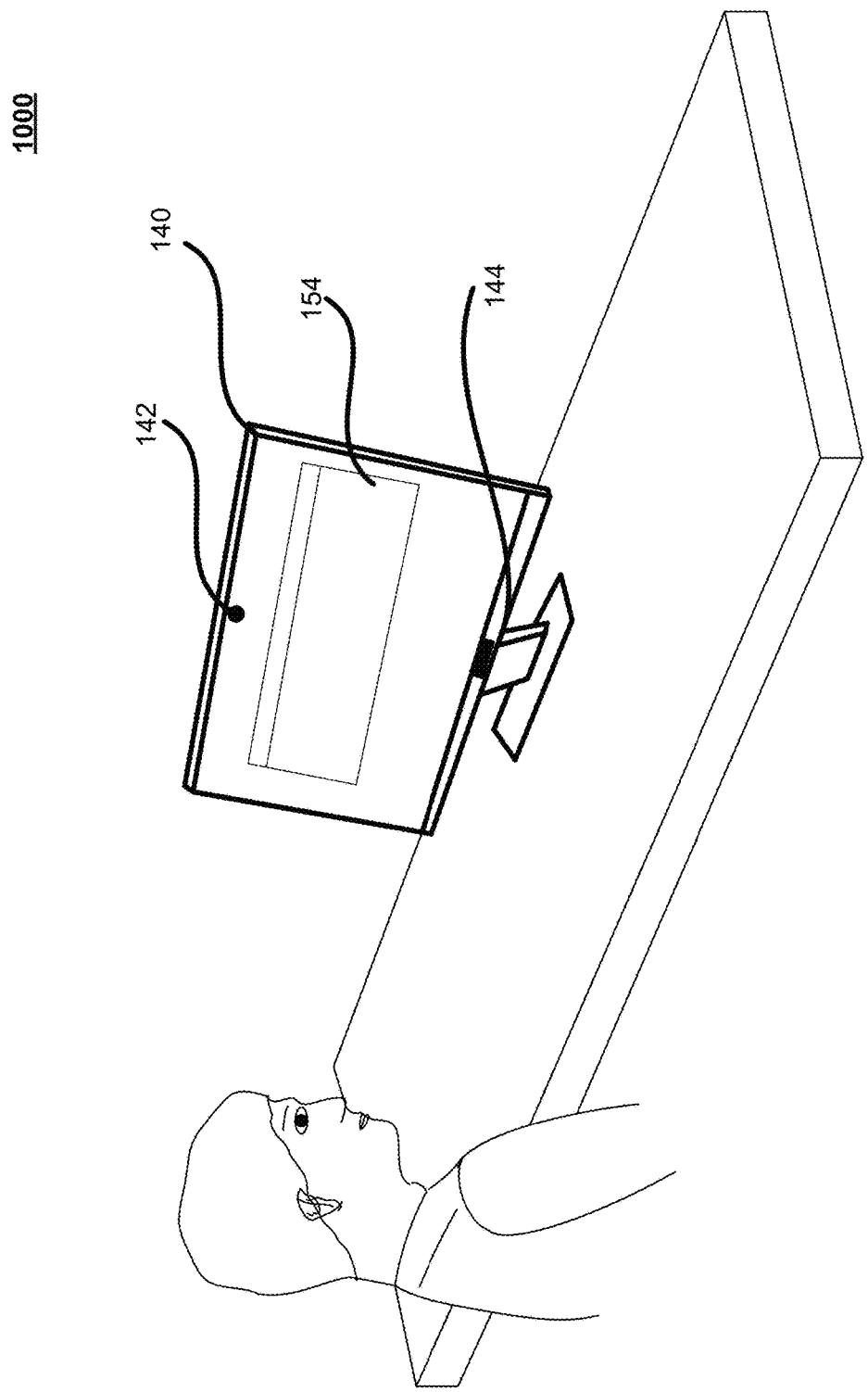
Figure 8K:
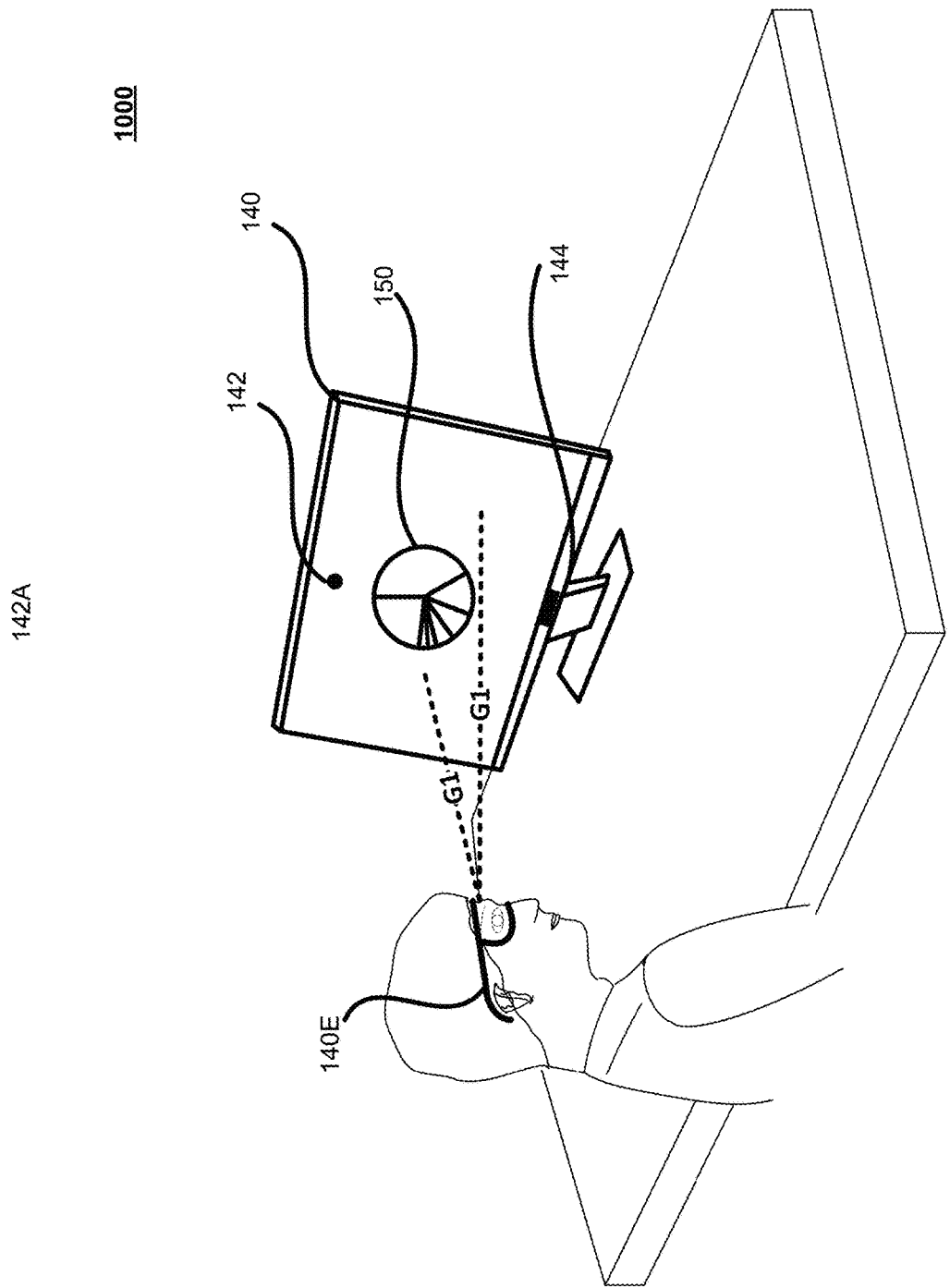
Figure 8L:
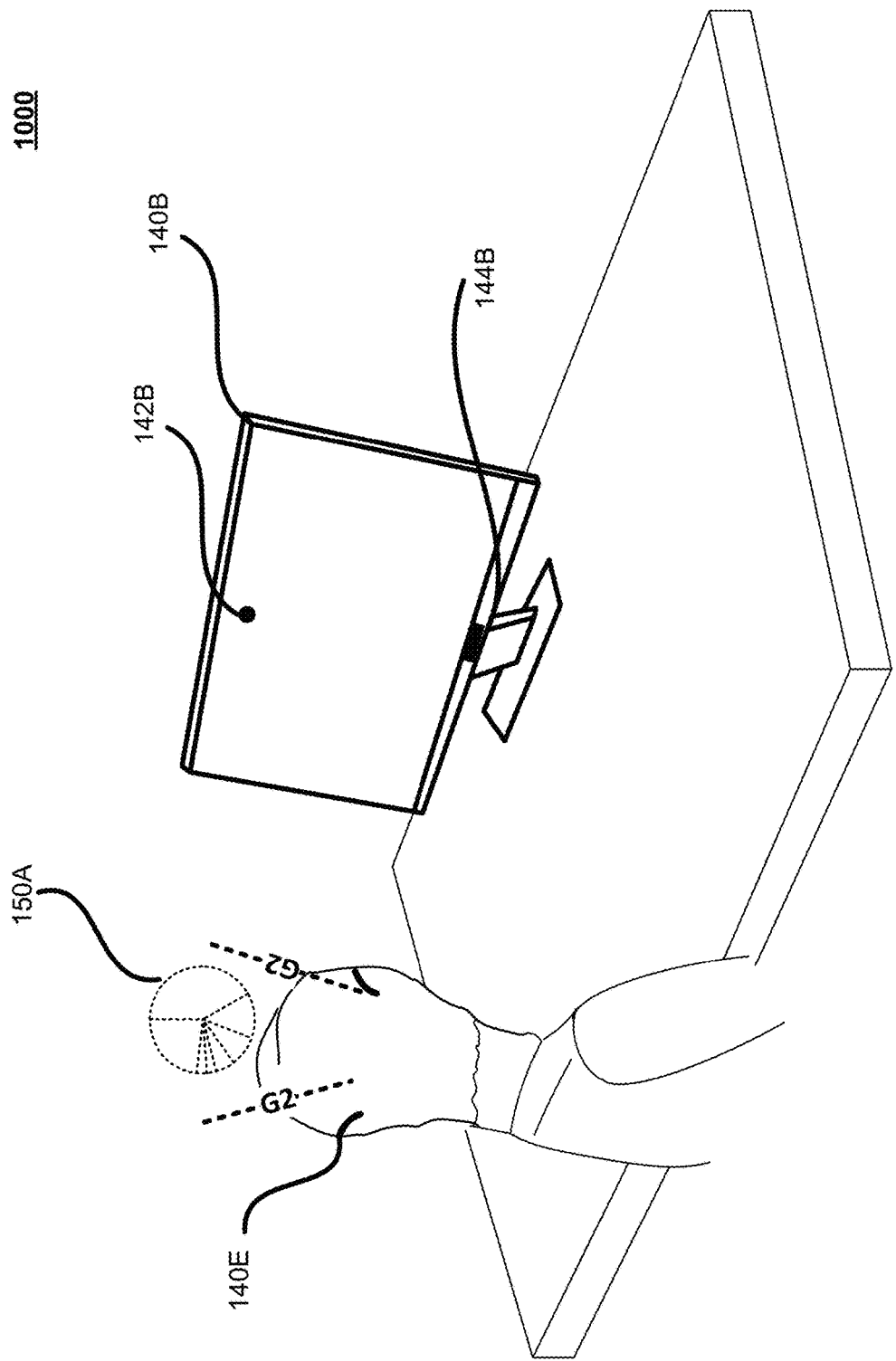

In some implementations, a head mounted display device 140E may be worn by the user, as shown in FIG. 8K. In some implementations, the head mounted display device 140E may present an augmented reality environment to the user, including, for example, augmented reality objects overlaid on the real world environment 1000. In some implementations, the head mounted display device 140E may be operably coupled to the computing device 120, and may serve as a connected display device 140 in the computing system. In the exemplary arrangement shown in FIG. 8K, a gesture detected as described above, for example, in the form of, for example, a detected lateral head or eye gaze movement (i.e., a detected side to side, or left/right, head/eye gaze movement) from the gaze direction G1 shown in FIG. 8K to the gaze direction G2 shown in FIG. 8L, may cause content 150 displayed on the second display device 140B to be displayed as an augmented reality object 150A by the head mounted display device 140E.

In some implementations, the detection of a head/eye gaze gesture in the image information collected by the sensor(s) 142, 144 may cause other action to be taken with respect to content displayed on one or more of the display devices 140. For example, in some implementations, a detected head nod, or eye blink and the like detected in the information collected by the sensor(s) 142, 422 may cause a displayed window to be minimized, an application to close, and the like. In the example shown in FIG. 8H, first and second content windows 152, 154 are displayed on the display device 140, with the user's gaze directed at the first content window 152. A detected eye blink, as shown in FIG. 8I, detected in the image information collected by the image sensor 142, may cause the computing device to minimize, or close, the first content window 152, as shown in FIG. 8J.

In some implementations, the detection of a head/eye gaze gesture in the image information collected by the sensor(s) 142, 144 may cause a visual indicator, such as, for example, a cursor, to appear, at a location on one of the display devices 140 to which the user's gaze is directed, for example, after a cursor and/or a screen time out, when the cursor is not otherwise visible due to content displayed on the display devices 140, and the like.

In the illustrative system and method described above with respect to FIGS. 1 through 8J, the display devices 140 include sensors 142, 144 which are essentially integral to, or built into, the display device 140. In some implementations, other sensors, such as, for example, connectable external webcams, may collect data to be processed by the system in a similar manner. For example, in some implementations, installation of a webcam on a display device, at a set position on the display device, may provide collect and provide image information to be processed as described above, for determining a physical position and/or orientation of the display device in the real world environment.

Figure 9:
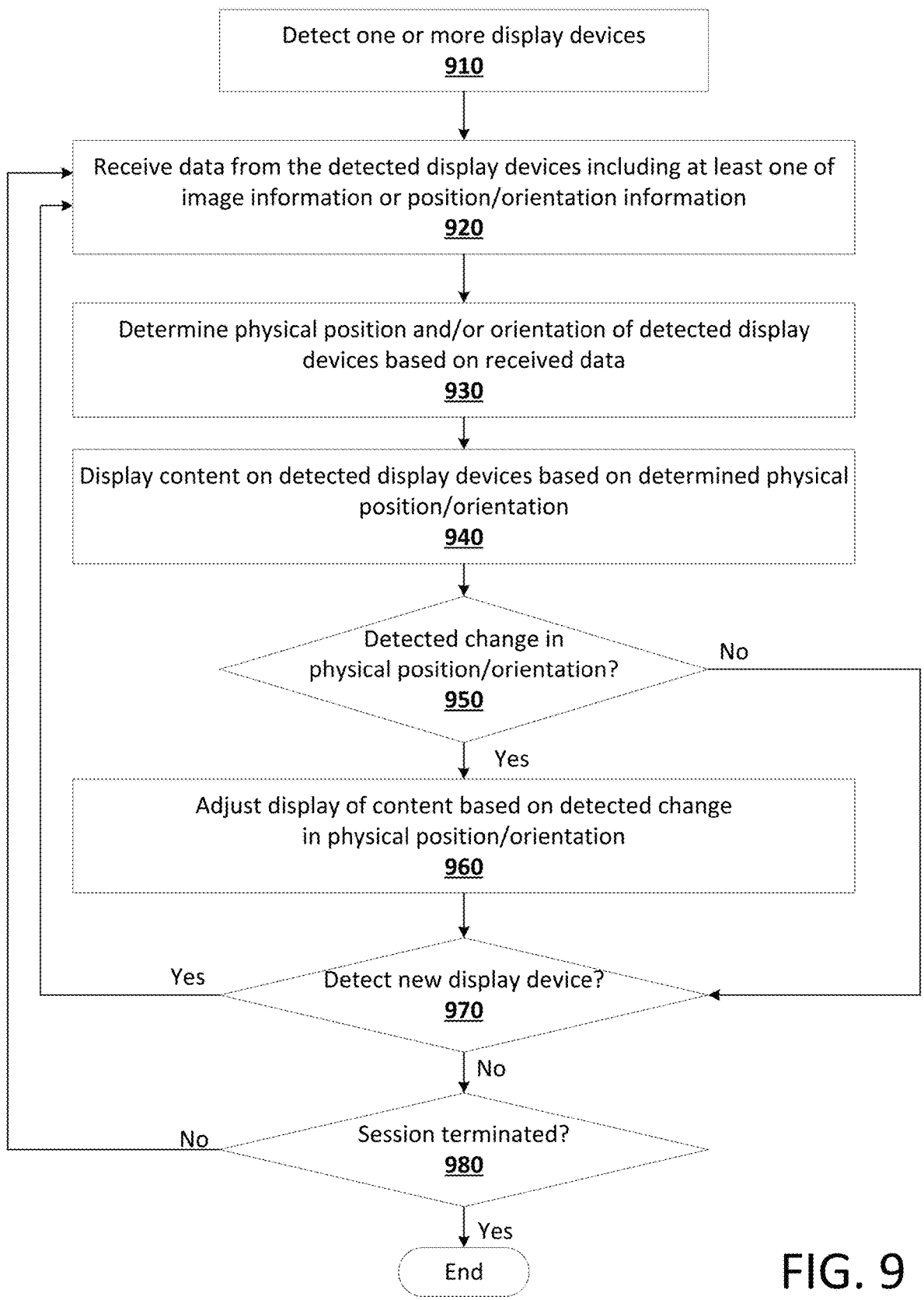
FIG. 9 is a flowchart of a method of operating a computing system in accordance with implementations described herein.

FIG. 9 is a flowchart of a method of operating a computing system 100, in accordance with implementations described herein. As shown in FIG. 9, in a computing system including a computing device and a plurality of display devices, in accordance with implementations described herein, one or more display devices may be detected to be in communication with the computing device (block 910). As noted above, the display devices may be detected based on, for example, connection (wired or wireless) to the computing device, proximity to the computing device, previous association with the computing device and the like. The display device(s) may collect at least one of image information (for example, collected by image sensor(s) of the display device(s)) and/or position/orientation information (for example, collected by positional sensor(s) such as IMU(s) of the display device(s)), and provide the collected image and/or positional information to the computing device (block 920), for determination of a physical position and/or orientation of the display device(s) (block 930). Content may be displayed on the detected display devices based on the determined physical position and/or orientation of the display device(s) (block 940). The display of content on the display device(s) may be dynamically adjusted (block 960) in response to a detected change in the physical position/orientation of one or more of the detected display device(s) (block 950). Similarly, in response to detection of a new display device (block 970), determination of a physical position and/or orientation of the display device(s) may be determined (for example, re-determined) (block 930) based on image and/or positional information associated with the display device(s) (block 920), and content may be displayed (block 940) and/or dynamically re-adjusted (block 960) based on the determined the determined physical position and/or orientation of the display device(s). The process may continue until an end of session is detected (block 980).

Figure 10:
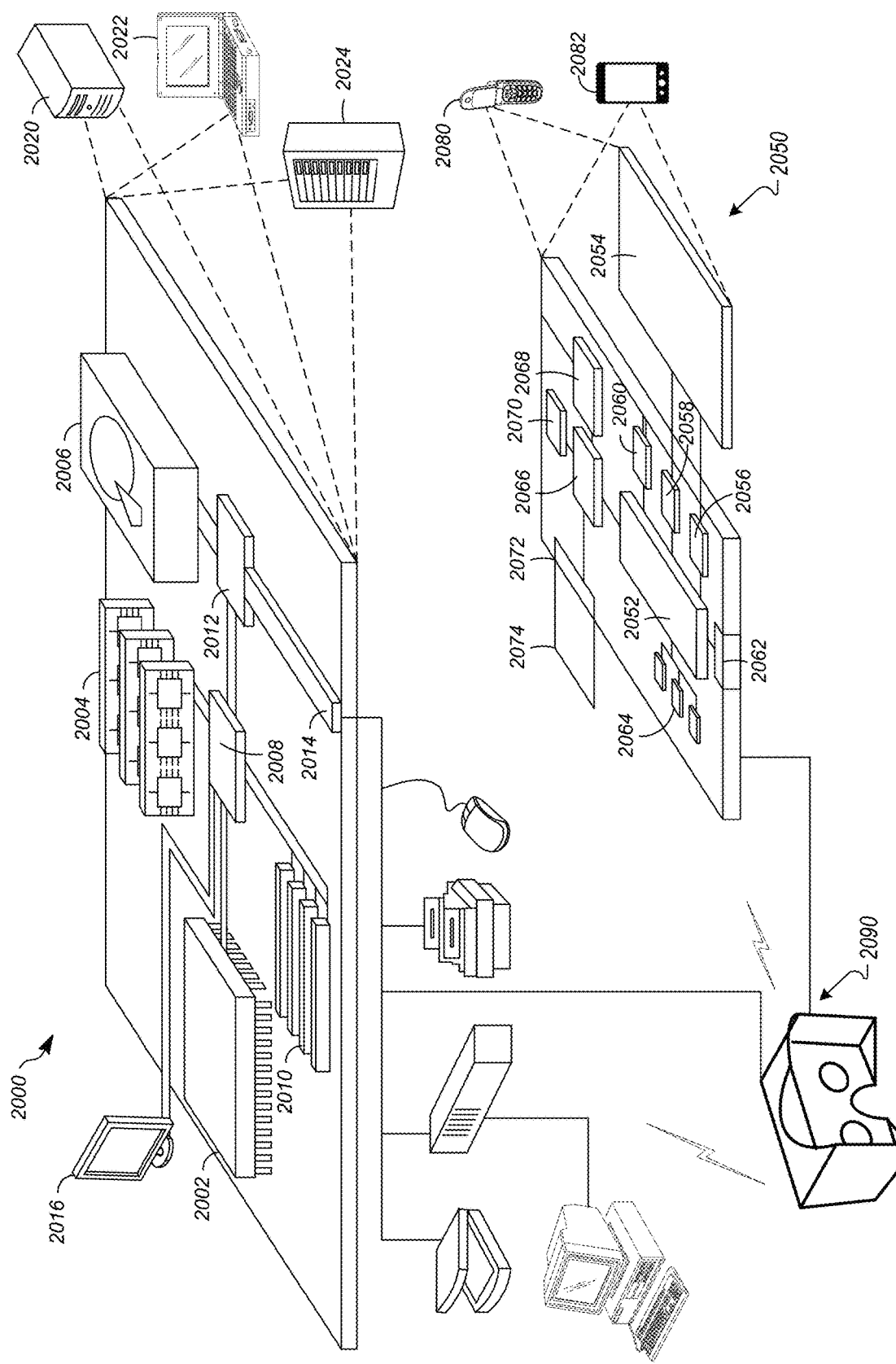
FIG. 10 shows an example of a computer device and a mobile computer device that can be used to implement the techniques described herein.

FIG. 10 shows an example of a generic computer device 2000 and a generic mobile computer device 2050, which may be used with the techniques described here. Computing device 2000 is intended to represent various forms of digital computers, such as laptops, desktops, tablets, workstations, personal digital assistants, televisions, servers, blade servers, mainframes, and other appropriate computing devices. Computing device 2050 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 2000 includes a processor 2002, memory 2004, a storage device 2006, a high-speed interface 2008 connecting to memory 2004 and high-speed expansion ports 2010, and a low speed interface 2012 connecting to low speed bus 2014 and storage device 2006. The processor 2002 can be a semiconductor-based processor. The memory 2004 can be a semiconductor-based memory. Each of the components 2002, 2004, 2006, 2008, 2010, and 2012, are interconnected using various busses, and may be mounted on a common motherboard or in other manners as appropriate. The processor 2002 can process instructions for execution within the computing device 2000, including instructions stored in the memory 2004 or on the storage device 2006 to display graphical information for a GUI on an external input/output device, such as display 2016 coupled to high speed interface 2008. In other implementations, multiple processors and/or multiple buses may be used, as appropriate, along with multiple memories and types of memory. Also, multiple computing devices 2000 may be connected, with each device providing portions of the necessary operations (e.g., as a server bank, a group of blade servers, or a multi-processor system).

The memory 2004 stores information within the computing device 2000. In one implementation, the memory 2004 is a volatile memory unit or units. In another implementation, the memory 2004 is a non-volatile memory unit or units. The memory 2004 may also be another form of computer-readable medium, such as a magnetic or optical disk.

The storage device 2006 is capable of providing mass storage for the computing device 2000. In one implementation, the storage device 2006 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 2004, the storage device 2006, or memory on processor 2002.

The high speed controller 2008 manages bandwidth-intensive operations for the computing device 2000, while the low speed controller 2012 manages lower bandwidth-intensive operations. Such allocation of functions is exemplary only. In one implementation, the high-speed controller 2008 is coupled to memory 2004, display 2016 (e.g., through a graphics processor or accelerator), and to high-speed expansion ports 2010, which may accept various expansion cards (not shown). In the implementation, low-speed controller 2012 is coupled to storage device 2006 and low-speed expansion port 2014. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 2000 may be implemented in a number of different forms, as shown in the figure. For example, it may be implemented as a standard server 2020, or multiple times in a group of such servers. It may also be implemented as part of a rack server system 2024. In addition, it may be implemented in a personal computer such as a laptop computer 2022. Alternatively, components from computing device 2000 may be combined with other components in a mobile device (not shown), such as device 2050. Each of such devices may contain one or more of computing device 2000, 2050, and an entire system may be made up of multiple computing devices 2000, 2050 communicating with each other.

Computing device 2050 includes a processor 2052, memory 2064, an input/output device such as a display 2054, a communication interface 2066, and a transceiver 2068, among other components. The device 2050 may also be provided with a storage device, such as a microdrive or other device, to provide additional storage. Each of the components 2050, 2052, 2064, 2054, 2066, and 2068, are interconnected using various buses, and several of the components may be mounted on a common motherboard or in other manners as appropriate.

The processor 2052 can execute instructions within the computing device 2050, including instructions stored in the memory 2064. The processor may be implemented as a chipset of chips that include separate and multiple analog and digital processors. The processor may provide, for example, for coordination of the other components of the device 2050, such as control of user interfaces, applications run by device 2050, and wireless communication by device 2050.

Processor 2052 may communicate with a user through control interface 2058 and display interface 2056 coupled to a display 2054. The display 2054 may be, for example, a TFT LCD (Thin-Film-Transistor Liquid Crystal Display) or an OLED (Organic Light Emitting Diode) display, or other appropriate display technology. The display interface 2056 may comprise appropriate circuitry for driving the display 2054 to present graphical and other information to a user. The control interface 2058 may receive commands from a user and convert them for submission to the processor 2052. In addition, an external interface 2062 may be provide in communication with processor 2052, so as to enable near area communication of device 2050 with other devices. External interface 2062 may provide, for example, for wired communication in some implementations, or for wireless communication in other implementations, and multiple interfaces may also be used.

The memory 2064 stores information within the computing device 2050. The memory 2064 can be implemented as one or more of a computer-readable medium or media, a volatile memory unit or units, or a non-volatile memory unit or units. Expansion memory 2074 may also be provided and connected to device 2050 through expansion interface 2072, which may include, for example, a SIMM (Single In Line Memory Module) card interface. Such expansion memory 2074 may provide extra storage space for device 2050, or may also store applications or other information for device 2050. Specifically, expansion memory 2074 may include instructions to carry out or supplement the processes described above, and may include secure information also. Thus, for example, expansion memory 2074 may be provide as a security module for device 2050, and may be programmed with instructions that permit secure use of device 2050. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 2064, expansion memory 2074, or memory on processor 2052, that may be received, for example, over transceiver 2068 or external interface 2062.

Device 2050 may communicate wirelessly through communication interface 2066, which may include digital signal processing circuitry where necessary. Communication interface 2066 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 2068. In addition, short-range communication may occur, such as using a Bluetooth, WiFi, or other such transceiver (not shown). In addition, GPS (Global Positioning System) receiver module 2070 may provide additional navigation- and location-related wireless data to device 2050, which may be used as appropriate by applications running on device 2050.

Device 2050 may also communicate audibly using audio codec 2060, which may receive spoken information from a user and convert it to usable digital information. Audio codec 2060 may likewise generate audible sound for a user, such as through a speaker, e.g., in a handset of device 2050. Such sound may include sound from voice telephone calls, may include recorded sound (e.g., voice messages, music files, etc.) and may also include sound generated by applications operating on device 2050.

The computing device 2050 may be implemented in a number of different forms, as shown in the figure. For example, it may be implemented as a cellular telephone 2080. It may also be implemented as part of a smart phone 2082, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

Further to the descriptions above, a user may be provided with controls allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

What is claimed is:

1. A method, comprising:
    detecting, by a processor of a computing device, a plurality of display devices in a physical environment, the plurality of display devices being operably coupled to the computing device in the physical environment;
    receiving, by the processor from a plurality of sensors of the plurality of display devices, data related to the physical environment, including:
        image data related to the physical environment from at least one image sensor of the plurality of display devices; and
        orientation data related to the plurality of display devices from at least one position sensor of the plurality of display devices;
    detecting, by the processor, a physical position of the plurality of display devices in the physical environment based on the data received from the plurality of sensors of the plurality of display devices; and
    controlling, by the processor, at least one of:
        content displayed on at least two of the plurality of display devices based on the detected physical positions of the plurality of display devices, or
        an interaction of an auxiliary device with the plurality of display devices.

2. The method of claim 1, wherein controlling the content displayed on at least two of the plurality of display devices includes:
    detecting a user input; and
    controlling the display of the content in response to the user input.

3. The method of claim 2, wherein
    detecting the user input includes detecting a controller input that moves the displayed content from a first display device to a second display device of the plurality of display devices; and
    controlling the display of the content includes moving the displayed content from a display position on the first display device to a display position on the second display device of the plurality of display devices.

4. The method of claim 3, wherein moving the displayed content from the first display device to the second display device includes:
    adjusting a position and an orientation of the displayed content, from a first position and a first orientation on the first display device to a second position and a second orientation on the second display device, in response to the detected physical position of the first display device and the detected physical position of the second display device.

5. The method of claim 4, wherein the physical orientation of the first display device is different from the physical orientation of the second display device.

6. The method of claim 4, wherein the first display device is oriented substantially horizontally, and the second display device is oriented substantially vertically.

7. The method of claim 3, wherein moving the displayed content from the first display device to the second display device includes:
    detecting a physical discontinuity between the first display device and the second display device, based on the detected physical position of the first display device and the detected physical position of the second display device in the physical environment; and
    adjusting the moving of the displayed content from the first display device to the second display device based on the detected physical discontinuity.

8. The method of claim 7, wherein detecting the physical discontinuity includes at least one of:
    detecting a physical gap between the detected physical position of the first display device and the detected physical position of the second display device; or
    detecting a physical bezel area surrounding a display area of at least one of the first display device or the second display device.

9. The method of claim 7, wherein adjusting the movement of the displayed content includes delaying the display of the content on the second display device to correspond to movement of the displayed content through the physical discontinuity.

10. The method of claim 1, wherein detecting the physical position of the plurality of display devices in the physical environment includes:
receiving the orientation data from the position sensor of at least one of the plurality of display devices;
detecting a physical orientation of the at least one display device based on the received orientation data; and
detecting the physical position of the at least one display device relative to remaining display devices of the plurality of display devices based on the physical orientation and the image data related to the physical environment received from image sensors of the plurality of display devices.

11. The method of claim 1, further comprising:
dynamically configuring display settings of the computing device based on the detected physical positions of the plurality of display devices,
wherein the content displayed on the at least two of the plurality of display devices is controlled based on the dynamically configured display settings.

12. The method of claim 11, further comprising;
collecting movement data from a position sensor of at least one of the plurality of display devices;
detecting a movement of the at least one display device based on the movement data; and
dynamically configuring the display settings in response to detecting the movement of the at least one display device of the plurality of display devices.

13. The method of claim 12, wherein the at least one display device of the plurality of display devices is a mobile display device.

14. The method of claim 11, wherein dynamically configuring the display settings of the computing device includes at least one of dynamically setting an order of the plurality of display devices, dynamically setting a primary display device of the plurality of display devices, or dynamically setting relative positions of the plurality of the display devices.

15. The method of claim 14, wherein detecting the physical position of each display device of the plurality of display devices includes:
intermittently receiving the image data from the image sensors of the plurality of display devices and orientation data from the position sensors of the plurality of display devices;
dynamically updating the physical position of the plurality of display devices based on updated image data and updated orientation data; and
dynamically updating the display settings of the computing device based on the updated physical position of the plurality of display devices.

16. The method of claim 1, wherein controlling interaction of the auxiliary device with the plurality of display devices includes controlling interaction of a display auxiliary device or a non-display auxiliary device with the plurality of display devices.

17. The method of claim 16, wherein the display auxiliary device includes at least one of a tablet computing device or a wearable display device.

18. The method of claim 17, wherein the wearable display device includes at least one of an augmented reality head mounted display device or a wrist worn computing device.

19. The method of claim 17, wherein the non-display auxiliary device includes at least one of a keyboard input device, a mouse input device, or a touchpad input device.

20. A method, comprising:
detecting, by a processor of a computing device, a plurality of display devices in a physical environment, the plurality of display devices being operably coupled to the computing device in the physical environment;
receiving, by the processor, data related to the physical environment from sensors of the plurality of display devices, including:
receiving image data related to the physical environment from image sensors of the plurality of display devices; and
receiving orientation data related to the plurality of display devices from position sensors of the plurality of display devices;
detecting, by the processor, a physical position of each display device of the plurality of display devices in the physical environment based on the data related to the physical environment; and
configuring display settings of the computing device without user intervention based on the detected physical positions of the plurality of display devices.

21. A computer program product tangibly embodied on a non-transitory computer-readable storage medium, comprising instructions that, when executed by a computing device, are configured to cause the computing device to:
detect a plurality of display devices in a physical environment;
receive data from the plurality of display devices, collected by a plurality of sensors of the plurality of display devices, including:
receive image data related to the physical environment from at least one image sensor of the plurality of display devices; and
receive orientation data related to the plurality of display devices from at least one position sensor of the plurality of display devices;
detect a physical position of each display device of the plurality of display devices in the physical environment based on data related to the physical environment, based on the data collected by the plurality of sensors of the plurality of display devices; and
control at least one of:
content displayed on at least two of the plurality of display devices based on the detected physical positions of the plurality of display devices, or
an interaction of an auxiliary device with the plurality of display devices.

22. The computer program product of claim 21, wherein, in controlling the content displayed on the plurality of display devices, the instructions cause the computing device to:
detect a user input, including a controller input that moves the displayed content from a first display device to a second display device of the plurality of display devices; and
move displayed content from a display position on the first display device to a display position on the second display device of the plurality of display devices.

23. The computer program product of claim 22, wherein, in moving the displayed content from the first display device to the second display device, the instructions cause the computing device to:

detect that a physical orientation of the first display device is different from a physical orientation of the second display device; and adjust a position and an orientation of the displayed content, from a first position and a first orientation on the first display device to a second position and a second orientation on the second display device, in response to the detected physical orientation of the first display device and the detected physical orientation second display device.

24. The computer program product of claim 22, wherein, in moving the displayed content from the first display device to the second display device, the instructions cause the computing device to:

detect a physical discontinuity between the first display device and the second display device, the detected physical discontinuity including at least one of:

a physical gap between the detected physical position of the first display device and the detected physical position of the second display device; or a physical bezel area surrounding a display area of at least one of the first display device or the second display device; and adjust the moving of the displayed content from the first display device to the second display device to correspond to movement of the displayed content through the detected physical discontinuity.

25. The computer program product of claim 21, wherein, in detecting the physical position of the plurality of display devices in the physical environment, the instructions cause the computing device to, for each display device of the plurality of display devices:

receive orientation data from the position sensor of the display device;

detect a physical orientation of the display device based on the orientation data; and detect a physical position of the display device relative to remaining display devices of the plurality of display devices based on the physical orientation and the image data related to the physical environment collected by the image sensors.

26. The computer program product of claim 25, wherein the instructions also cause the computing device to:

receive movement data from a position sensor of at least one of the plurality of display devices;

detect a movement of the at least one display device based on the movement data; and dynamically update display settings of the computing device in in response to the detected movement of the at least one display device of the plurality of display devices.

27. The computer program product of claim 26, wherein, in detecting the physical position of each display device of the plurality of display devices, the instructions cause the computing device to:

periodically receive image data and orientation data from the plurality of sensors of the plurality of display devices;

dynamically update the physical position of the plurality of display devices based on updated image data and updated orientation data; and dynamically update the display settings of the computing device based on the updated physical position of the plurality of display devices.

* * * * *